(12) United States Patent
Sano et al.

(10) Patent No.: US 8,412,801 B2
(45) Date of Patent: Apr. 2, 2013

(54) NETWORK AV SYSTEM

(75) Inventors: Toshinobu Sano, Neyagawa (JP);
Takahiro Chiba, Neyagawa (JP);
Hideyuki Sawada, Neyagawa (JP)

(73) Assignee: Onkyo Corporation, Osaka (JP)

( * ) Notice: Subject to any disclaimer, the term of this patent is extended or adjusted under 35 U.S.C. 154(b) by 2831 days.

(21) Appl. No.: 10/909,109

(22) Filed: Jul. 29, 2004

(65) Prior Publication Data
US 2005/0034164 A1 Feb. 10, 2005

(30) Foreign Application Priority Data

Aug. 8, 2003 (JP) ................................ 2003-290384

(51) Int. Cl.
*G06F 15/16* (2006.01)
*H04N 7/173* (2011.01)
*G06F 15/173* (2006.01)

(52) U.S. Cl. ........ 709/219; 709/224; 709/225; 709/226; 725/86; 725/105

(58) Field of Classification Search ........... 709/224–226
See application file for complete search history.

(56) References Cited

U.S. PATENT DOCUMENTS

| | | | |
|---|---|---|---|
| 5,987,621 A | 11/1999 | Duso et al. | |
| 6,195,351 B1 * | 2/2001 | Hiscock et al. | 370/389 |
| 6,195,680 B1 | 2/2001 | Goldszmidt et al. | |
| 6,286,031 B1 * | 9/2001 | Waese et al. | 709/203 |
| 6,412,004 B1 * | 6/2002 | Chen et al. | 709/226 |
| 6,429,364 B1 * | 8/2002 | Muraki et al. | 84/600 |
| 6,490,725 B2 * | 12/2002 | Kikinis | 725/87 |
| 6,496,856 B1 * | 12/2002 | Kenner et al. | 709/218 |
| 6,502,194 B1 * | 12/2002 | Berman et al. | 726/28 |
| 6,564,380 B1 * | 5/2003 | Murphy | 725/86 |
| 7,039,784 B1 * | 5/2006 | Chen et al. | 711/170 |
| 7,127,735 B1 * | 10/2006 | Lee et al. | 725/87 |
| 7,133,924 B1 * | 11/2006 | Rosenberg et al. | 709/231 |
| 7,194,757 B1 * | 3/2007 | Fish et al. | 725/121 |
| 7,287,180 B1 * | 10/2007 | Chen et al. | 714/4.3 |
| 7,305,419 B1 * | 12/2007 | Cosby et al. | 1/1 |

(Continued)

FOREIGN PATENT DOCUMENTS

| | | |
|---|---|---|
| EP | 1 296 312 | 3/2003 |
| EP | 1 311 122 | 5/2003 |

(Continued)

OTHER PUBLICATIONS

International Search Report for related PCT/JP2004/006260, dated May 11, 2004.

(Continued)

*Primary Examiner* — B. Tiv
(74) *Attorney, Agent, or Firm* — Renner, Otto, Boisselle & Sklar, LLP

(57) ABSTRACT

Each of servers in a global list server system includes a local list of music piece data stored by the each server and a global list of the music piece data stored by the servers. A client requests an arbitrary server to provide the global list and the server transmits the global list to the client upon receiving the request. The client refers to the global list and requests a server storing desired music piece data to transfer the music piece data. The server transmits music piece data to the client upon receiving the transfer request for the music piece data.

29 Claims, 53 Drawing Sheets

U.S. PATENT DOCUMENTS

| | | | |
|---|---|---|---|
| 7,318,107 B1* | 1/2008 | Menon .................... 709/239 |
| 7,319,536 B1* | 1/2008 | Wilkins et al. ............ 358/1.15 |
| 2001/0003188 A1* | 6/2001 | Kikinis .................... 709/203 |
| 2001/0039659 A1* | 11/2001 | Simmons et al. ............ 725/61 |
| 2002/0046232 A1* | 4/2002 | Adams et al. ............. 709/200 |
| 2002/0056117 A1 | 5/2002 | Hasegawa et al. |
| 2002/0066113 A1 | 5/2002 | Utsunomiya et al. |
| 2002/0129693 A1* | 9/2002 | Wilks .................... 84/609 |
| 2002/0144268 A1* | 10/2002 | Khoo et al. ............. 725/47 |
| 2002/0150387 A1 | 10/2002 | Kunii et al. |
| 2002/0169826 A1* | 11/2002 | Yano et al. ............. 709/203 |
| 2002/0188735 A1* | 12/2002 | Needham et al. ......... 709/229 |
| 2003/0035419 A1 | 2/2003 | Chin et al. |
| 2003/0037124 A1 | 2/2003 | Yamaura et al. |
| 2003/0041328 A1* | 2/2003 | Khoo et al. ............. 725/47 |
| 2003/0078918 A1* | 4/2003 | Souvignier et al. ............ 707/3 |
| 2003/0126277 A1* | 7/2003 | Son et al. ............... 709/231 |
| 2003/0140158 A1* | 7/2003 | Lee et al. ............... 709/231 |
| 2003/0145153 A1* | 7/2003 | Avraham ............... 711/103 |
| 2003/0233563 A1* | 12/2003 | Kruse .................... 713/193 |
| 2004/0034870 A1* | 2/2004 | O'Brien et al. ............ 725/88 |
| 2004/0060070 A1* | 3/2004 | Mizushima ............. 725/110 |
| 2004/0073610 A1* | 4/2004 | Terada et al. ............ 709/203 |
| 2004/0122958 A1* | 6/2004 | Wardrop ................ 709/229 |
| 2004/0128198 A1* | 7/2004 | Register et al. ........... 705/14 |
| 2004/0133924 A1* | 7/2004 | Wilkins et al. ........... 725/135 |
| 2004/0181490 A1* | 9/2004 | Gordon et al. ............ 705/59 |
| 2005/0027810 A1* | 2/2005 | Donovan ................ 709/206 |
| 2005/0083339 A1* | 4/2005 | Wilt et al. ............. 345/539 |
| 2005/0201313 A1* | 9/2005 | Koga et al. .............. 370/313 |
| 2006/0064500 A1* | 3/2006 | Roth et al. ............. 709/231 |
| 2006/0095512 A1* | 5/2006 | Noma .................. 709/203 |
| 2006/0140584 A1* | 6/2006 | Ellis et al. .............. 386/83 |
| 2006/0206400 A1* | 9/2006 | Usui .................... 705/35 |
| 2007/0038610 A1* | 2/2007 | Omoigui ................ 707/3 |
| 2008/0140717 A1* | 6/2008 | Rosenberg et al. ........ 707/104.1 |

FOREIGN PATENT DOCUMENTS

| | | |
|---|---|---|
| EP | 1 357 734 | 10/2003 |
| JP | 10-177514 | 6/1998 |
| JP | 10-247911 | 9/1998 |
| JP | 2001-092749 | 6/2001 |
| JP | 2001-184272 | 7/2001 |
| JP | 2001-3618881 | 11/2001 |
| JP | 2002-099519 | 4/2002 |
| JP | 2002-262202 | 9/2002 |
| JP | 2002-288148 | 10/2002 |
| JP | 2003-015665 | 1/2003 |
| JP | 2003-32311 | 1/2003 |
| JP | 2003-046512 | 2/2003 |
| JP | 2003-099337 | 4/2003 |
| JP | 2003-141007 | 5/2003 |
| WO | 01/93080 | 12/2001 |
| WO | 02/056580 | 7/2002 |
| WO | 02/071191 | 9/2002 |
| WO | 03/058622 | 7/2003 |
| WO | WO 03 102919 | 12/2003 |

OTHER PUBLICATIONS

Written Opinion for related PCT/JP2004/006260, dated May 11, 2004.
"cd3o Network MP3 Players" Jun. 17, 2003; www.cd3o.com.
"Onkyo Audio Network Receiver NC-500 instruction manual" Apr. 16, 2003; www.onkyousa.com.
Partial International Search Report for Application No. 04732179.9—PCT/JP2004/006260 dated Sep. 5, 2006.
Supplemental European Search Report for related 04732179.9—PCT/JP2004/006260, dated Nov. 13, 2006.
Michael Rabinovich, Oliver Spatscheck; "Web Caching and Replication;" Dec. 21, 2001; Addison Wesley Professional; XP002405116.
M. Makpangou et al.; "Replicated directory service for weakly consistent distributed caches"; Distributed Computing Systems, 1999. Proceedings 19th IEEE International Conference on Austin, TX, USA; May 31, 1999-Jun. 4, 1999; Los Alamitos, CA, USA; IEEE Computer Society, US, May 31, 2999; pp. 92-100; XP000883606.
European Communication for corresponding Application No. 04732179.9 dated Nov. 11, 2008.

\* cited by examiner

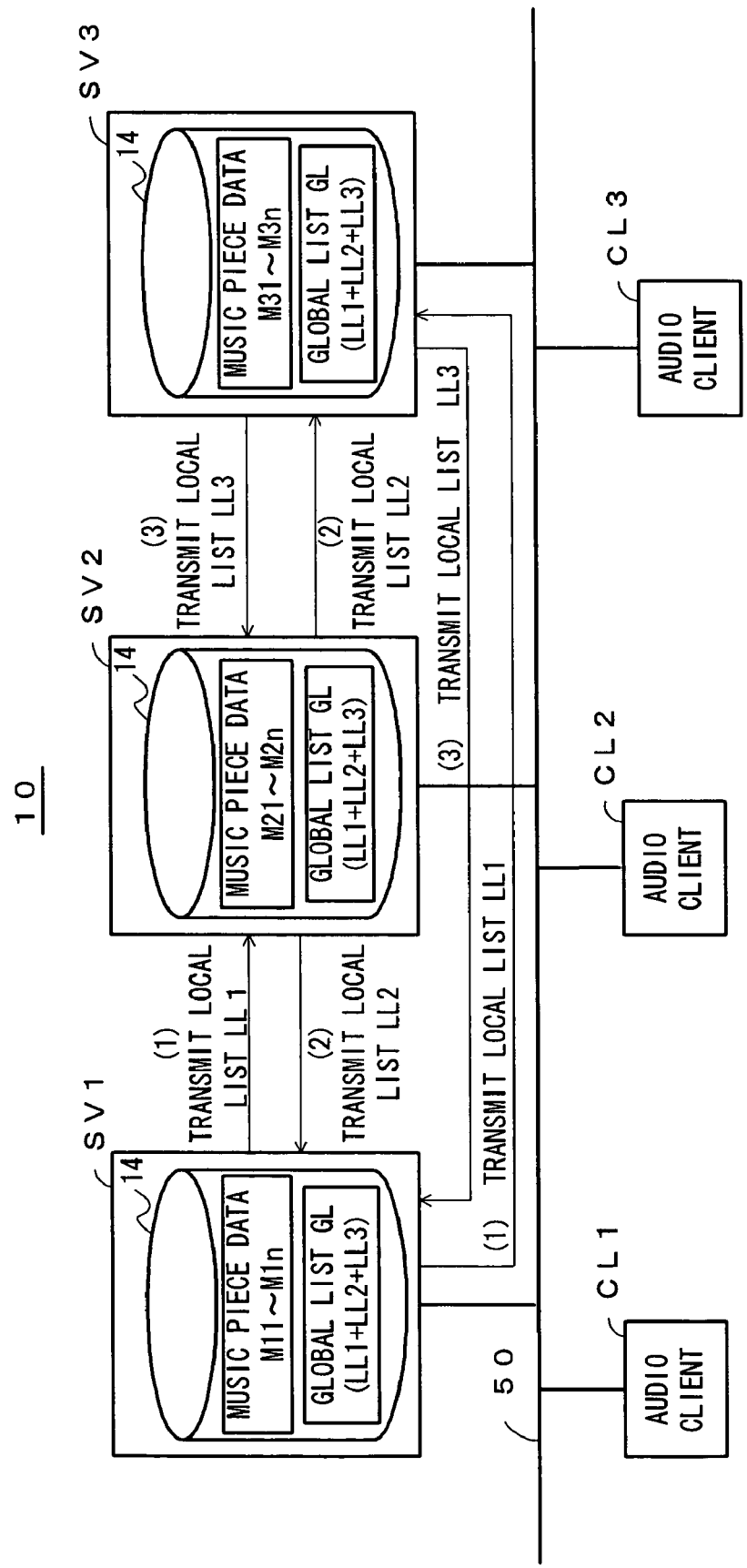

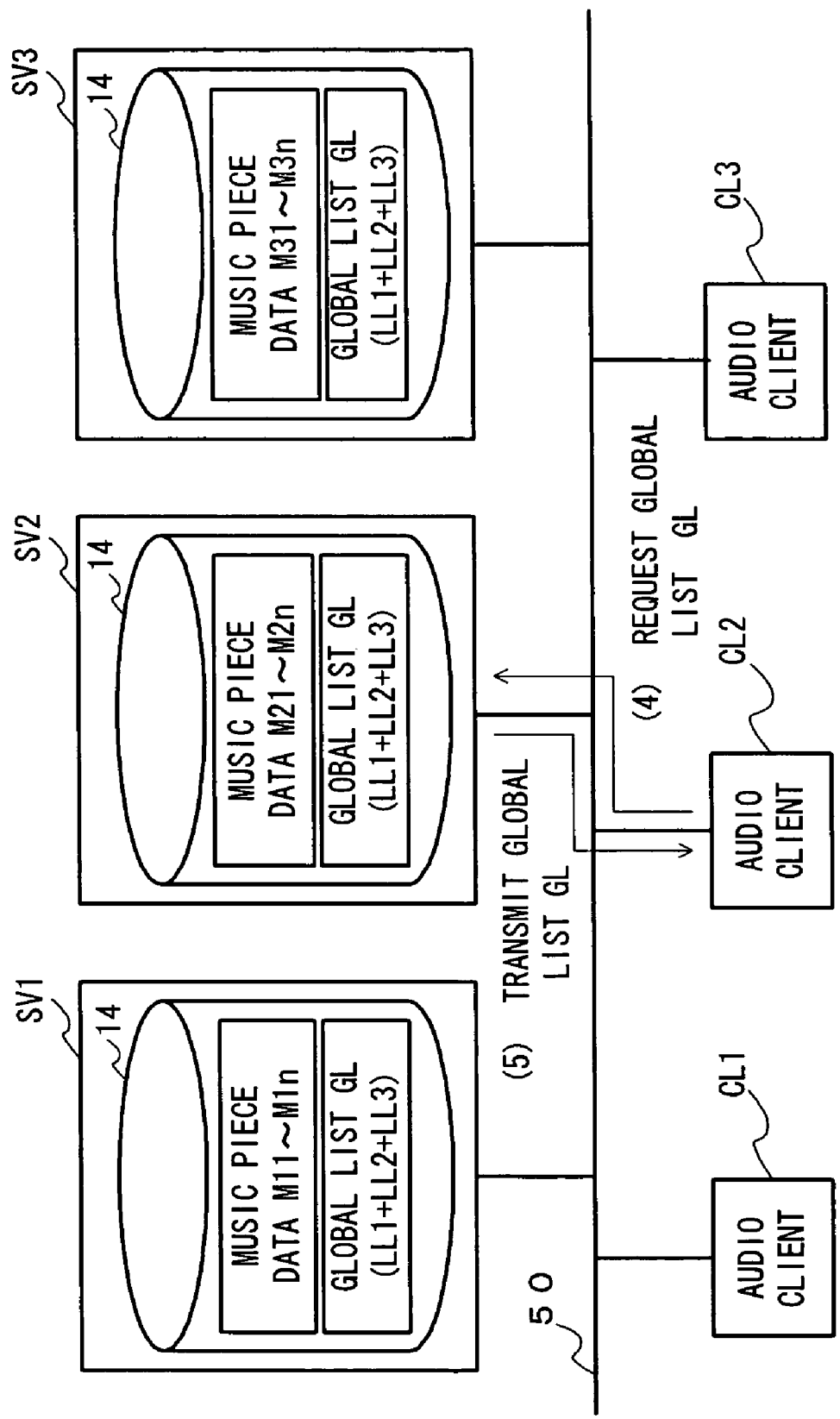

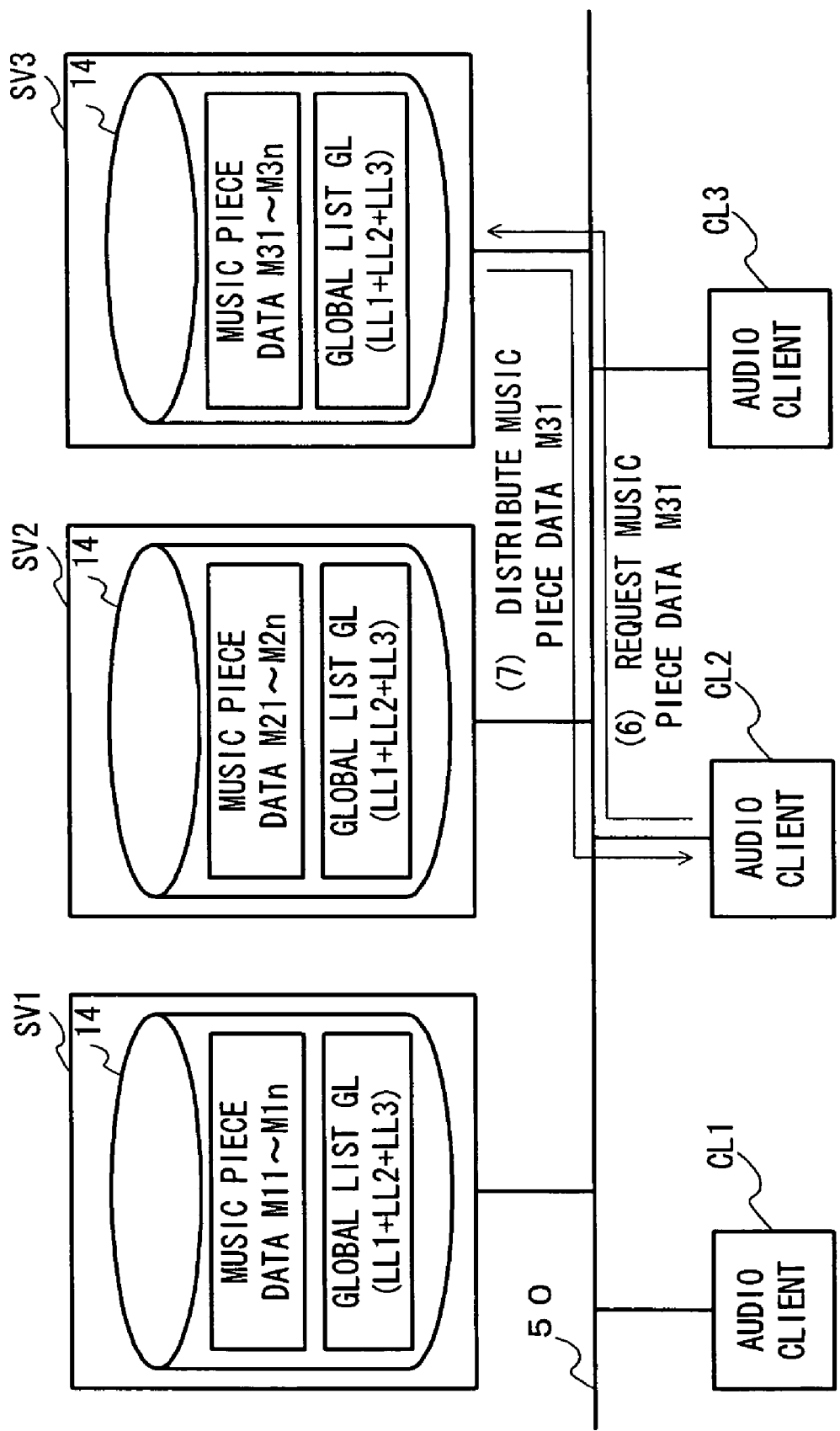

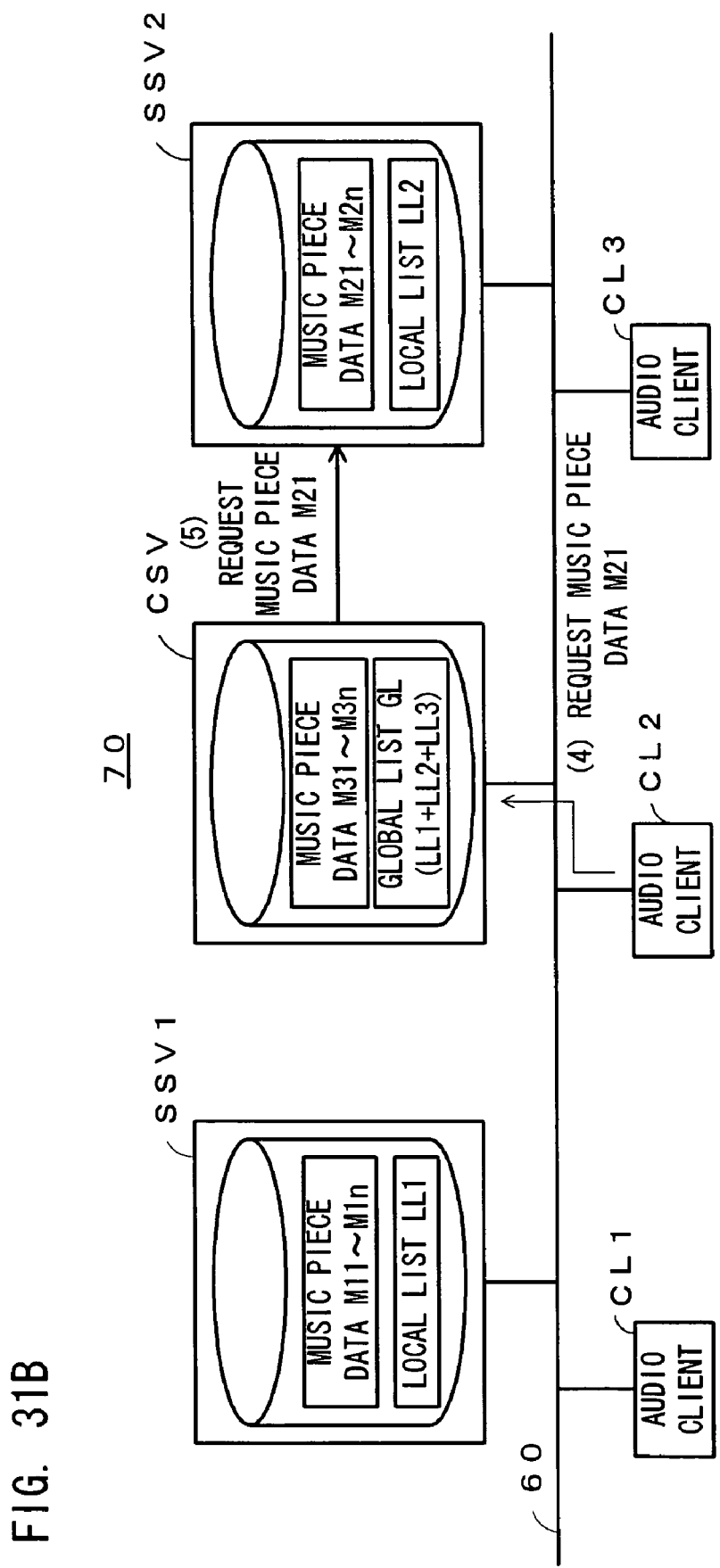

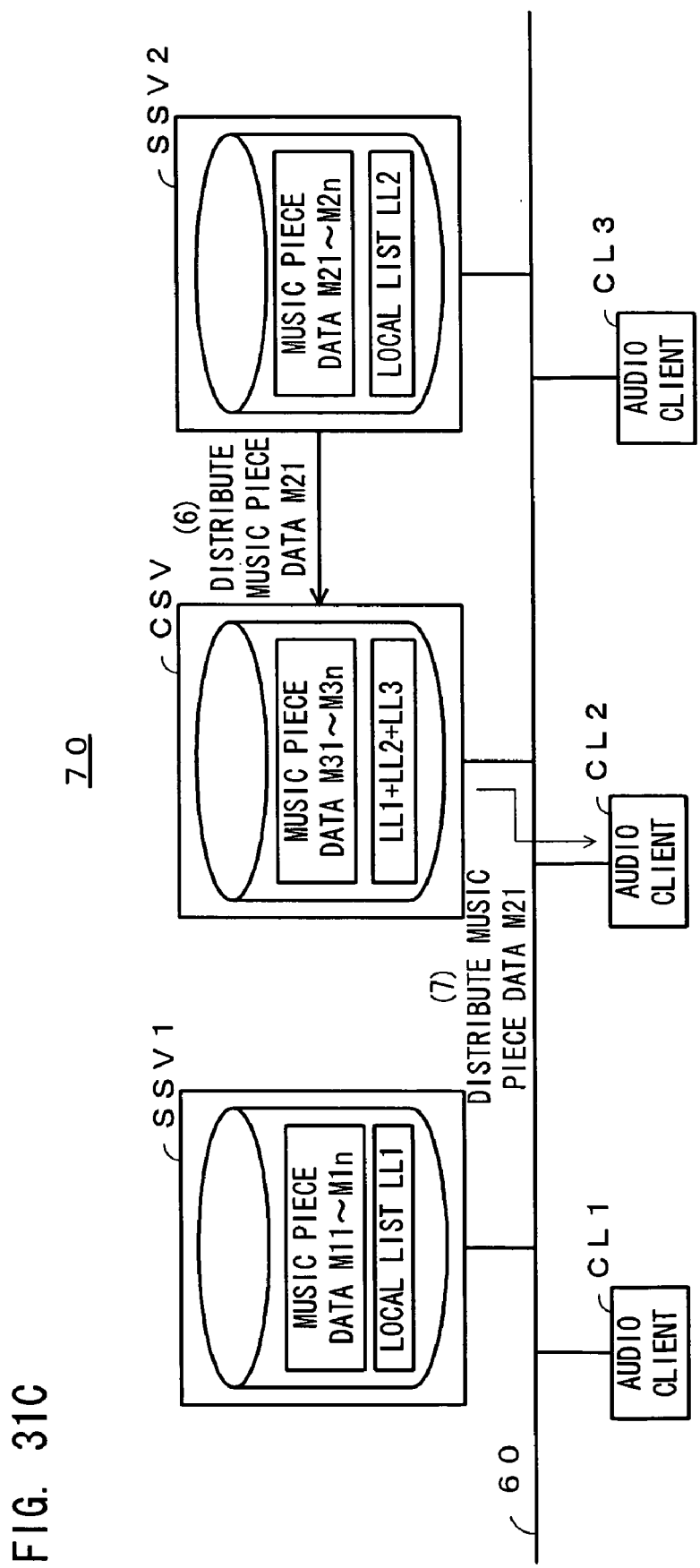

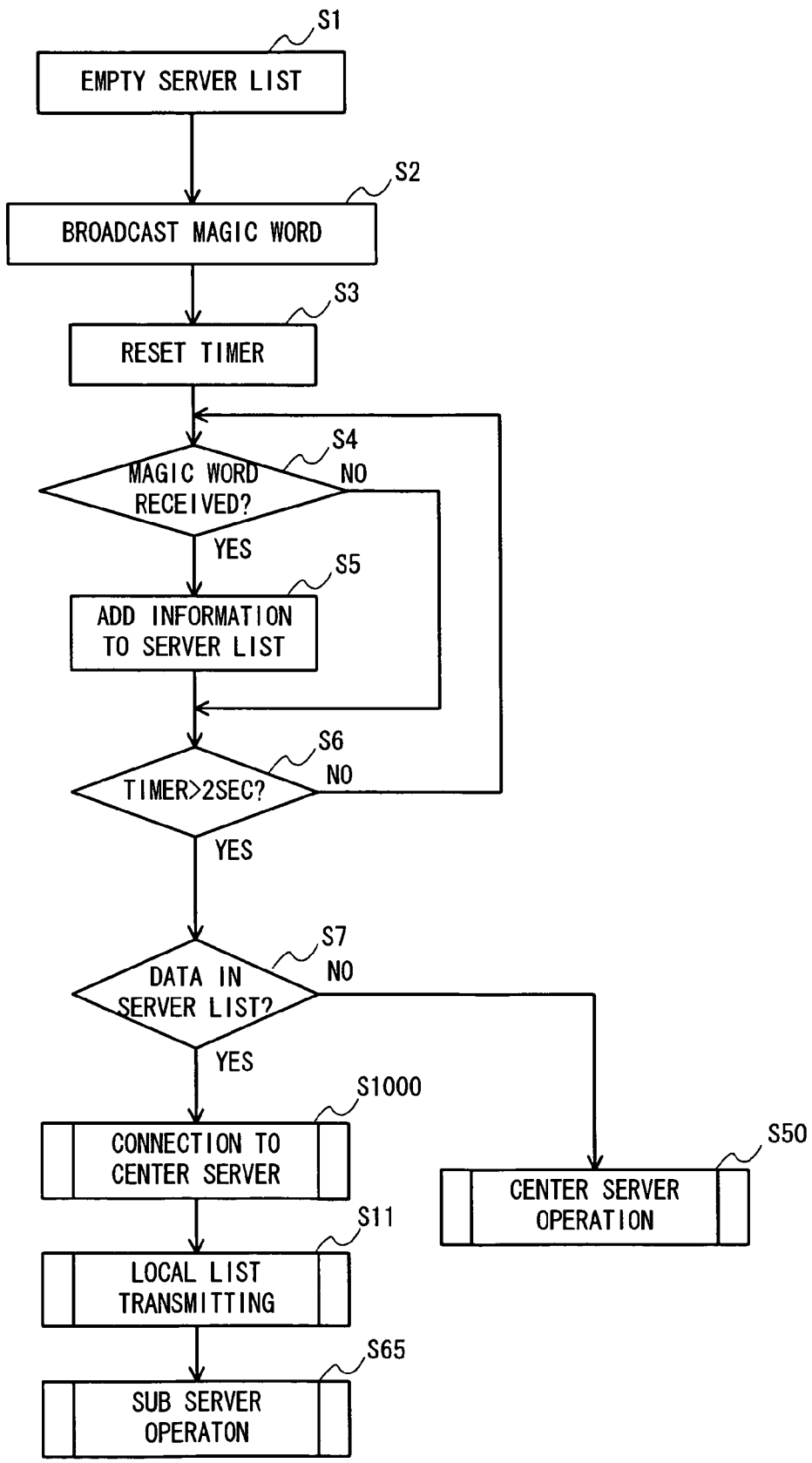

NETWORK AV SYSTEM

BACKGROUND OF THE INVENTION

1. Field of the Invention

The present invention relates to network AV (Audio/Video) systems reproducing audio sounds and/or video images, and more particularly, to a network AV system including a plurality of servers and clients.

2. Description of the Related Art

In recent years, a number of network AV systems using a client-server system have been provided. International Publication No. WO 03/102919 discloses a network AV system including a server storing a plurality of contents and an audio client connected through a LAN (Local Area Network). The audio client requests the server to provide a desired content and the server distributes the requested content to the audio client in response. The audio client reproduces the content distributed from the server.

The network AV system can increase the number of contents when the number of servers is increased. When however the stored contents are different among the servers, the audio client must find which server stores a desired content. It should be cumbersome to search through every server until the audio client finds the desired content.

When a server stops operating while it distributes a content to an audio client, the audio client cannot help but stops reproducing.

When an audio client tries to reproduce a content after reproducing another content distributed from a server, the audio client must re-connect with another server that stores the content desired to be reproduced.

SUMMARY OF THE INVENTION

It is one object of the invention to provide a network AV system that allows a client to easily find a desired content when a plurality of servers store a plurality of contents.

Another object of the invention is to provide a network AV system that allows a client to reproduce a content to the end when the server distributing the content stops operating.

Yet another object of the invention is to provide a network AV system that eliminates the necessity for a client to reconnect a server.

A network AV system includes a plurality of servers and one or more clients connected to at least one of the plurality of servers and each of the servers includes a storage device for storing a plurality of contents. At least one of the servers includes a global list storage device for storing a global list of a plurality of contents stored by the plurality of servers, and a global list transmitter. The global list transmitter transmits the global list to the client.

In the network AV system according to the invention, a server transmits a global list of a plurality of contents stored by a plurality of servers to a client. Therefore, the client does not have to request a list of contents for each of the servers storing contents and can easily find a desired content based on the global list.

Preferably, the client includes a content requester. The content requester requests a server to provide a content selected in the transmitted global list. At least one of the servers further includes a content returner. The content returner responds to the request from the client for returning the selected content to the client. The client further includes a reproducer. The reproducer reproduces the content returned from the server.

In this way, the client can easily select a desired content among the plurality of contents stored in the plurality of servers. The selected content is transmitted to the client from the server and the client can reproduce audio sounds or video images based on the content.

Preferably, the plurality of clients includes first and second clients. The first client includes a reproducing instructor. The reproducing instructor transmits a reproducing instruction for a content selected in the transmitted global list to the second client through the server. The second client includes a content requester. The content requester responds to the reproducing instruction to request the server to provide the selected content. At least one of the servers includes a content returner. The content returner responds to the request from the second client to return the selected content to the second client. The second client further includes a reproducer. The reproducer reproduces the content returned from the server.

In this way, the first client allows the second client to reproduce the content selected based on the global list. In short, the first client can control the second client.

A network AV system according to the invention includes a plurality of servers and one or more clients that can be connected to at least one of the plurality of servers. Each of the servers includes a storage device for storing a plurality of contents, a global list storage device for storing a global list of a plurality of contents stored by the plurality of servers, and a global list transmitter. The global list transmitter transmits the global list to the client.

In the network AV system according to the invention, a desired content can be selected in the global list of contents stored in the plurality of servers. The client can obtain a global list by requesting any of the plurality of servers. Therefore, the client can easily obtain a global list and can easily find a desired content among the plurality of contents stored in the plurality of servers.

Preferably, the client includes a content requester. The content requester requests the server to provide a content selected in the transmitted global list. Each of the servers further includes a content returner. The content returner responds to the request from the client to return the selected content to the client. The client further includes a reproducer. The reproducer reproduces the returned content.

In this way, the client can easily select a desired content among the plurality of contents stored by the plurality of servers. The selected content is transmitted from a server to a client, and the client can reproduce audio sounds or video images.

Preferably, the global list includes the addresses for the plurality of servers storing the plurality of contents and the content requester requests the selected content based on the address of the server.

In this way, the client can specify the server storing the desired content based on the global list. The client can easily specify the server storing the desired content among the plurality of servers, so that the content can easily be obtained.

Preferably, each of the servers further includes a local list storage device for storing a local list of a plurality of contents it stores, a local list transmitter and a global list updater. The local list transmitter transmits a local list to the other server. The global list updater updates the global list based on its own local list and a local list transmitted from the other server.

In this way, a server can obtain a local list from the other server and update the global list based on its own local list and the local list of the other server.

Preferably, the local list transmitter transmits the updated local list to the other server every time its own local list is updated, and the global list updater updates the global list every time its own local list is updated, or every time an updated local list is received.

In this way, a server can obtain the latest local lists from the other server and can update the global list to the latest version based on the obtained local lists and the latest local list of its own.

Preferably, each of the servers further includes a disconnection notifier. The disconnection notifier transmits disconnection notification to the other servers before disconnecting from the network AV system. The global list updater updates the global list in order to delete the local list of the server transmitting the disconnection notification in response to the disconnection notification.

In this way, the local list of the disconnected server is deleted from the global list when the server is disconnected.

Preferably, the global list transmitter transmits the updated global list to the client every time the global list updater updates the global list.

In this way, the server transmits the latest global list to the client every time the global list is updated. As a result, the client can select a desired content based on the latest global list.

Preferably, each of the servers includes a first establisher establishing connection at a command port for transmitting/receiving a command between the server and the other servers, and a second establisher establishing connection at a push port for forcibly transmitting a request from the other servers to the server.

In this way, when the server requests for the local list of another server (in other words, when the server is connected to another server as a client), data can be transmitted/received between the servers to the command port in order to obtain the local list. When the server instructs another server to obtain its own local list (in other words, when the server is connected to another server as a server), an instruction can be forcibly transmitted to the push port.

Preferably, the client includes a first command establisher establishing connection at a first command port for obtaining the global list from the server, and a second command establisher establishing connection at a second command port for obtaining the selected content from the server.

In this way, connection is established at the two command ports, the first command port for obtaining the global list and the second command port for obtaining contents, so that the traffic can be reduced. More specifically, when a content is obtained in the process of obtaining the global list, the global list and the content can quickly be received. When a client is disconnected from a server for obtaining the global list (that is different from a server for obtaining contents) and then is connected to the server for obtaining contents and the connection is not successful, the client is disconnected from the network. When connection is established with the first and second command ports, this can be prevented.

Preferably, each of the servers further includes a takeover notifier. The takeover notifier instructs the client to connect to a takeover server that takes over the operation of returning the selected content when the server ends operating while the content returner returns the selected content.

In this way, the client can immediately connect to the takeover server in response to an instruction from the takeover server notifier.

Preferably, each of the servers includes a takeover server selector and a transmitter transmitting a content. The takeover server selector selects a takeover server among the other servers. The transmitter transmitting a content transmits the selected content to the takeover server. The content requester in the client in the process of reproducing the selected content requests the takeover server to continue to return the rest of the selected content.

In this way, when the server ends operating while returning a content to the client, the server selects a takeover server among the other servers and transmits the content in the process of returning to the takeover server. The content can continue to be reproduced when the client requests the takeover server to return the rest of the content.

Preferably, each of the servers further includes a calculator calculating the data length of the already returned part of a content to the client, and determiner determining an obtaining start address indicating the address of the location of the content to be obtained from the takeover server by the client, and the takeover notifyier notifies the obtaining start address to the client.

In this way, the server can calculate the data length of the already returned part of the content to the client and specify the obtaining start location (address) of the content to be obtained from the takeover server by the client based on the data length. Consequently, the client can immediately obtain the rest of the content from the takeover server.

Preferably, each of the servers includes a server list storage device for storing a server list including the server information of the other servers connected to the server, and the takeover server selector selects the takeover server based on the server list.

In this way, the server can select the takeover server among the other servers stored in the server list.

Preferably, the takeover server selector selects a server connected to itself first as a takeover server among the other servers stored in the server list.

In this way, the server can select a server connected to itself first as a takeover server.

Preferably, the plurality of clients include first and second clients. The first client includes a reproducing instructor. The reproducing instructor transmits a reproducing instruction for a content selected in the transmitted global list to the second client through the server. The second client includes a content requester. The content requester responds to the reproducing instruction to request the server to provide the selected content. Each of the servers further includes a content returner. The content returner responds to the request from the second client to return the selected content to the second client. The second client further includes a reproducer. The reproducer reproduces the content returned from the server.

In this way, the first client allows the second client to reproduce a content selected based on the global list. In short, the first client can control the second client.

Preferably, the first client includes a server list storage device for storing a server list including the information of the server connected to the second client, and the reproducing instructor transmits a reproducing instruction to the second client through the server connected to the second client.

In this way, the first client can determine to which server the second client is connected based on the server list. Therefore, the server the second client is connected to can be specified and a reproducing instruction can be transmitted to the second client through the server.

A network AV system according to the invention includes a center server, a sub server, and one or more clients that can be connected to the center server and/or the sub server. The center server and the sub server each include a storage device for storing a plurality of contents. The center server further includes a global list storage device for storing a global list of a plurality of contents stored by the center server and the sub server, and a global list transmitter. The global list transmitter transmits the global list to the client.

In the network AV system according to the invention, the center server transmits the global list including of a plurality of contents stored by the center server and the sub server to the client. Therefore, the client does not have to request for a list of contents for each of the servers (center server and sub server) storing the contents and can easily find a desired content based on the global list.

Preferably, the client includes a content requester. The content requester requests the center server or the sub server to provide a content selected in the transmitted global list. At least one of the center server and the sub server further includes a content returner. The content returner responds to the request from the client to return the selected content to the client. The client further includes a reproducer reproducing the content returned from the center server or the sub server.

In this way, the client can easily select a desired content among a plurality of contents stored by a plurality of servers (center server and sub server). The selected content is transmitted from the server to the client and the client can reproduce audio sounds or video images based on the content.

Preferably, the content requester requests the center server to provide the selected content. The center server includes the content returner, and the center server further includes a server specifier and a content obtainer. Tue server specifier specifies a server storing the selected content in response to the request from the client based on the global list. The content obtainer obtains the selected content from its own storage device when the specified server is the center server and obtains the selected content from the storage device of a sub server when the specified server is the sub server. The content returner returns the content obtained by the content obtainer to the client.

In this way, the client requests the selected content to the center server. The center server specifies a server (among the center server and the sub server) that stores the selected content based on the global list in response to the request from the client. The center server obtains the content from the specified server and returns the obtained content to the client. More specifically, the center server has a relay function between the client and the sub servers. Consequently, the client can connect to the center server to obtain both the global list and contents.

Preferably, the global list includes the addresses of a plurality of servers storing a plurality of contents, and the server specifier specifies the address of the server storing a content requested by the content requester.

In this way, the center server can easily specify a server (among the center server and the sub server) storing a content based on the address of the server included in the global list.

Preferably, the global list includes the addresses of a plurality of servers storing a plurality of contents, and the content requester requests the sub server specified based on the global list.

In this way, the client can easily specify a server (among the center server and the sub server) based on the global list. Consequently, the client can directly request the server storing the selected content to provide the content.

Preferably, the center server and the sub server each further includes a local list storage device for storing a local list of a plurality of contents stored by them. The sub server further includes a local list transmitter. The local list transmitter transmits the local list to the center server. The center server further includes a global list updater. The global list updater updates the global list based on its own local list and the local list transmitted from the sub server.

In this way, the center server obtains the local list from the sub server and updates the global list based on its own local list and the local list of the other server.

Preferably, the local list transmitter transmits an updated local list every time its own local list is updated, and the global list updater updates the global list every time its own local list is updated or an updated local list is received.

In this way, the center server can obtain the latest local list from the sub server and update the global list to the latest version based on the obtained local list and its own local list.

Preferably, the sub server further includes a disconnection notifier. The disconnection notifier transmits disconnection notification to the center server before the server is disconnected from the network AV system, and the global list updater updates the global list in order to delete the local list of the sub server transmitting the disconnection notification in response to the disconnection notification.

In this way, the local list of the disconnected sub server is deleted from the global list when the server is disconnected.

Preferably, the global list transmitter transmits the updated global list to the client every time the global list updater updates the global list.

In this way, the center server transmits the latest global list to the client every time the global list is updated. Consequently, the client can select a desired content based on the latest global list.

Preferably, the center server includes a first establisher establishing connection at a command port for transmitting/receiving a command between the center server and the sub server, and a second establisher establishing connection at a push port for forcibly transmitting a request to the center server.

In this way, when the center server requests for the local list of a sub server or a content (in other words, when the center server is connected to the sub server as a client), data is transmitted/received between the servers with the command ports, and the local list and the content can be obtained. When the center server transmits an instruction or notification to a sub server (in other words, when the center server is connected to the sub server as a server), the instruction or notification is forcibly transmitted to the push port.

Preferably, the center server and the sub server each includes a local list storage device for storing a local list of a plurality of contents stored by them. The center server further includes a first command port establisher establishing connection at a first command port for obtaining the local list from the sub server, an obtainer obtaining the local list of the sub server after establishing connection at the first command port, an updater updating the global list based on the obtained local list and its own local list, and a second command port establisher establishing connection at a second command port for obtaining the selected content from the sub server specified by the server specifier.

In this way, connection is established at the two command ports, the first command port for the center server to obtain a local list from a sub server and the second command port for the center server to obtain a content from a sub server, so that the traffic can be reduced. More specifically, when a content is obtained in the process of obtaining a local list, both the local list and the content can quickly be received.

Preferably, the client includes a first command port establisher establishing connection at a first command port for obtaining the global list from the center server, and a second command port establisher establishing connection at a second command port for obtaining the selected content from the center server.

In this way, connection is established at the two command ports, the first command port for the client to obtain the global list from the center server and the second command port to obtain a content, so that the traffic can be reduced. More specifically, when a content is obtained in the process of obtaining the global list, both the global list and the content can quickly be received.

Preferably, the center server further includes a takeover notifier. The takeover notifier instructs the client to connect to a takeover server that takes over the operation of the center server when the center server ends operating.

In this way, the client can receive an instruction from the takeover notifier and immediately connect to the takeover server.

Preferably, the center server further includes a takeover server selector and a center server takeover instructor. The takeover server selector selects the takeover server among the sub servers. The center server takeover instructor instructs the sub server selected by the takeover server selector to take over the operation of the center server.

In this way, the center server selects a takeover server to take over the operation of the center server among the sub servers and instructs the takeover server to take over the operation of the center server. Consequently, when the center server ends operating, another server (sub server) serves as the center server.

Preferably, the center server further includes a calculator calculating the data length of the returned part of a content to the client when the center server ends operating while returning the content obtained by the content obtainer to the client, and a determiner determining an obtaining start address indicating the address of the location of the content to be obtained from the takeover server by the client based on the data length calculated by the calculator. The takeover notifier notifies the obtaining start address to the client.

In this way, the server can calculate the data length of the already returned part of a content and specify the obtaining start location (address) of the content data to be obtained from the takeover server (or from another sub server through the takeover server) by the client. Consequently, the client can quickly obtain the rest of the content from the takeover server.

Preferably, the center server further includes a transmitter transmitting a content it stores to the takeover server when the center server ends operating while returning the content to the client by the content returner.

In this way, when the center server in the process of returning a storing content ends operating, the center server transmits the returned content to the takeover server. The client can request the takeover server to provide the rest of the returned content and continue to reproduce the content.

Preferably, the center server includes a server list storage device for storing a server list including the identification information of the sub server, and the takeover server selector selects the takeover server based on the server list.

In this way, the server can select the takeover server among the other servers stored in the server list.

Preferably, the plurality of clients include first and second clients.

The first client includes a reproducing instructor. The reproducing instructor transmits a reproducing instruction for a content selected in the transmitted global list to the second client through the center server. The second client includes a content requester. The content requester responds to the reproducing instruction to request the center server or the sub server to provide the selected content. At least one of the center server and the sub server further includes a content returner. The content returner responds to the request from the second client to return the selected content to the second client, and the second client further includes a reproducer. The reproducer reproduces the content returned from the center server or the sub server.

In this way, the first client allows the second client to reproduce the content selected based on the global list. In short, the first client can control the second client.

BRIEF DESCRIPTION OF THE DRAWINGS

FIG. 1 is a functional block diagram showing the general configuration of a global list server system;

FIGS. 2A and 2B is a schematic diagram for use in illustration of the global list server system shown in FIG. 1;

FIG. 31A to 31C is schematic view of the center server system in FIG. 30;

FIG. 32 is a flowchart for use in illustration of operation when a server is activated in the center server system in FIG. 30;

DETAILED DESCRIPTION OF THE PREFERRED EMBODIMENTS

Figure 3:
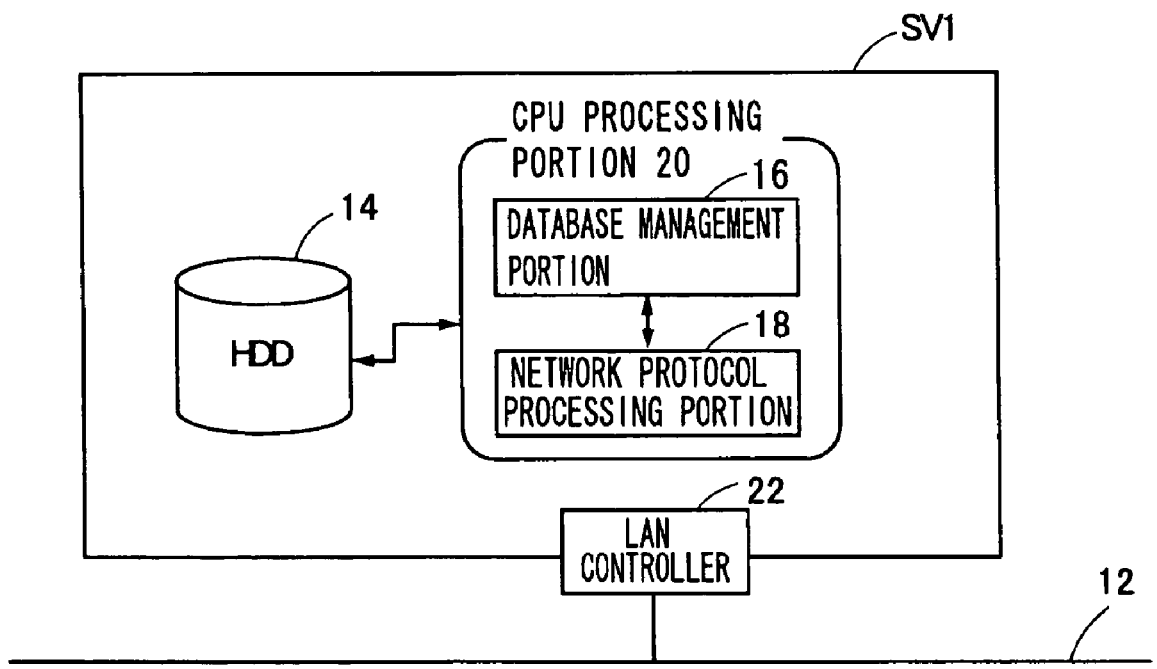
FIG. 3 is a functional block diagram of the configuration of a server in FIG. 1.

Now, an embodiment of the invention will be described in detail in conjunction with the accompanying drawings, in which the same or corresponding portions will be denoted by the same reference characters and their description will equally be applied.

TABLE OF CONTENTS

1. Global List Server System
1. 1. General Structure
1. 2. Configuration
1. 2. 1. Server Configuration
1. 2. 2. Configuration of Audio Client
1. 3. System Operation
1. 3. 1. Server Activation Processing
1. 3. 2. Server Operation after Activation Processing
1. 3. 2. 1 Connection Operation with Other Servers
1. 3. 2. 2. Connection Operation with Audio Client
1. 3. 2. 3. Distributing Operation
1. 3. 2. 4. List Updating Operation
1. 3. 2. 4. 1. When Its Own Local List Is Updated
1. 3. 2. 4. 2. When Local List of Another Sever IS Updated
1. 3. 2. 4. 3 When Another Server Is Disconnected
1. 3. 2. 5. Ending Operation
1. 4. Global List Server System Including Controller
1. 4. 1. General Structure
1. 4. 2. Configuration
1. 4. 3. System Operation
1. 4. 3. 1. Handle Obtaining Operation
1. 4. 3. 2. Global List Obtaining Operation and Updating Operation
1. 4. 3. 3. Monitoring Operation
1. 4. 3. 4. Control Operation
2. Center Server System
2. 1. General Structure
2. 2. System Operation
2. 2. 1. Server Activation Processing
2. 2. 2. Center Server Operation after Activation Processing
2. 2. 2. 1. Distribution Operation
2. 2. 2. 2. List Updating Processing
2. 2. 2. 2. 1. When Its Own local List Is Updated
2. 2. 2. 3. Ending Operation
2. 2. 3. Sub Server Operation after Activation Processing
2. 2. 3. 1. Connection Operation
2. 2. 3. 2. List Updating Operation
2. 2. 3. 2. 1. When Its Own Local List Is Updated
2. 2. 3. 2. 2. When Local List of Another Server Is Updated
2. 2. 3. 2. 3. When Another Sever Is Disconnected
2. 2. 3. 3. Ending Operation
2. 3. Center Server System Including Controller
2. 3. 1. System Operation
3. Other Embodiments
3. 1. File Sharing Server System
3. 2. Local List Transmitting System
   1. Global List Server System
   1. 1. General Structure Referring to FIG. 1, a global list server system 10 includes a plurality of servers SV1 to SV3 for storing a large number of music piece data and a plurality of audio clients CL1 to CL3 for reproducing music based on music piece data from the servers SV1 to SV3.

The servers SV1 to SV3 may store music piece data and/or video data or various other kinds of digital contents. Hereinafter, music piece data will be described by way of illustration. FIG. 1 shows audio clients CL1 to CL3, but at least one such audio client CL is necessary.

These servers and audio clients are connected with one another through a LAN (Local Area Network) 50, while they may be connected by any appropriate means for building up a computer network such as USB and IEEE1394. When a LAN is employed, the standard TCP/IP protocol for a PC (personal computer) is preferably employed, but the UDP protocol may be employed, in other words, the protocol is not exactly specified. In FIG. 1, the servers SV and the audio clients CL are connected as they branch from the basic line of the LAN 50, while when 10BASE-T or 100BASE-TX is employed, they are connected for example in a star pattern around a hub.

The HDD (Hard Disk Drive) 14 of the server SV1 includes a plurality of music piece data M11 to M1n (n: natural number). The HDD 14 of the server SV2 includes a plurality of music piece data M21 to M2n, and the HDD 14 of the server SV3 includes a plurality of music piece data M31 to M3n.

A global list GL is stored in the HDD 14 in each of the servers SV1 to SV3. The global list GL includes the titles, artists, genres and the like of music piece data in the form of a list. The global list GL includes the list of music piece data M11 to M1n, M21 to M2n, and M31 to M3n stored by the servers SV1 to SV3 belonging to the LAN 50. The list of the music piece data M11 to M1n is referred to as a local list LL1, the list of music piece data M21 to M2n as a local list LL2, and music piece data M31 to M3n as a local list LL3. In this way, the global lists GL stored in the HDDs 14 of the servers SV1 to SV3 include the local lists LL1 to LL3.

When the servers SV each update music piece data they store, they transmit the updated local lists LL1 to LL3 to the other servers SV. More specifically, when new music piece data is registered in the server SV1, the server SV1 updates the local list LL1. At the time, the server SV1 transmits the updated local list LL1 to the servers SV2 and SV3 ((1) in FIG. 1). The servers SV2 and SV3 receive the updated local list LL1 and replace the local list LL1 before updating in the global list GL with the received list. Similarly, when new music piece data is registered in the server SV2, the server SV2 updates the local list LL2 and transmits the updated local list LL2 to the servers SV1 and SV3 ((2) in FIG. 1). When new music piece data is registered in the server SV3, the server SV3 updates the local list LL3 and transmits the updated local list LL3 to the servers SV1 and SV2 ((3) in FIG. 1). By the above described operation, the global lists GL in the servers SV always include the latest local lists LL1 to LL3.

Now, the operation of the global list server system 10 in reproducing a music piece using an audio client CL will briefly be described. Referring to FIG. 2A, when music piece data M31 is reproduced by the audio client CL2, the audio client CL2 requests an arbitrary server SV to provide the global list GL. In FIG. 2A, the audio client CL2 requests the server SV2 to provide the global list GL ((4) in FIG. 2A), while the audio client CL2 may request the server SV1 or SV3. The server SV2 transmits the global list GL based on the request from the audio client CL2 ((5) in FIG. 2A). The user of the audio client CL2 refers to the transmitted global list GL and selects the music piece M31 that the user desires to reproduce. After selecting the music piece, as shown in FIG. 2B, the audio client CL2 requests the server SV3 to provide the music piece data M31 ((6) in FIG. 2B). The server SV3 receives the request from the audio client CL2 and distributes the music piece data M31 to the audio client CL2 ((7) in FIG. 2B).

By the above described operation, in the global list server system 10, once the audio client CL obtains the global list GL from any of the servers SV on the LAN 50, the audio client can select any music piece stored in the plurality of servers SV. Therefore, the audio client CL does not have to request each of the plurality of servers SV on the LAN to provide the local list LL in order to select music piece data M stored in the servers SV.

1. 2. Configuration
1. 2. 1. Server Configuration

Referring to FIG. 3, the server SV1 includes an HDD (Hard Disk Drive) 14 for storing compressed digital music piece data, a CPU processing portion 20 including a database management portion 16 and a network protocol processing portion 18, and a LAN controller 22 that transmits/receives signals between the server SV1 and the LAN 50. The HDD 14 stores music piece data M11 to M1n. The servers SV2 and SV3 have the same structure as that of the server SV1. The servers SV1 to SV3 are connected to one another.

The HDD 14 stores a server list as given in Table 1.

TABLE 1

| server list | |
|---|---|
| server ID | server information |
| 1 | server information of server SV2 |
| 2 | server information of server SV3 |
| . | . |
| . | . |
| . | . |

Referring to Table 1, the server list includes server IDs and server information. The server IDs are the identifiers of the other servers SV2 and SV3 connected with the server SV1. The server ID is sequentially registered in response to a connection request from the server SV1. When the server SV2 responds to the connection request from the server SV1 first and then the server SV3 does, the server information of the server SV2 is registered with the server ID=1, and the server information of the server SV3 is registered with the server ID=2 as in Table 1.

Now, the server information of the server SV2 will be described as an example of the server information.

TABLE 2

| server information | |
|---|---|
| address | IP address (server specifying information) |
| name | server name: server SV2 |
| LibList | local list LL2 |

Referring to Table 2, the server information includes server specifying information, the name of the server and the local list LL2. The server specifying information includes a server address, a port number and the like to specify the location of the server SV2. The server address refers to the IP (Internet Protocol) address or MAC address of the server SV The Local list LL2 is the list of the music piece data M21 to M2n stored in the server SV2. The local list LL2 is shown in Table 3.

TABLE 3

| local list LL2 music piece information |
|---|
| music piece information I21 |
| music piece information I22 |
| . |
| . |
| . |
| music piece information I2n |

Referring to Table 3, the local list LL2 includes music piece information 121 to 12n related to the music piece data M21 to M2n for a plurality of music pieces stored in the HDD 14 of the server SV2. The details of the music piece information 12n are given in Table 4.

TABLE 4

| | music piece information I2n |
|---|---|
| Filename | file name |
| title | music piece title |
| artist | artist |
| album | album title |
| genre | genre |
| length | length of piece (time) |
| type | file format |
| songID | music piece ID |
| Servinfo | server specifying information |

Referring to Table 4, the music piece information I2$n$ includes a file name, a music piece title, an artist name, an album title, a genre, the lenth of the piece (time), a file format, a music piece ID and server specifying information. The file name has the full path of the HDD 14 that stores the music piece data M.

The HDD 14 further includes a client list shown in Table 5.

TABLE 5

| client list | |
|---|---|
| client index | client information |
| 1 | client information 1 |
| 2 | client information 2 |
| 3 | client information 3 |
| 4 | client information 4 |
| . | . |
| . | . |
| . | . |
| . | . |
| . | . |

The client list includes information related to devices connected to the server SV1 as clients (client information). The devices connected to the server SV1 as clients are audio clients CL and servers SV. The client information is registered corresponding to a client index. The client index is an identifier allocated to each device connected to the server SV1. The client information is given in Table 6.

TABLE 6

| | client information |
|---|---|
| flag | with or without connection |
| type | client |
| status | present status |
| volume | present volume |
| productID | product ID |
| firmwareID | firmware ID |
| hostname | client name |
| songID | music piece ID |
| curkey | list construction key |

Referring to Table 6, "flag" in the client information indicates whether the client is connected to the server SV1. If there is the connection, the "flag" is set, and if there is no connection, the "flag" is reset. The term "type" indicates the client type of the device connected to the server SV1. When the device connected to the server SV1 is an audio client CL, the client type is "audio client." When the connected device is a server SV, the client type is "server."

Information after "status" is recorded when the client type is "audio client." The term "status" indicates the present status such as reproducing, stop, completion, pause, fast-forwarding, and reversing. The term "volume" indicates the present volume (sound volume) value. The term "productID" indicates a product ID (machine information) provided for each client type. The term "firmwareID" is a firmware ID indicating the version of firmware installed in the audio client CL. The term "hostname" indicates a client name provided for the client device. The term "songID" indicates a music piece ID to identify the presently reproduced music piece. The term "curKey" indicates a list construction key necessary for producing a music list being presently reproduced.

The list construction key includes a filter kind and a keyword. The filter kind is based on a title, a genre, an artist, an album title, a file name or the like. If for example the filter kind is about an artist name, the name of a desired artist is recorded as a keyword. A desired music list can be produced by searching through the global list GL using the list construction key, details of which is disclosed by International Publication No. WO 03/102919 as described above.

The HDD 14 of the server SV further includes a presentation content list PL as given in Table 7.

TABLE 7

| presentation content list PL storage location of music piece information |
|---|
| storage location of music piece information I11 |
| . |
| . |
| . |
| storage location of music piece information I1n |
| storage location of music piece information I21 |
| . |
| . |
| . |
| storage location of music piece information I2n |
| storage location of music piece information I31 |
| . |
| . |
| . |
| storage location of music piece information I3n |

Referring to Table 7, the presentation content list PL records the storage locations of music peace information I11 to I1$n$, I21 to I2$n$, and I31 to I3$n$ for music piece data (M11 to M1$n$, M21 to M2$n$, and M31 to M3$n$) in the local lists LL1 to LL3. More specifically, the locations in the HDD 14 where those pieces of information are stored are recorded. When the server SV1 receives a request for the global list GL from the audio client CL, the server SV1 updates (produces) the global list GL given in Table 8 based on the presentation content list PL and transmits the list to the audio client CL.

TABLE 8

| global list GL |
|---|
| music piece information I |
| music piece information I11 |
| . |
| . |
| . |
| music piece information I1n |
| music piece information I21 |
| . |
| . |
| . |
| music piece information I2n |
| music piece information I31 |
| . |
| . |
| . |
| music piece information I3n |

Referring to Table 8, the global list GL includes music piece information I11 to I1n, I21 to I2n, and I31 to I3n in the local lists LL1 to LL3.

1. 2. 2. Configuration of Audio Client

Figure 4:
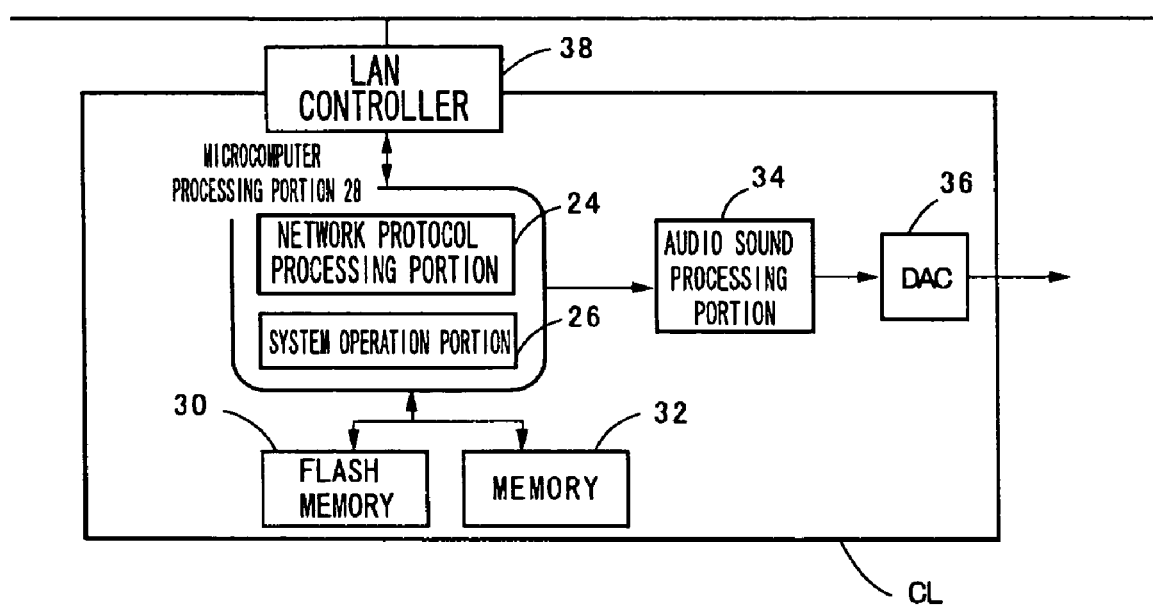
FIG. 4 is a block diagram of the configuration of an audio client in FIG. 1.

Referring to FIG. 4, the audio client CL includes a microcomputer processing portion 28 including a network protocol processing portion 24 and a system operation portion 26, a flash memory 30, a memory 32 that temporarily stores sequentially input compressed digital music piece data and sequentially outputs the stored data, an audio sound processing portion 34 that decodes compressed digital music piece data to produce non-compressed digital music piece data, a D/A converter (DAC) 36 that converts digital music piece data into analog music piece data and a LAN controller 38 that transmits/receives signals between the audio client CL and the LAN 50. The audio client CL does not have to include an HDD for storing music piece data M unlike the servers SV

1. 3. System Operation
1. 3. 1. Server Activation Processing

The processing of activating the servers SV in the global list server system 10 will be described. When the servers SV2 and SV3 in FIG. 1 operate and the server SV1 is activated, the server SV1 searches for other servers SV (SV2 and SV3) on the LAN 50 and obtains the local lists LL2 and LL3 from the servers SV2 and SV3 in an activated state after the searching. Now, the details of the process will be described. While the activation of the server SV1 in FIG. 1 will be described as an example in the following, the other servers SV (SV2 and SV3) are activated in the same manner.

Figure 5:
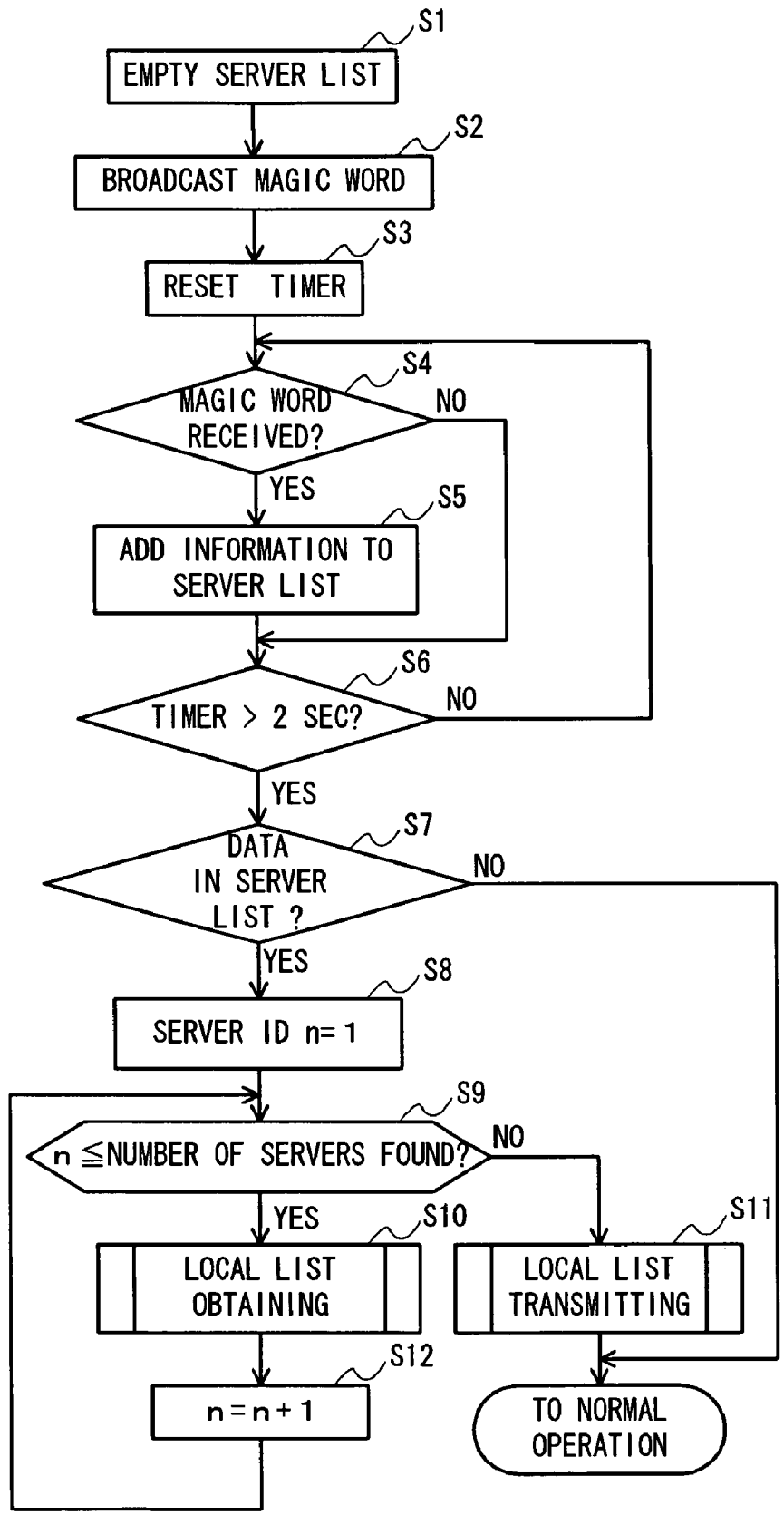
FIG. 5 is a flowchart for use in illustration of the operation when a server is activated in the global list server system in FIG. 1.

Referring to FIG. 5, the server SV1 clears the server list in HDD 14 before searching for other servers SV operating on the LAN 50 (S1). The server SV1 then searches for other servers SV operating on the LAN 50. More specifically, the server SV1 broadcasts a predetermined magic word at a command port based on the UDP protocol (S2). The servers SV2 and SV3 operating on the LAN 50 receive the magic word broadcast in step S2 at the search ports and return the same magic word to the server SV1 that has broadcast it. At the time, the servers SV2 and SV3 transmit server specifying information (IP address) to specify themselves to the server SV1.

Then, the server SV1 resets the timer to count time after broadcasting the magic word (S3) and then determines whether or not the magic word is returned (S4). If the magic word is returned (i.e., if another server SV is found), the server SV1 records the server specifying information of the server SV in the server list (S5). At the time, the server SV1 provides the server SV with a server ID in the order in which the magic word has been returned and registers the server specifying information. When for example the magic word has been returned by the server SV2 and then by the server SV3, the server SV1 registers the server specifying information of the server SV2 with the server ID=1 and the server specifying information of the server SV3 with the server ID=2.

After the server specifying information is registered, it is then determined whether or not for example two seconds has passed (S6) and the process returns to step S4 if the period has not passed. More specifically, the server SV1 waits for a response from another server SV for two seconds.

Note that if the magic word is not returned in step S4 (if no other server SV is found), the server SV1 determines whether or not two seconds has passed after broadcasting the magic word (S6), and the process returns to step S4 if the period has not passed.

If two seconds has passed after broadcasting, the server SV1 determines whether or not the server specifying information is registered in the server list (S7). If the server list is empty, in other words, if there is no server specifying information recorded in the server list, the server SV1 ends the activation processing. Meanwhile, if the server list is not empty, in other words, if the server specifying information of at least one server SV is recorded, the server SV1 carries out connection processing to the server SV recorded in the server list (S8 to S12).

To begin with, it is set that the counter value n=1 (S8) and it is determined whether or not the number of servers registered in the server list is not less than n (S9). If the number of the servers registered in the server list is not less than n based on the result of determination, the server SV1 obtains the local list LL of the server SV whose server ID=1 (S10). The local list obtaining processing will be described later. After the local list obtaining processing, the count value n is incremented (S12) and the process returns to step S9 and continues the local list obtaining processing. More specifically, the local list obtaining processing is continued until the local lists LL (LL2 and LL3) of all the servers SV (SV2 and SV3) registered in the server list are obtained. Now, the process of obtaining the local list in step S10 will be described.

Figure 6:
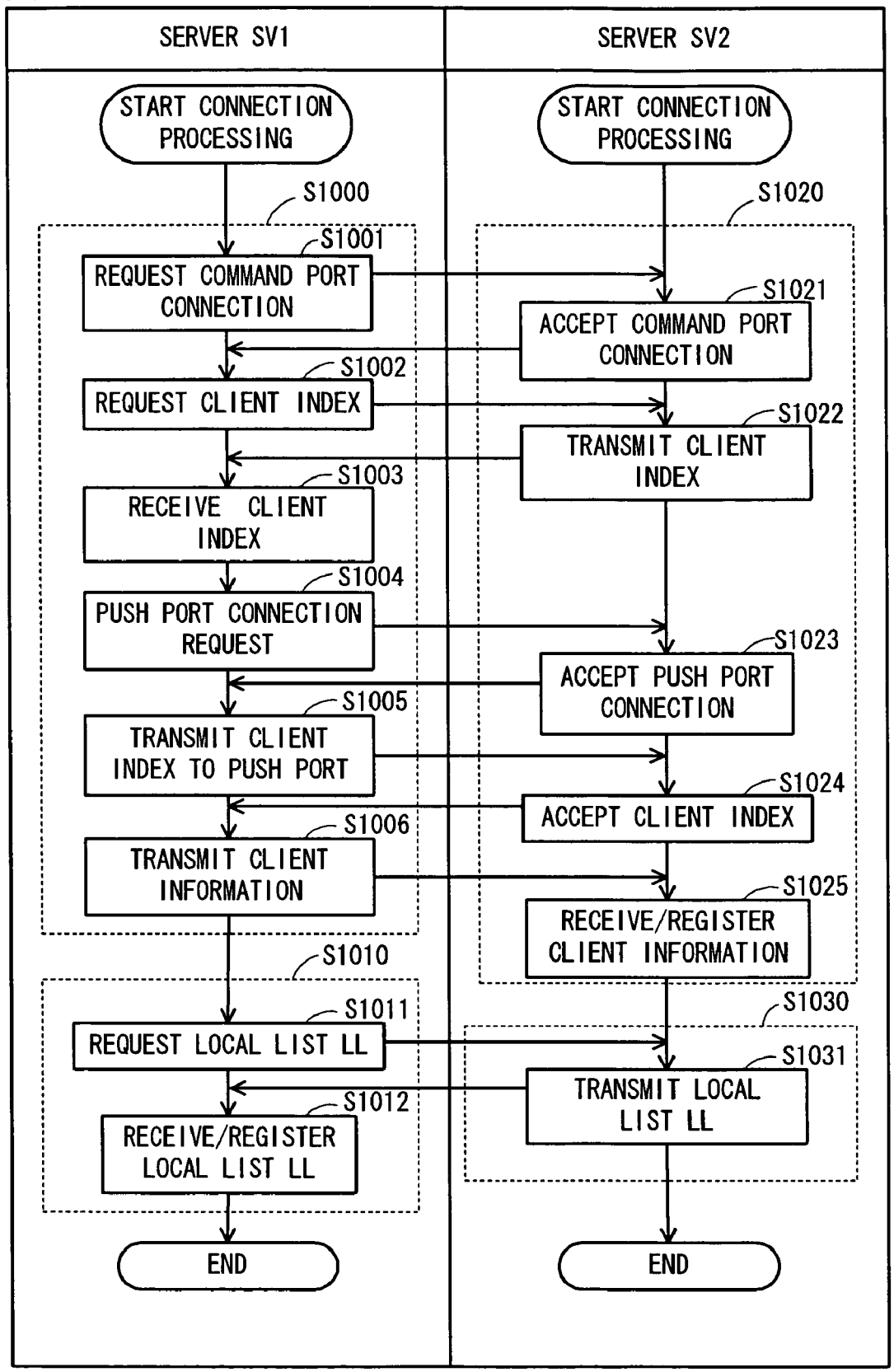
FIG. 6 is a flowchart for use in illustration of the details of the operation in step S10 in FIG. 5.

When the server SV1 obtains the local list LL2 of the server SV2, the server SV1 establishes connection with the server SV2 as shown in FIG. 6 (connection processing: S1000) and then obtains the local list LL2 (list obtaining processing: S1010).

When the server SV1 carries out the connection processing (S1000), the server SV2 carries out connection response processing (S1020). More specifically, the server SV1 produces a socket based on the IP address and the command port of the server SV2 registered in the server list according to TCP (Transmission Control Protocol) and requests connection to the server SV2 using the socket (S1001). The command port is a port used to receive a command from the server SV1 to the server SV2 and transmit a response from the server SV2 to the server SV1. The server SV2 accepts connection at the command port (S1021), so that the server SV1 establishes connection to the command port of the server SV2.

The server SV1 then transmits a client index request command to the command port (S1002). The server SV2 responds to the client index request command to return a client index from the command port to the server SV1 (S1022), and the server SV1 receives the index (S1003). The client index request command is a command for the server SV1 to request the server SV2 to provide the client index.

The server SV1 then produces a socket using the IP address and push port of the server SV2 according to TCP and requests connection to the server SV2 with the socket (S1004). The push port is a port used to transmit a request from the server SV2 to the server SV1. The server SV2 accepts connection at the push port (S1023), and the server SV1 then establishes connection to the push port of the server SV2. Note however that the server SV2 still cannot specify which server SV or audio client CL is connected to its push port at the point. Therefore, the server SV1 transmits the client index received in step S1003 to the push port of the server SV2 (S1005). The server SV2 receives the client index and specifies that the server SV1 is connected to the push port (S1024). After the connection to the push port is established, the server SV1 transmits its client information to the server SV2 (S1006). The server SV2 receives the transmitted client information and registers it in a client list as shown in Table 5.

When the server SV1 carries out connection processing (S1000), the server SV2 carries out connection response processing (S1020), and the server SV1 is connected to the server SV2 as a result. Then, the server SV1 obtains the local list LL2 of the server SV2 (list obtaining processing: S1010). At the time, the server SV2 transmits the local list LL2 (list transmitting processing: S1030). More specifically, the server SV1 transmits a request command for the local list LL2 to the server SV2 using the command port (S1011). The server SV2 receives the request command from the server SV1 and transmits the local list LL2 of the server SV2 to the SV1 (S1031). The server SV1 receives the local list LL2 from the server SV2 and registers the local list LL2 in the HDD 14 (S1012). At the time, the entire server information of the server SV2 is registered in the server list in the server SV1. Note that the server SV1 carries out the same operation to the server SV3 and registers the server information of the server SV3 including the local list LL3 in the server list.

By the above described operation, the server SV1 establishes connection to all the servers SV2 and SV3 registered in the server list and obtains all the local lists LL2 and LL3.

Referring back to FIG. 5, after the local lists LL of all the servers SV operating on the LAN 50 are obtained, the count value n is more than the number of servers in the server list (S9), and therefore the server SV1 transmits its own local list LL1 to the other servers SV on the LAN 50 (local list transmitting processing: S11). Now, the details of the local list transmitting processing in step S11 will be described.

Figure 7:
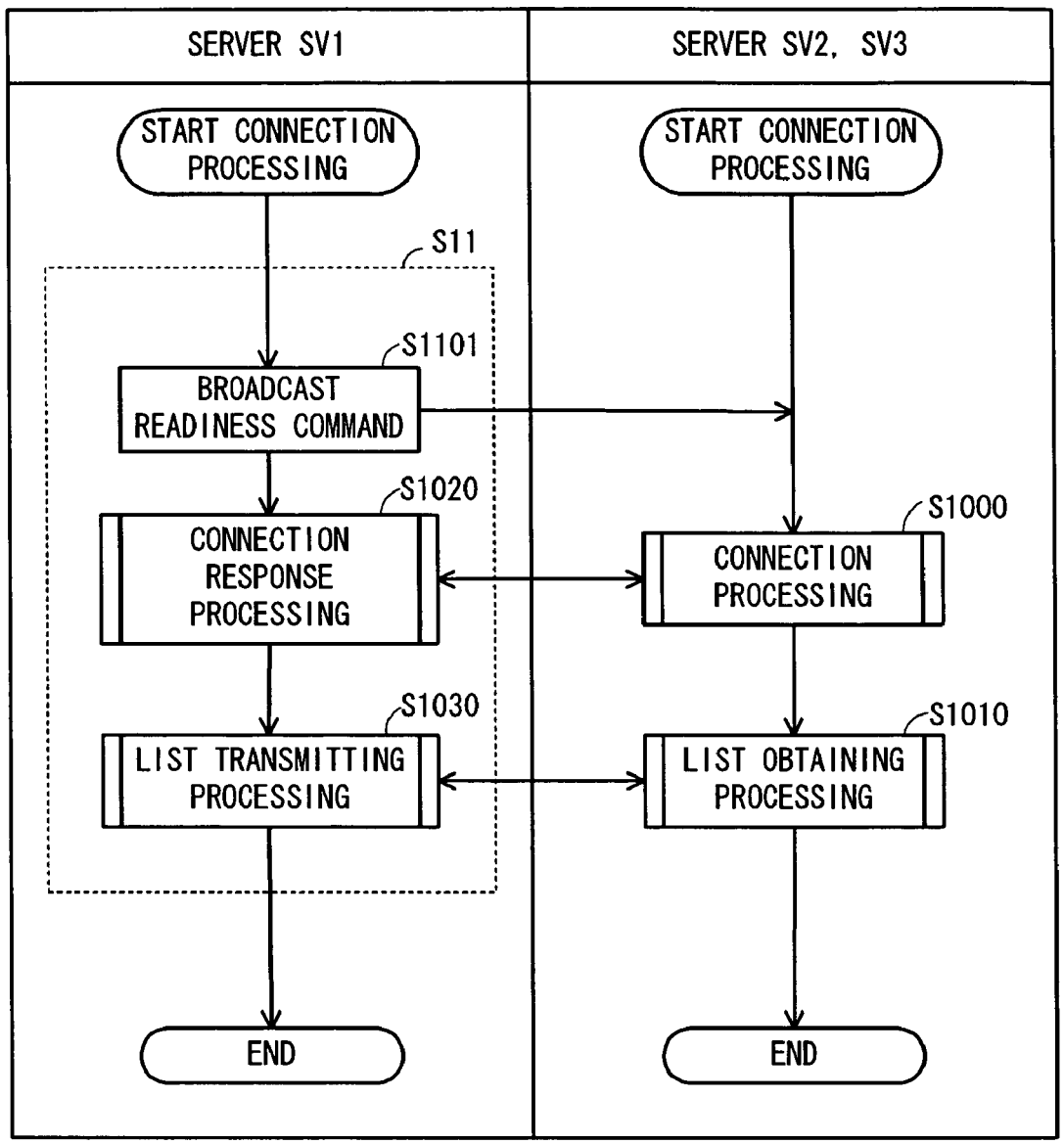
FIG. 7 is a flowchart for use in illustration of the details of the operation in step S11 in FIG. 5.

Referring to FIG. 7, the server SV1 obtains the local lists LL of all the servers SV in step S10 and then broadcasts a readiness command (S1101). The servers SV2 and SV3 on the LAN 50 receive the broadcast readiness command from the server SV1 and then carries out connection processing (S1000) to the server SV1. At the time, the server SV1 carries out connection response processing (S1020). The servers SV2 and SV3 establish connection with the server SV1 and then carries out the list obtaining processing (S1010). In response, the server SV1 carries out list transmitting processing (S1030) and transmits the local list LL1 of the server SV1 to the servers SV2 and SV3.

By the above described operation, the servers SV2 and SV3 can obtain the local list LL1 of the server SV1. Therefore, the servers SV each store all the local lists LL of the plurality of servers SV on the LAN 50.

Figure 8:
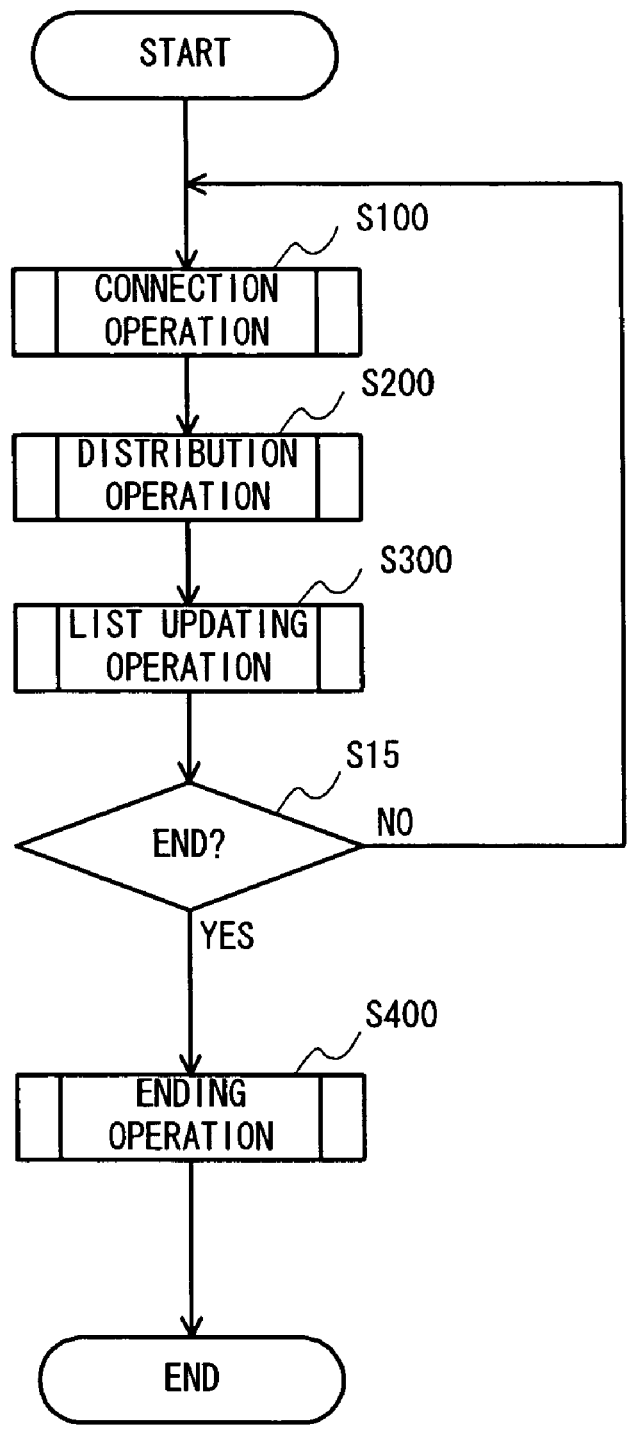
FIG. 8 is a flowchart for use in illustration of the operation of a server operating in the global list server system in FIG. 1.

Note that in FIG. 7, before the server SV1 broadcasts the readiness command, the server SV1 receives a command port connection request from another server SV or an audio client CL but does not accept the command port connection request. This is because the server SV1 can transmit a correct global list GL to an audio client only after receiving the local lists LL of all the other servers SV 1. 3. 2. Server Operation After Activation Processing Referring to FIG. 8, the server SV after activation carries out connection operation (S100), distribution operation (S200), and list updating operation (S300). In the connection operation (S 100), the server SV connects to another server SV newly activated on the LAN 50 for exchanging local lists LL or connects to an audio client CL on the LAN 50 for transmitting a global list GL. In the distribution operation (S200), the server SV distributes music piece data in response to a request from an audio client CL. In the list updating operation (S300), when its own local list LL or the local list LL of another server SV is updated, the servers SV exchange the local lists LL. After these kinds of operation, the server SV determines whether or not the operation to end its operation is selected (S15). Whether or not to end the operation is for example selected by the user who controls the server SV. If the ending operation is not selected, the server SV returns to step S100 and repeats the above described operation (S100 to S300). Meanwhile, when the ending operation is selected in step S15, the server carries out the ending operation (S400). Now, the kinds of operation described above will be described in detail.

1. 3. 2. 1 Connection Operation with Other Servers

Figure 9:
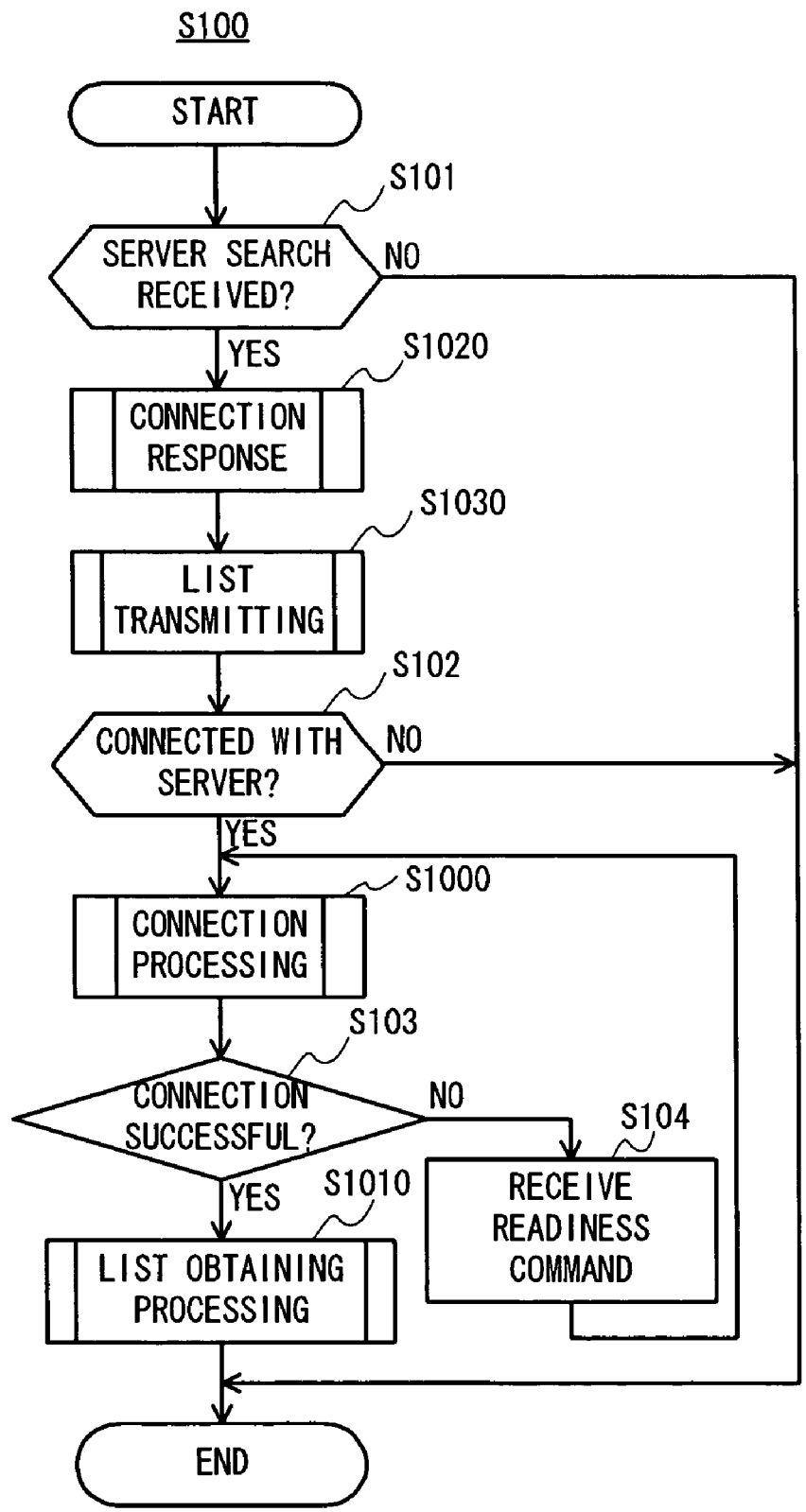
FIG. 9 is a flowchart for use in illustration of the details of the operation of a server upon receiving a connection request from another server in the operation in step S100 in FIG. 8.

When another server SV (hereinafter referred to as "activated server SV") is activated on the LAN 50 while the server SV1 operates, the activated server SV broadcasts a magic word for searching a server. Referring to FIG. 9, the server SV1 determines whether or not the magic word broadcast from the activated server SV is received (S101). Upon receiving the magic word, the server SV1 carries out connection response processing (S1020) to the activated server SV and establishes connection with the activated server SV. At the time, the server SV1 registers the client information of the activated server SV in the client list.

After establishing the connection, the server SV1 carries out list transmitting processing (S1030) to the activated server SV for transmitting the local list LL1. After transmitting the local list LL1, the server SV1 determines whether the device connected in step S1020 is a server SV or an audio client CL (S102). At the time, the server SV1 refers to "type" (client type) in the client information registered in the client list for determination. As the result of determination, the connected device is the activated server SV, and therefore the server SV1 obtains the local list LL from the activated server SV and registers the server information in the server list in order to update the global list GL. Therefore, the server SV1 carries out connection processing (S1000) to the activated server SV. After carrying out the connection processing, the server SV1 determines whether or not the connection is successful (S103). Before the activated server SV broadcasts a readiness command (in other words, when after establishing connection with the server SV1 and obtaining the local list LL1, the activated server SV tries to obtain the local list LLn of another server SV), connection fails if the server SV1 carries out connection processing (S1000) to the activated server SV In this case, the server SV1 again carries out connection processing (S1000) after it receives a readiness command from the activated server SV (S104). If the connection is successfully established, the server SV1 carries out list obtaining processing to obtain the local list LL of the activated server SV (S1010). After obtaining the local list LL of the activated server SV, the server SV ends the connection operation.

Figure 10:
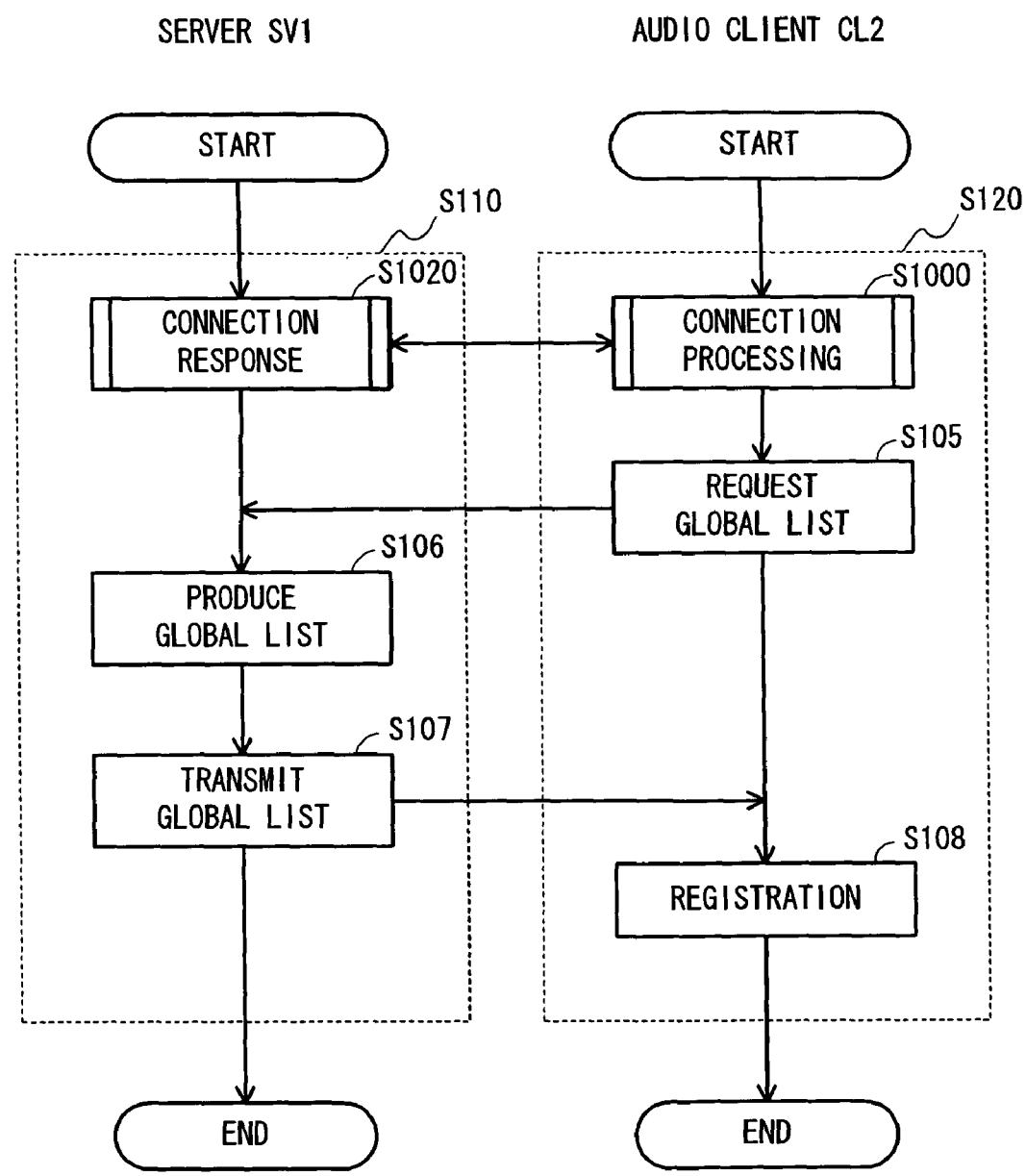
FIG. 10 is a flowchart for use in illustration of the details of the operation of the server upon receiving a connection request from an audio client in the operation in step S100 in FIG. 8.

By the above described operation, the server SV1 can obtain the local list LL of the newly activated server SV 1. 3. 2. 2. Connection with Audio Client The audio client CL2 on the LAN 50 may request connection to the server SV1 in order to obtain the global list GL. In response to the connection request processing (S120) from the audio client CL, the server SV1 carries out connection operation (S110) as shown in FIG. 10. When the audio client CL2 carries out connection processing to the server SV1 (S1000), the server SV1 carries out connection response processing (S1020). At the time, the server SV1 registers the client information of the audio client CL2 in the client list.

After the server SV1 carries out connection response processing (S1020), the audio client CL2 transmits a request command for the global list GL to the server SV1 using the command port (S105). The server SV1 receives the global list request command from the audio client CL2 and produces the global list GL based on a presentation content list PL (S106). More specifically, a plurality of pieces of music piece information I registered in the presentation content list PL are obtained from the storage location of the music piece information I and all the music piece information I is produced into the form of a list as a global list GL. After producing the global list GL, the server SV1 transmits the global list GL to the audio client CL2 (S107). The audio client CL2 receives the global list GL and registers the list in the memory 32 (S108).

Note that the audio client CL2 can obtain the global list GL from any of the other servers SV (SV2 and SV3) than the server SV1. Any other audio client CL can similarly obtain the global list GL.

By the above described operation, the client CL may obtain the global list GL including all the music piece information I on the LAN 50 by connecting any of the servers SV on the LAN 50.

1. 3. 2. 3. Distributing Operation

Figure 11:
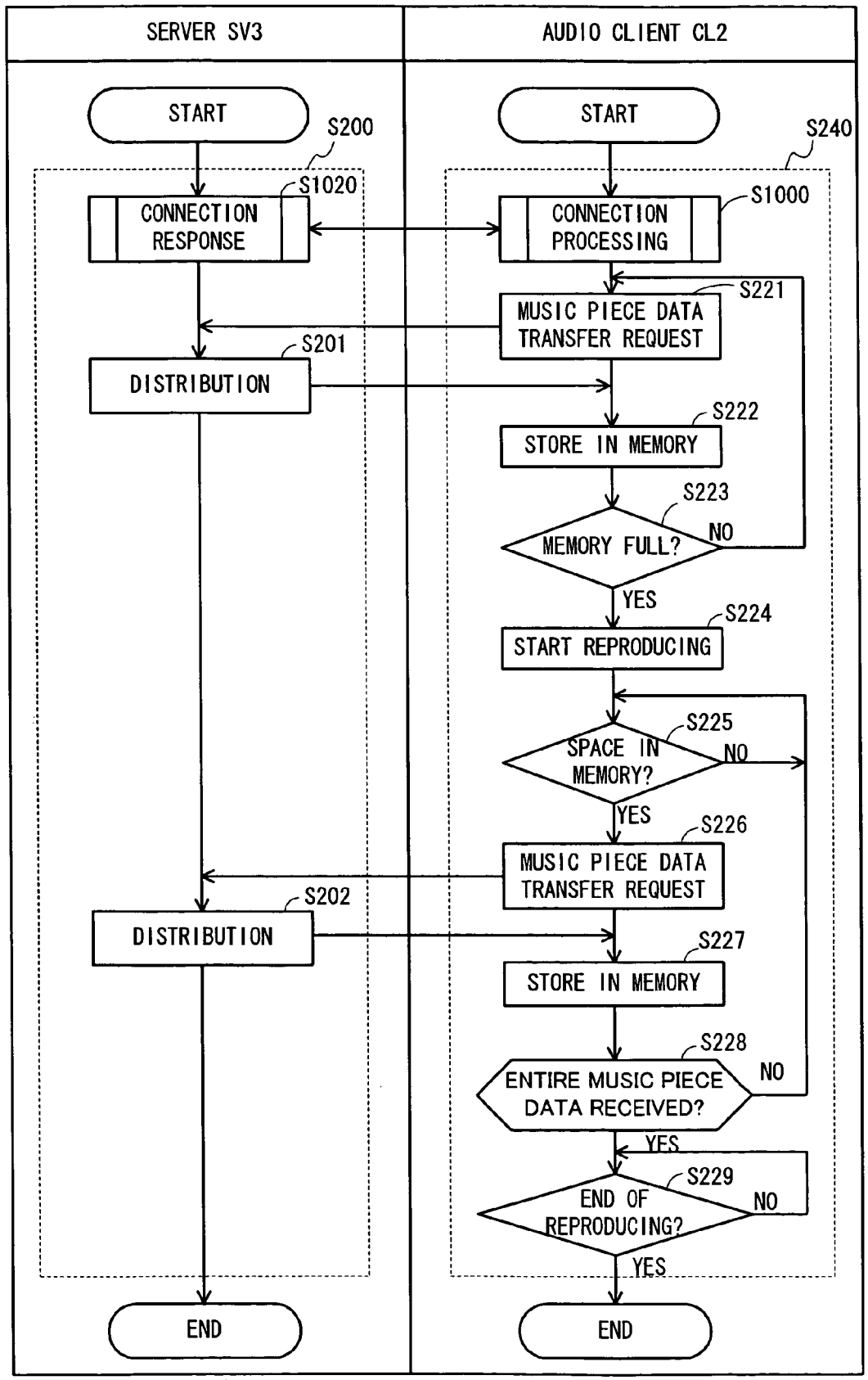
FIG. 11 is a flowchart for use in illustration of the details of the operation in step S200 in FIG. 8.

The user of the audio client CL2 refers to the global list GL obtained from the server SV1 and selects a desired music piece to listen to. When the user selects music piece data M31 after referring to the global list GL, as shown in FIG. 11, the audio client CL2 carries out distribution request processing to request the server SV3 storing the music piece data M31 to provide the music piece data M31 (S240). The server SV3 that stores the music piece data M31 requested by the audio client CL3 carries out distributing operation (S200).

Referring to FIG. 11, the audio client CL2 carries out connection processing to the server SV3 (S1000). The global list GL includes server specifying information (IP address and port number) to specify a server SV that stores music piece data. The audio client CL2 carries out connection processing to the server SV3 based on the server specifying information registered in the music piece information 131 of the selected music piece data M31. The server SV3 carries out connection response processing (S1020) to the audio client CL2. In this way, the connection for distributing the music piece data M31 is established. Note that at the time, the server SV1 maintains the connection with the audio client CL2 established during the connection operation (S100). More specifically, the audio client CL2 establishes connection with the servers SV1 and SV3. When the audio client CL2 tries to establish connection with the server SV3 after disconnecting from the server SV1 and fails, the audio client CL2 is disconnected from the LAN 50. In order to prevent such disconnection, the server SV1 maintains the connection with the audio client CL2.

After the connection between the server SV3 and the audio client CL2 is established, the audio client CL2 transmits a music piece data transfer request command shown in Table 9 through the command port (S221).

TABLE 9

| request content |  |
| --- | --- |
| music piece data transfer request command | |
| parameter | obtaining start address |
| | obtaining data length |

Figure 12:
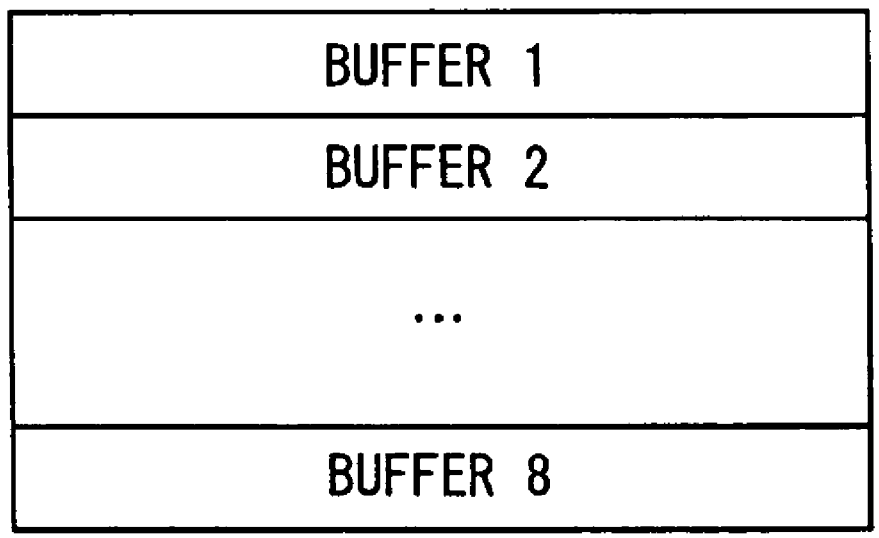
FIG. 12 is a diagram of the configuration of a buffer memory for storing music piece data in step S222 in FIG. 11.
Figure 13:
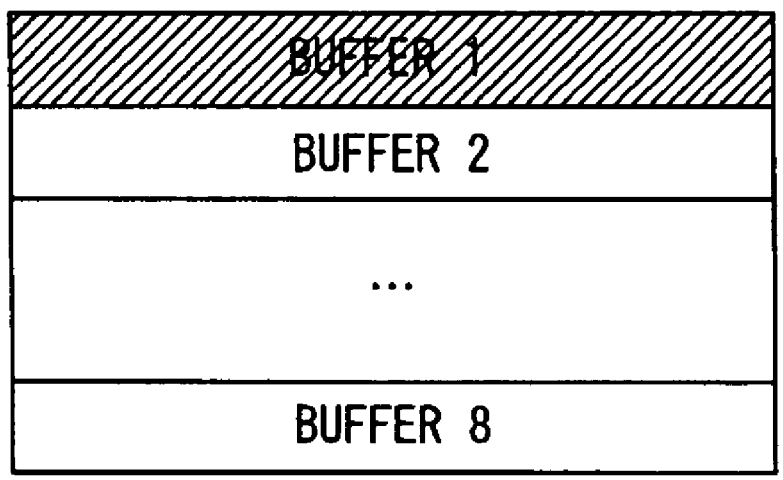
FIG. 13 shows the state of how music piece data for one buffer is stored from the start of the music piece in the buffer memory in FIG. 12.
Figure 14:
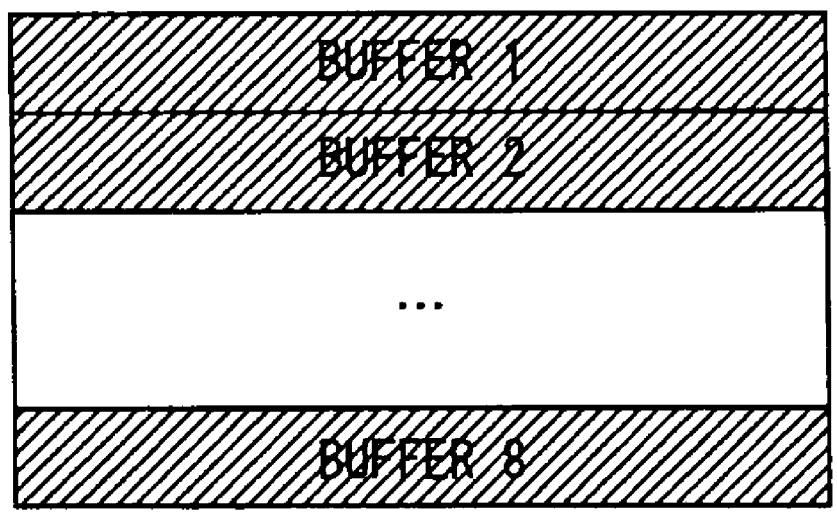
FIG. 14 is a continuation of FIG. 13 showing the state of how music piece data for all the buffers is stored.

The music piece data transfer request command includes the obtaining start address and the obtaining data length of the music piece data M31 to be transferred. The server SV3 responds to the transfer request command for the music piece data M31 to distribute the music piece data M31 as much as the obtaining data length from the start address specified by the obtaining start address to the audio client CL2 (S201). The audio client CL2 stores the distributed part of the music piece data M31 in the memory 32. The memory 32 includes a plurality of buffers (eight buffers in FIG. 12). As shown in FIG. 13, the audio client CL2 obtains the music piece data for one buffer from the start address of the music piece (obtaining data length) by the music piece data transfer request command and stores the data (S222). After the storing, the audio client CL2 determines whether the buffers in the memory 32 are all filled with music piece data (S223), obtains and stores the music piece data until all the buffers are filled as shown in FIG. 14.

Figure 15:
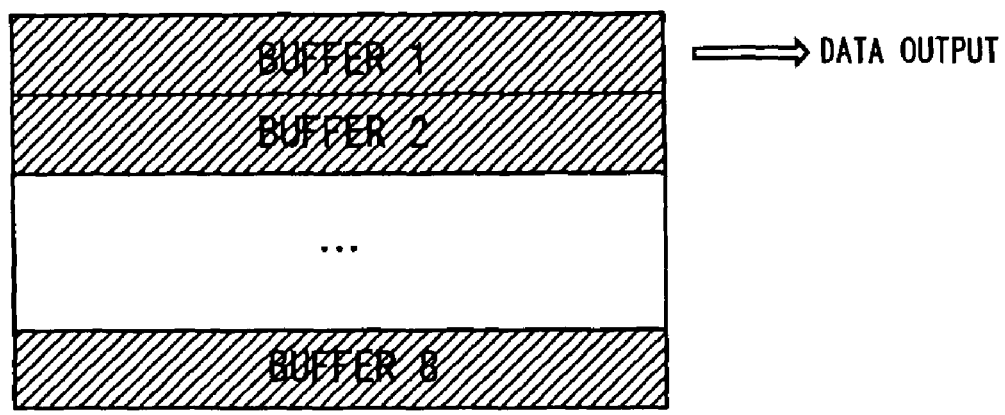
FIG. 15 is a continuation of FIG. 14 showing the state of how music piece data is output from the start buffer.
Figure 16:
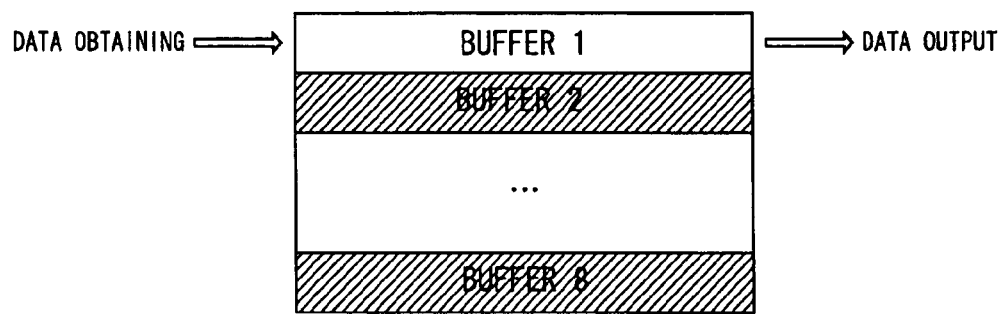
FIG. 16 is a continuation of FIG. 15 showing the state of how an empty space for one buffer is created.

When the process from the steps S221 to S223 is repeated and the buffers are all filled with music piece data, the audio client CL2 starts reproducing (S224). More specifically, as shown in FIG. 15, the audio client starts to output the music piece data from the first buffer to an audio sound processing portion 34. When the music piece data is output and reproduced, an empty space for one buffer is eventually created as shown in FIG. 16. When such an empty space is created in the memory 32 (S225), the audio client CL2 again transmits a music piece data transfer request command to the server SV3 (S226), and the server SV3 distributes a requested amount of the music piece data (S202). The audio client CL2 stores the distributed music piece data in the empty space in the memory 32 (S227). After storing the data, the audio client CL2 determines whether or not the entire music piece data M31 is received (S228). If the entire music piece data M31 is not received, in other words, if the server SV3 has not yet transmitted the entire music piece data M31 to the audio client CL2, the audio client CL2 and the server SV3 repeat steps S226, S202, and S227 every time an empty space is created in the memory 32 by reproducing. Note that in the above embodiment, the reproducing starts after the buffer is entirely filled with the music piece data, but the reproducing may start before the buffer is entirely filled.

When the audio client CL2 has received the entire music piece data M31 from the server SV3 (S228), the audio client CL2 continues reproducing operation until the entire music piece data M31 is reproduced (S229).

As in the foregoing, the audio client CL can specify the server SV that stores the selected music piece data from the global list GL and request the music piece data to be transferred. The music data is divided and distributed intermittently from the server SV to the audio client CL, and therefore music can correctly be reproduced even if the buffer capacity is small.

1. 3. 2. 4. List Updating Operation

The server SV carries out list updating operation to update the global list GL when (1) its own local list LL is updated, (2) the local list LL of another server SV is updated, and (3) another server ends its operation and is disconnected from the LAN 50. This is because in any of the cases the number of music piece data stored by the servers SV on the LAN 50 changes, and therefore the audio client CL must obtain the latest global list GL. Now, the list updating operation for (1) to (3) will be described.

1.3.2.4.1. When Its Own Local List is Updated

Figure 17:
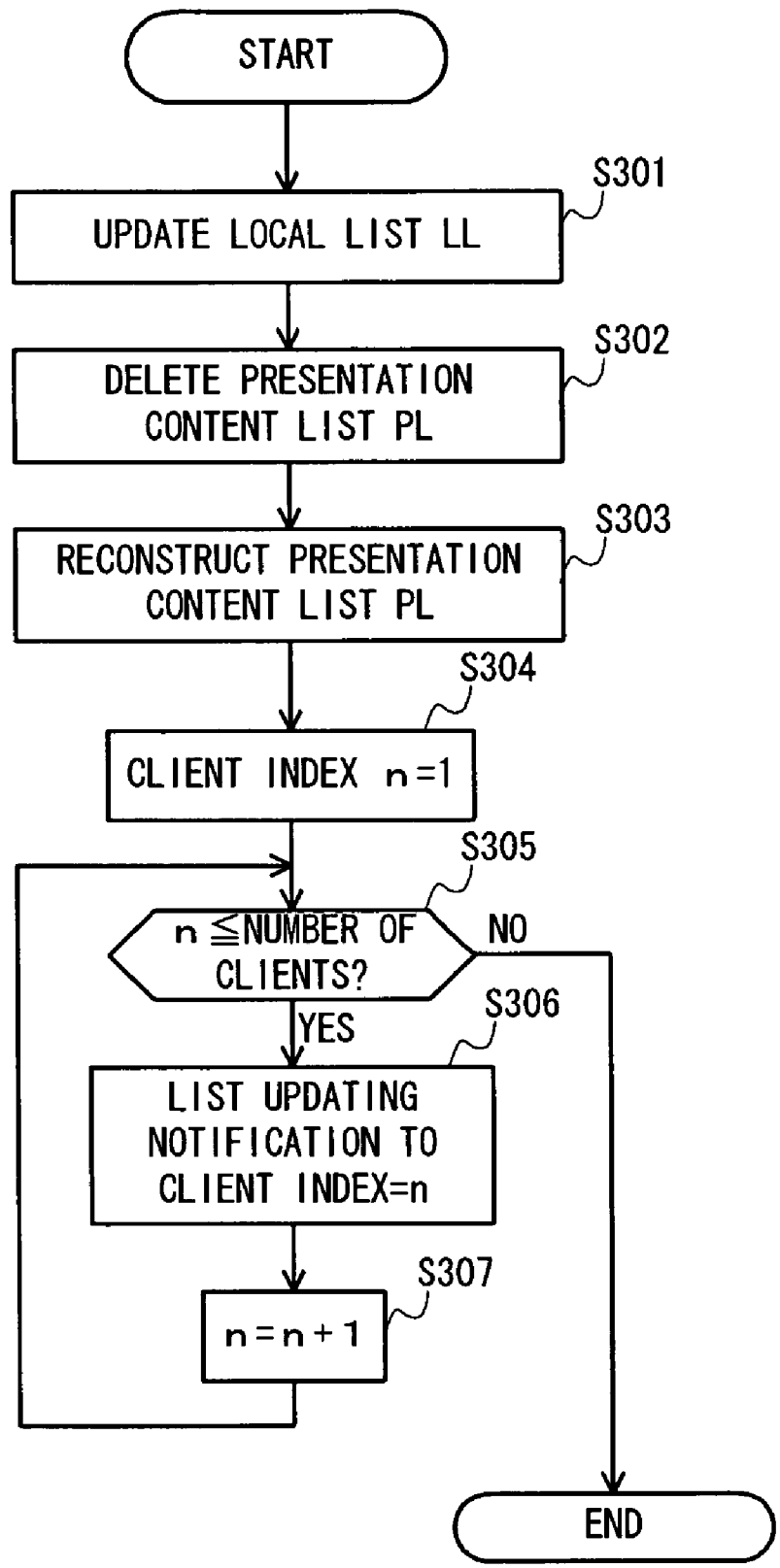
FIG. 17 is a flowchart for use in illustration of updating operation when music piece data in a server itself is updated in the operation in step S300 in FIG. 8.

Referring to FIG. 17, when new music data piece M12 is stored in the HDD 14 of the server SV1, the server SV1 updates the local list LL1 (S301). The server SV1 then deletes the presentation content list PL before the local list LL1 is updated (S302). Then, a new presentation content list PL corresponding to the local list LL1 updated in step S301 is produced (S303).

After producing the new presentation content list PL, all the servers SV and the audio clients CL connected to the server SV1 are notified of the list updating (S304 to S307). More specifically, the server SV1 sets that the count value n=1 (S304) and determines whether or not n is greater than the number of clients registered in the client list (S305). As a result of determination, when the number of clients is not less than n, the server SV1 transmits the list updating notification to the server SV or the audio client CL whose client index is n (S306). After the notification, the server SV1 increments n (S307) and returns to step S305.

By repeating the above described operation, the list updating can be notified to all the servers SV and all the audio clients CL connected to the server SV1. If the number n is greater than the number of clients in step S305, which means that the server SV1 has notified all the servers SV and all the client CL, the operation ends.

Operation of Audio Client upon Receiving List Updating Notification from Server

Figure 18:
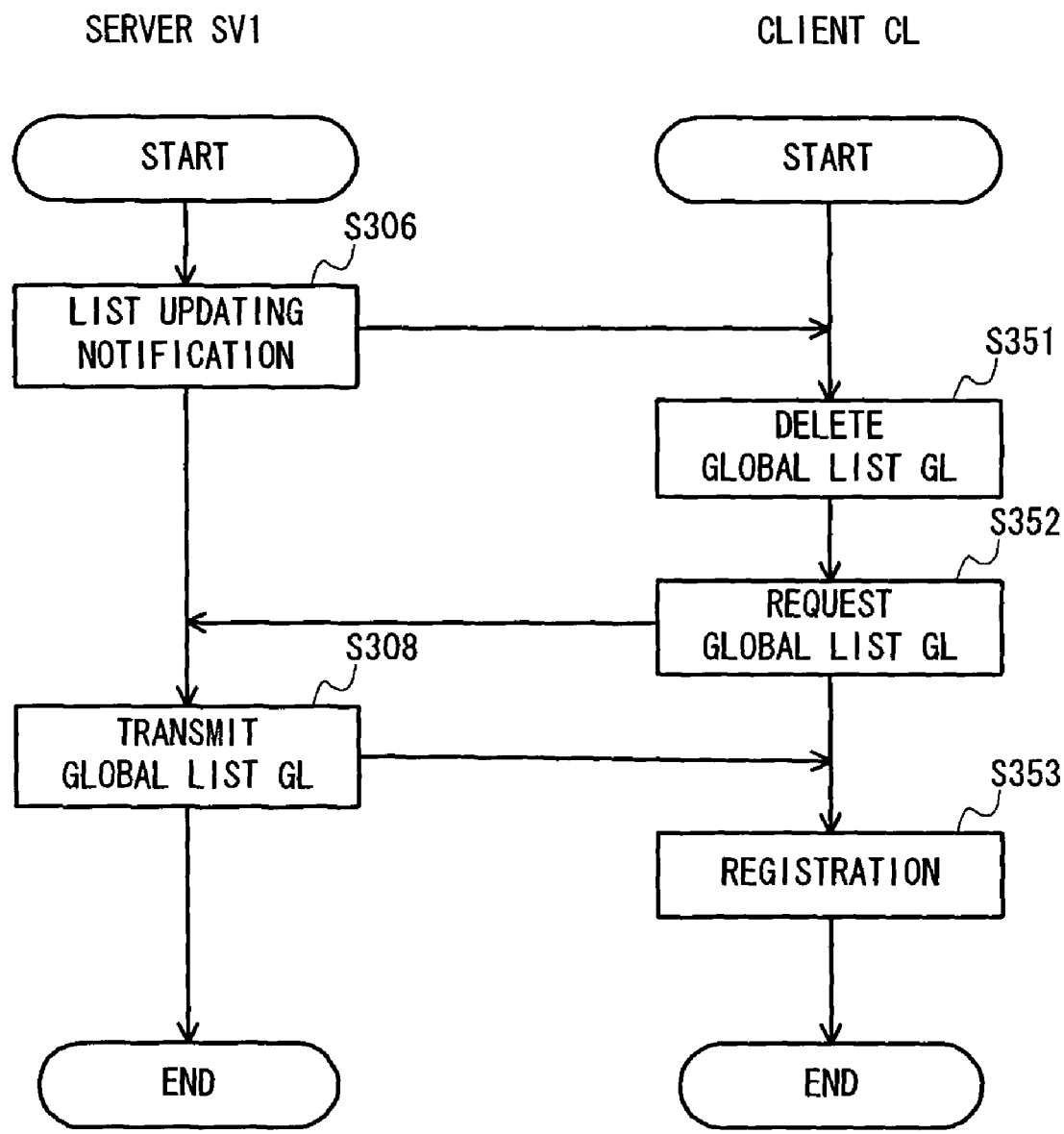
FIG. 18 is a flowchart for use in illustration of the operation of the server and the audio client in and after step S306 in FIG. 17.

Referring to FIG. 18, the audio client CL deletes the global list GL registered in the memory 32 upon receiving the list updating notification (S306) from the server SV1 (S351). Then, the audio client CL transmits a global list request command to the server SV1 (S352). The server SV1 receives the global list request command and transmits the updated global list GL to the audio client CL2 (S308). The audio client CL registers the transmitted global list GL in the memory 32 (S353).

The operation of another server SV upon receiving the list updating notification transmitted in step S306 will be described.

1. 3. 2. 4. 2. When Local List LL of Another Sever is Updated

Figure 19:
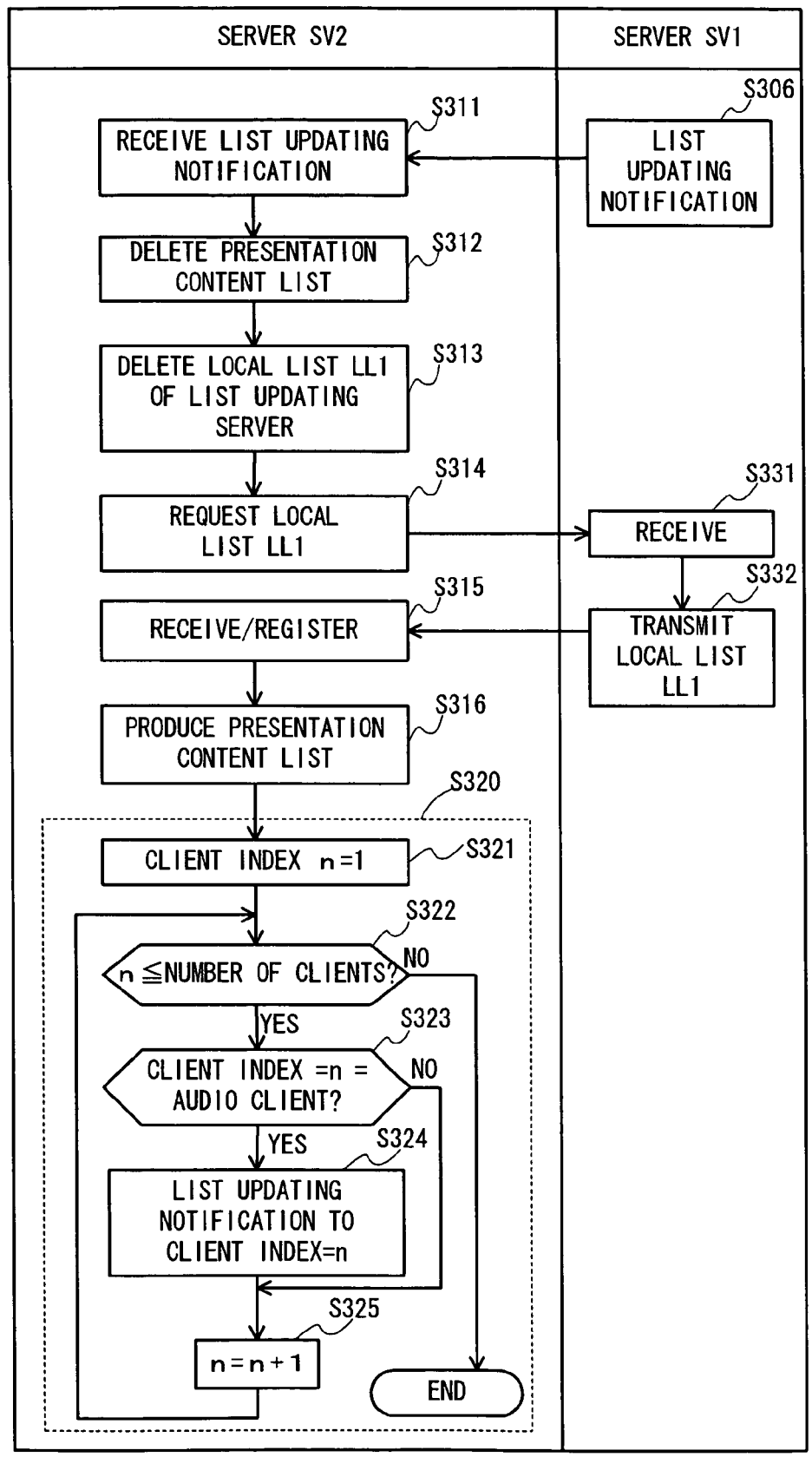
FIG. 19 is a flowchart for use in illustration of updating operation when music piece data in another server is updated in the operation in step S300 in FIG. 8.

Referring to FIG. 19, when the server SV2 receives the list updating notification transmitted from the server SV1 in step S306 (S311), the server SV2 deletes the existing presentation content list PL (S312). After the deletion, the server SV2 deletes the local list LL1 registered in the HDD 14 (S313). After deleting the local list LL1, the server SV2 requests the server SV1 to provide the updated local list LL1 (S314). The server SV1 receives the request from the server SV2 (S331) and transmits the updated local list LL1 (S332). The server SV2 receives the transmitted local list LL1 and registers the list in the HDD 14 (S315). After the registration, the server SV2 produces the presentation content list PL (S316). In this way, the global list GL is updated.

After producing the presentation content list PL, the server SV2 carries out list updating notification processing (S320) in order to transmit the updated global list GL to the plurality of audio clients CL connected to the server SV2. More specifically, the server SV2 sets that the count value n=1 (S321) and then determines whether or not the number of clients registered in the client list is not less than n (S322). Based on the result of determination, if the client number is not less than n, the server SV2 determines whether or not the device whose client index is n is an audio client CL (S323). The determination is made based on the "type" (client type) in the client information registered in the client list. Based on the result of determination, if the "type" of the client with the client index=n is "audio client," the server SV2 transmits list updating notification to the audio client CL (S324). After the transmission, the count value n is incremented (S325), and the process returns to S322. Meanwhile, based on the result of determination in step S323, if the "type" of the client with the client index=n is "server," the list updating notification is not transmitted, and the process proceeds to step S325. This is because since the other servers SV have been notified of the list updating from the server SV1, and therefore the server SV2 has to carry out the list updating notification only to the audio client CL.

By repeating the above described operation, the list updating notification is transmitted to all the audio clients CL connected to the server SV2. The operation of the audio client CL upon receiving the list updating notification is the same as that shown in FIG. 18.

1. 3. 2. 4. 3 When Another Server is Disconnected

Figure 20:
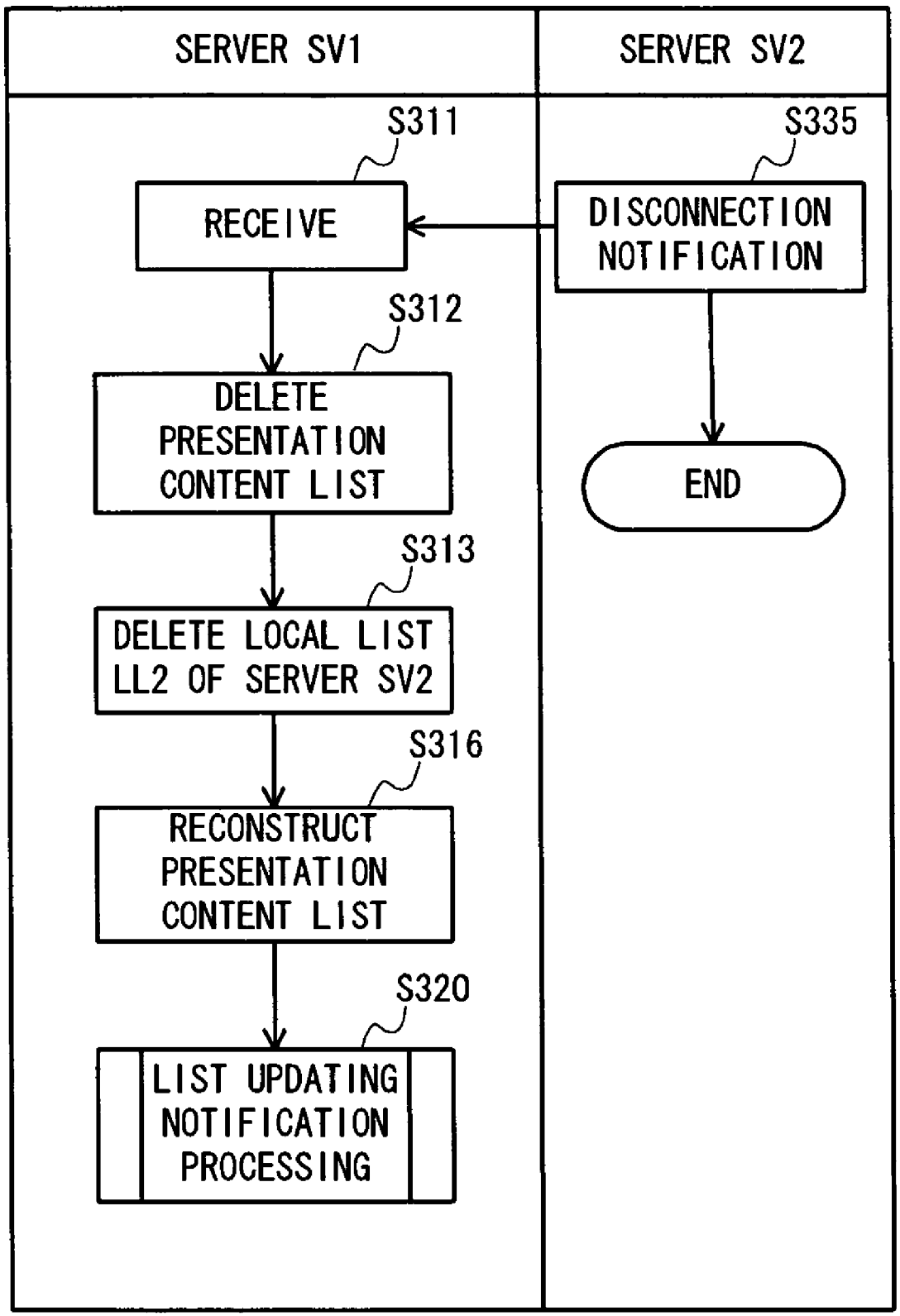
FIG. 20 is a flowchart for use in illustration of updating operation when another server is disconnected from the LAN in the operation in step S300 in FIG. 8.

Referring to FIG. 20, when the activated server SV2 on the LAN 50 stops operating and is disconnected from the LAN 50, the server SV2 broadcasts the disconnection notification to the other servers SV (SV1 and SV3) on the LAN 50 (S335). The server SV1 receives the disconnection notification from the server SV2 (S311) and deletes the existing presentation content list PL (S312). The server SV1 deletes the local list LL2 registered in the HDD 14 (S313). After deleting the local list LL2, the server SV1 produces a presentation content list PL (S316). In this way, the global list GL produced based on the presentation content list PL does not include the local list LL2. The server SV1 produces the presentation content list PL and then carries out list updating notification (S320). The sever SV3 carries out the same operation as that of the server SV1.

By the above described list updating operation, the audio client CL always obtains the latest global list GL.

1. 3. 2. 5. Ending Operation

When the server SV1 connected to an audio client CL ends its operation and is disconnected from the LAN 50, the audio client CL is preferably connected to another server SV on the LAN 50. When the server SV1 is disconnected while distributing music piece data to an audio client CL, the client CL preferably continues to receive the music piece data being distributed.

Figure 21:
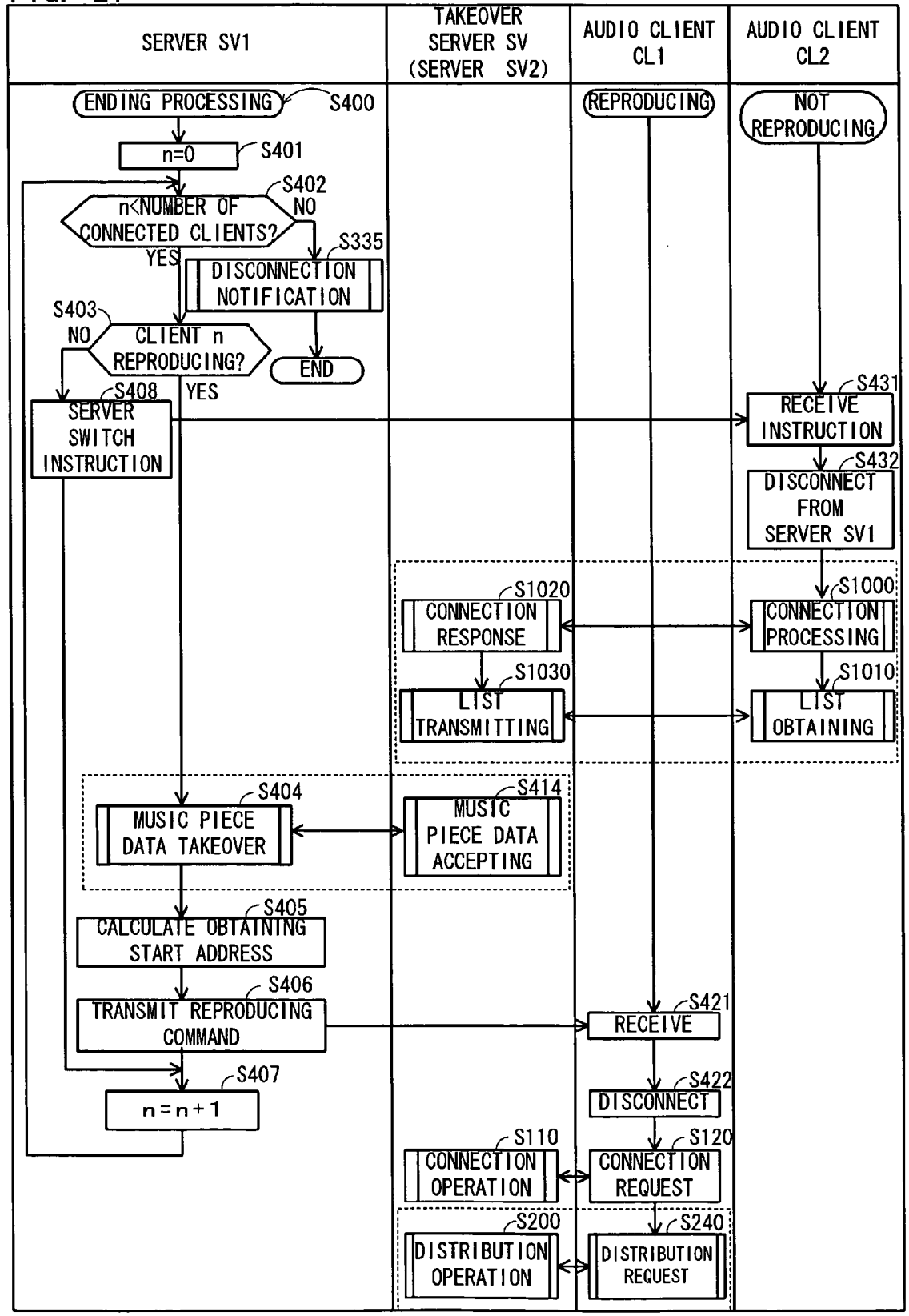
FIG. 21 is a flowchart for use in illustration of the details of ending operation in step S400 in FIG. 8.

Referring to FIG. 21, when the server SV1 ends its operation, the server SV1 first sets that the count value n=0 (S401) and determines whether or not the number of audio clients CL connected to the server SV1 is greater than n (S402). The determination in step S402 is made based on the client list. Based on the result of determination, if the number of clients CL is not more than n, the server SV1 is not connected with an audio client CL. Therefore, the server SV1 transmits disconnection notification to the other servers SV (S335) and ends the operation.

Meanwhile, if the number of audio clients CL is greater than n based on the result of determination in step S402 (in other words, if there is an audio client CL connected to the server SV1), it is determined whether or not the audio client CL with the client index=n is in the process of reproducing data (S403).

If the audio client CL with the client index=n (hereinafter described as the audio client CL2 by way of illustration) is not in the process of reproducing based on the result of determination, the server SV1 further transmits a server switching instruction to the audio client CL2 to switch the connection to a takeover server SV (S404). Herein, the takeover server SV is a server SV that takes over the connection with the audio client CL2. The server SV1 determines the takeover server SV based on the sever list. More specifically, the server SV with the server ID=1 in the server list is determined as the takeover server SV. For example, when the server specifying information of the server SV2 is registered where the server ID=1, the server SV1 determines the server SV2 as the takeover server SV The server SV1 transmits a server switching instruction and then increments the count value n (S407) and then returns to step S402.

The audio client CL2 disconnects from the server SV1 (S432) after receiving the server switching instruction from the server SV1 (S431). After the disconnection, the audio client CL2 carries out connection processing to the server SV2 according to the switching instruction (S1000). At the time, the server SV2 carries out connection response processing (S1020). The audio client CL2 carries out list obtaining processing after establishing connection with the server SV2 (S1010). At the time, the server SV2 carries out list transmitting processing (S1030). By the above described operation, the audio client CL2 can switch the connection to the server SV2 once the server SV1 ends its operation and can obtain the latest global list GL from the server SV2.

Meanwhile, if the audio client CL with the client index=n (hereinafter described as the client CL1 by way of illustration) is in the process of reproducing music piece data M11 based on the result of determination in step S403, the audio client CL1 must continue to receive the rest of the music piece data M11 after the server SV1 ends its operation. This is because if the distribution of the music piece data M11 is disconnected, the audio client CL1 must end reproducing of the music piece data M11 midway. Therefore, the server SV1 allows the takeover server SV to takes over the distribution of the music piece data M11 and then ends its operation. More specifically, the server SV1 carries out music piece data takeover processing for the music piece data M11 to the server SV2 (S404). At the time, the server SV2 carries out music piece data accepting processing (S414). Now, the music piece data takeover processing and the music piece data accepting processing will be described.

Figure 22:
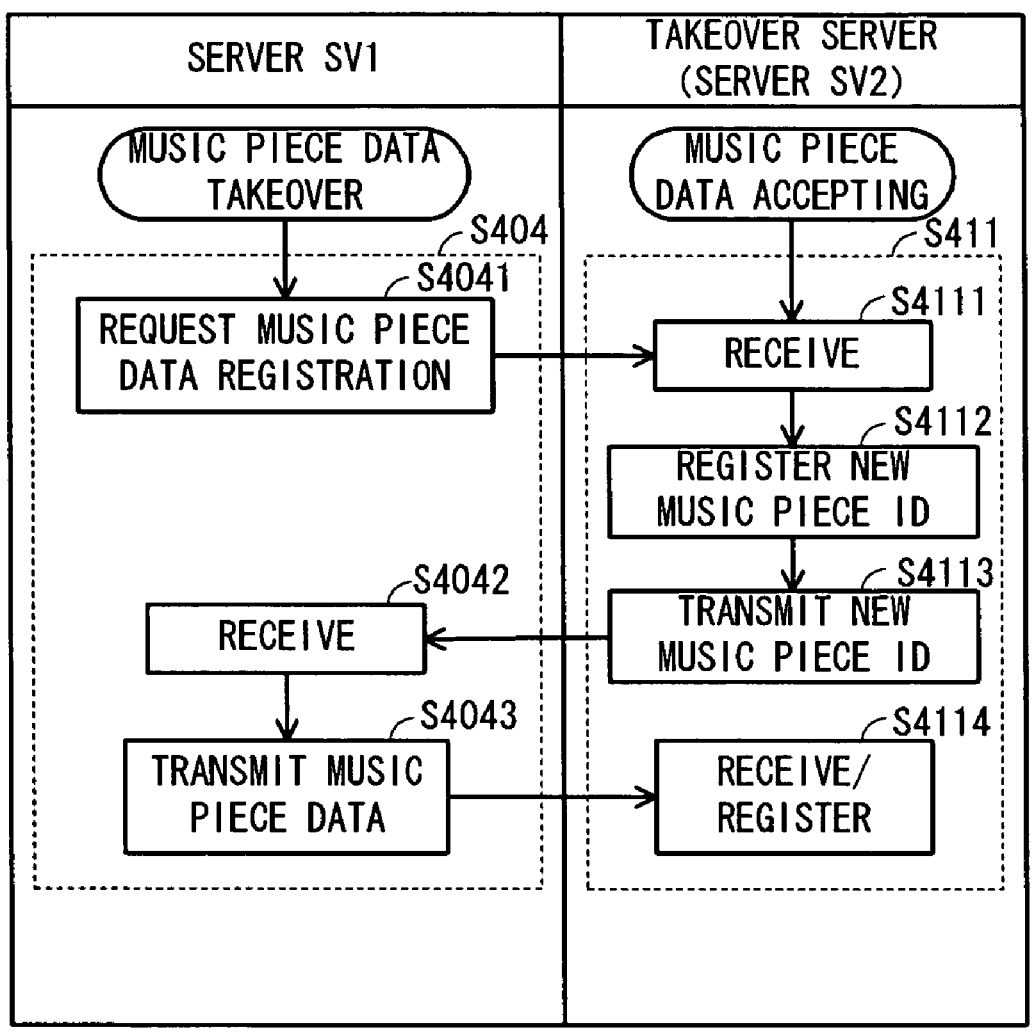
FIG. 22 is a flowchart for use in illustration of the details of the operation in steps S404 and S411 in FIG. 21.

Referring to FIG. 22, the server SV1 requests the server SV2 to register the music piece data M11 being distributed to the audio client CL1 (S4041). The server SV2 receives the request from the server SV1 (S4111) and registers a new music piece ID in the HDD 14 in order to store the music piece data M11 (S4112). The server SV2 transmits the new music piece ID to the server SV1 (S4113). The server SV1 receives the new music piece ID and transmits the music piece data M11 having the received new music piece ID to the server SV2 (step S4043). The server SV2 receives the music piece data M11 and stores the data in the region of the new music piece ID in the HDD 14 (S4114). By the above described operation, the music piece data M11 is taken over by the server SV2 from the server SV1.

Referring back to FIG. 21, the server SV2 as the takeover server SV takes over the music piece data M1 from the server SV1. Then, the audio client CL1 must determine the position in the music piece data M11 from which data is to be requested from the data distribution server SV2. Since the audio client CL1 has received the distributed part of the music piece data M11 and it is not necessary to distribute the music piece data M11 from the server SV2 from all over again. Therefore, the server SV1 calculates the obtaining start address of the music piece data M11 to be distributed from the server SV2 to the audio client CL1 (S405). More specifically, the server SV1 determines the value produced by adding the data length of the part of the music piece data M11 that has been distributed to the audio client CL1 at the point to the start address as the obtaining start address. After calculating the obtaining start address, the server SV1 transmits a reproducing command to the audio client CL1 (S406). The reproducing command includes the server specifying information of the server SV2 and the obtaining start address calculated in step S405 as parameters.

After transmitting the reproducing command, the server SV1 increments the count value n (S407) and returns to step S402 to repeat the operation. In this way, the server SV1 can carry out ending operation to all the audio clients CL connected to the server SV1. After carrying out the ending operation to all the audio clients CL, in other words, when the count value n exceeds the number of connected clients (S402), the server SV1 transmits disconnection notification to the other servers SV (S335) and ends its operation.

The audio client CL1 receives the reproducing command from the server SV1 (S421) and then disconnects from the server SV1 (S422). After the disconnection, client connection request processing (S120) to the server SV2 is carried out, the server SV2 carries out connection operation (S110), and the audio client CL1 establishes connection to the server SV2. Then, the audio client CL1 carries out distribution request processing (S240). At the time, the audio client CL1 carries out a music piece data transfer request using the obtaining start address received in step S421 as a parameter. The server SV2 carries out distribution operation based on the obtaining start address in the music piece data transfer request (S200). By the above described operation, the audio client CL1 can obtain the rest of the music piece data M11 from the server SV2 and continue to reproduce the music piece data M11.

As in the foregoing, when a server SV stops its operation and there is an audio client CL receiving music piece data distributed from the server SV (i.e., in the process of reproducing), the distribution of the music piece data is taken over by the takeover server SV Therefore, the audio client can continue to reproduce the music piece data.

Figure 23:
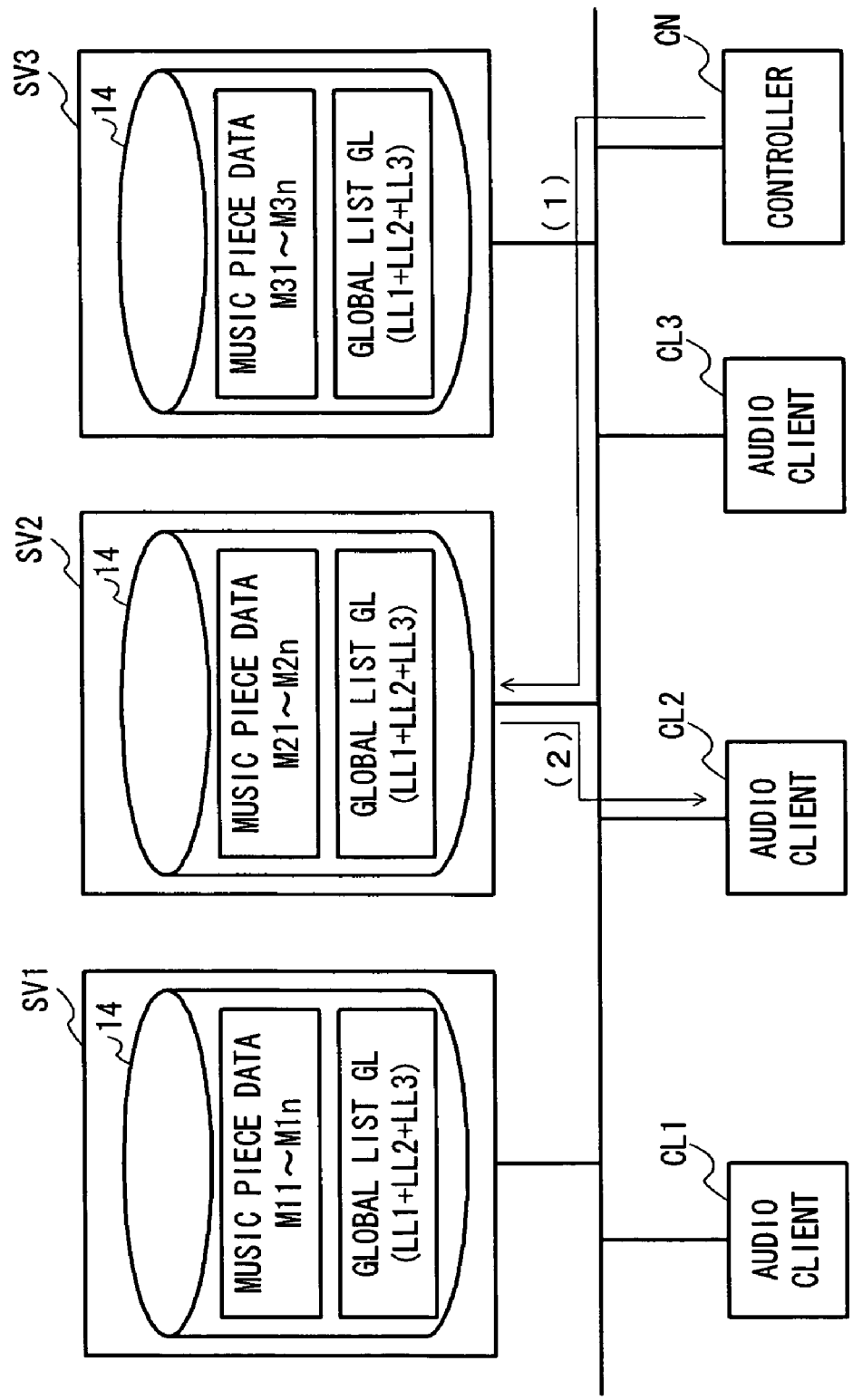
FIG. 23 is a block diagram of the general configuration of a global list server system including a controller.

1.4. Global List Server System Including Controller 1.4.1. General Configuration The global list server system 10 may include a controller CN as shown in FIG. 23. The controller CN connects with the servers SV1 to SV3 and controls the audio client CL1 to CL3 through the servers SV1 to SV3. The controller CN for example allows a desired audio client CL to reproduce a desired music piece or stop reproducing a music piece. FIG. 23 shows only the one controller CN, but there may be a plurality of such controllers.

Figure 24:
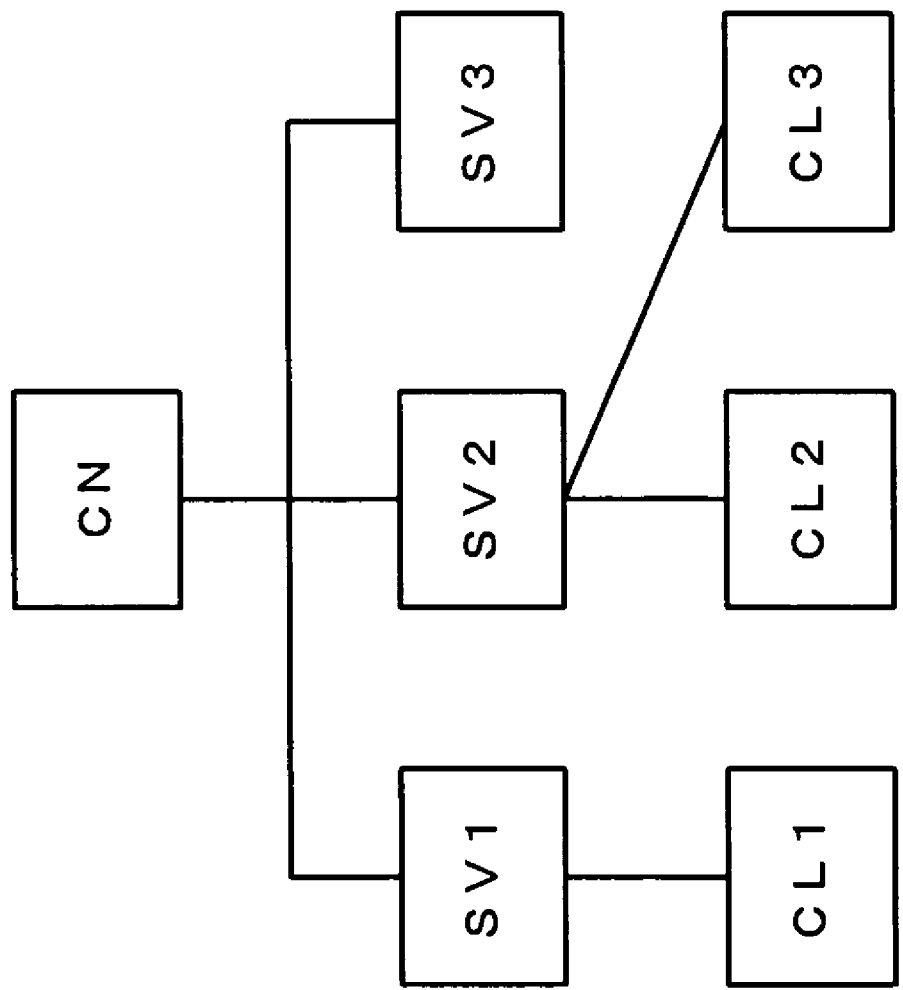
FIG. 24 is a schematic view for use in illustration of the connection between the server, the audio client, and the controller in FIG. 23.

The relation of how the servers SV1 to SV3, the audio clients CL1 to CL3, and the controller CN in FIG. 23 are connected is shown in FIG. 24. As shown in FIG. 24, the controller CN is connected to all the servers SV1 to SV3. The audio clients CL1 to CL3 are each connected to any of the servers SV1 to SV3. In FIG. 24, the audio client CL1 is connected with the server SV1, and the audio clients CL2 and CL3 are connected to the server SV2. More specifically, the audio client CL1 obtains the global list GL from the server SV1 and the audio clients CL2 and CL3 obtain the global list GL from the server SV2.

Referring back to FIG. 23, when the controller CN allows the audio client CL2 to reproduce a music piece based on music piece data M31, the controller CN transmits a reproducing command to the audio client CL2. More specifically, the controller CN determines the connection between the audio client CL2 and the server SV2 and then transmits a reproducing command to the audio client CL2 ((2) in FIG. 23) through the server SV2 ((1) in FIG. 23). The audio client CL2 operates in the same manner as that in FIG. 2B upon receiving a reproducing command.

1.4.2. Configuration

Figure 25:
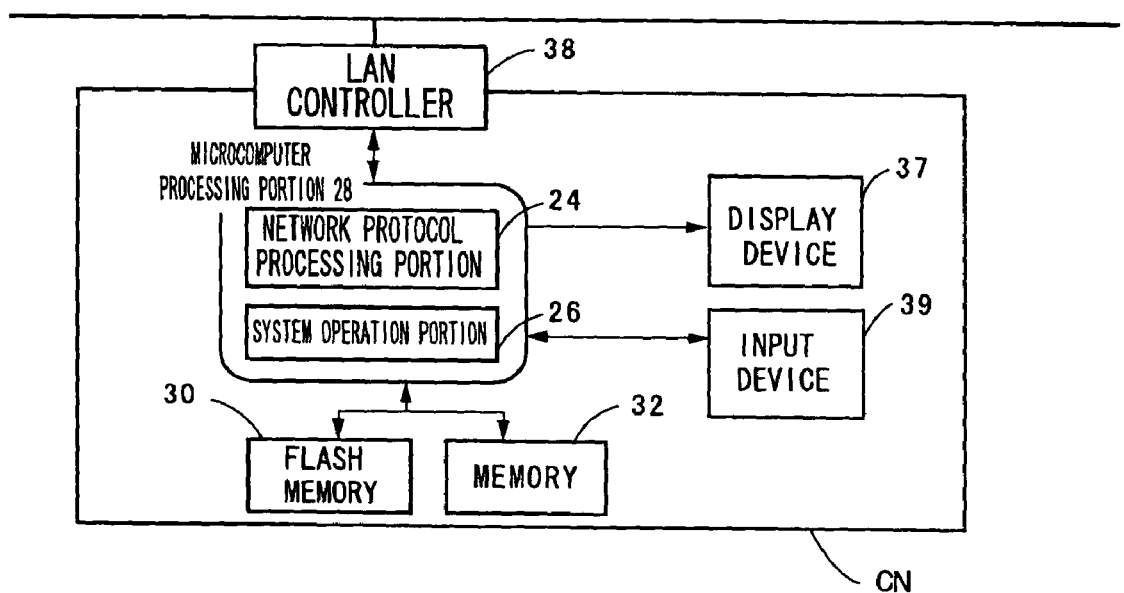
FIG. 25 is a functional block diagram of the configuration of the controller in FIG. 23.

The controller CN serves as a client to the servers SV1 to SV3. Referring to FIG. 25, the controller CN includes a LAN controller 38, a microcomputer processing portion 28, a flash memory 30, a memory 32, a display device 37 such as a CRT and an LCD, and an input device 39 such as a keyboard and a mouse. The controller CN is different from an audio client CL in that the controller CN does not have to reproduce unlike the audio client CL capable of reproducing and mainly has the monitoring and controlling capabilities the same as those of the audio client CL.

A controller server list having the same structure as that in Table 1 is registered in the memory 32 of the controller CN. The server information registered in the controller server list (controller server information) is given in Table 10.

TABLE 10

| | server information |
|---|---|
| address | IP address (server specifying information) |
| name | server name: server SV2 |
| clientlist | client list |

Referring to Table 10, the controller server information has a client list ("clientlist") registered instead of the local list LL in Table 2. The client list has all the client information of the servers SV1 to SV3. In short, the controller CN has the client information of all the servers SV1 to SV3. Therefore, the controller CN is aware of the audio clients CL1 to CL3 operating in the global list server system 10 and is also aware of which server SV each of the audio clients CL is connected to.

The global list GL is also registered in the memory 32.

1. 4. 3. System Operation 1. 4. 3. 1. Handle Obtaining Operation

The controller CN connects all the servers SV in the global list server system 10 and obtains monitoring handles and control handles for monitoring and controlling the audio clients CL1 to CL3 connected to the servers SV.

Figure 26:
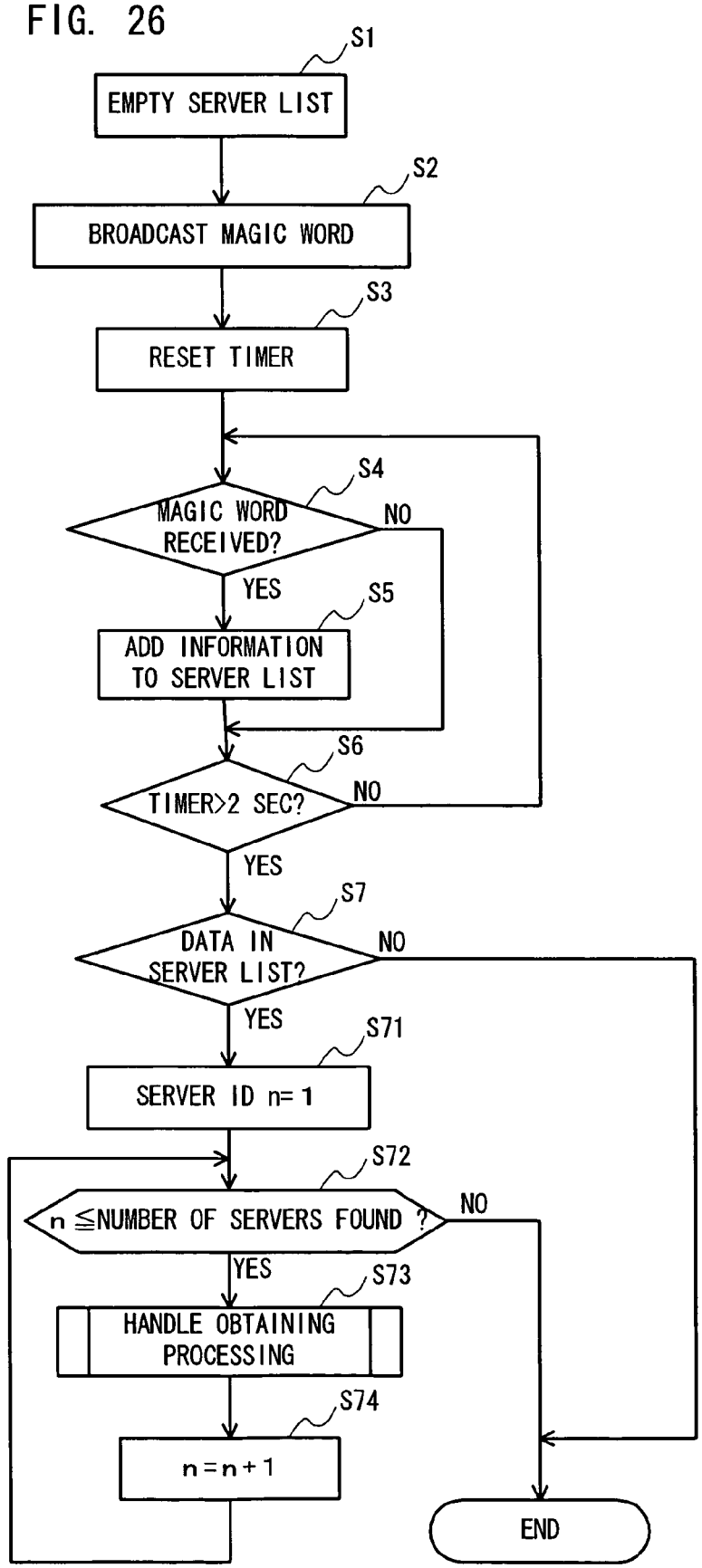
FIG. 26 is a flowchart for use in illustration of handle obtaining operation in the global list server system in FIG. 23.

Referring to FIG. 26, the operation in steps S1 to S7 is the same as that in FIG. 5. In short, the controller CN searches for the servers SV1 to SV3 operating on the LAN 50 and registers the server specifying information of the servers SV1 to SV3 in the server list.

If the controller CN determines it is determined in step S7 that the server specifying information is registered in the server list, the controller CN carries out handle obtaining processing for each server registered in the server list (S71 to S74). To begin with, it is set that the count value n=1 (S71) and it is determined whether or not the number of servers registered in the server list is not less than n (S72). If the number of servers is not less than n, the controller CN carries out handle obtaining processing to a server SV whose server ID=1 (S73). After carrying out the handle obtaining processing, the count value n is incremented (S74) and the process returns to step S72. More specifically, the controller CN carries out the handle obtaining processing to all the servers registered in the server list. As an example, the handle obtaining processing to the server SV2 will be described.

Figure 27:
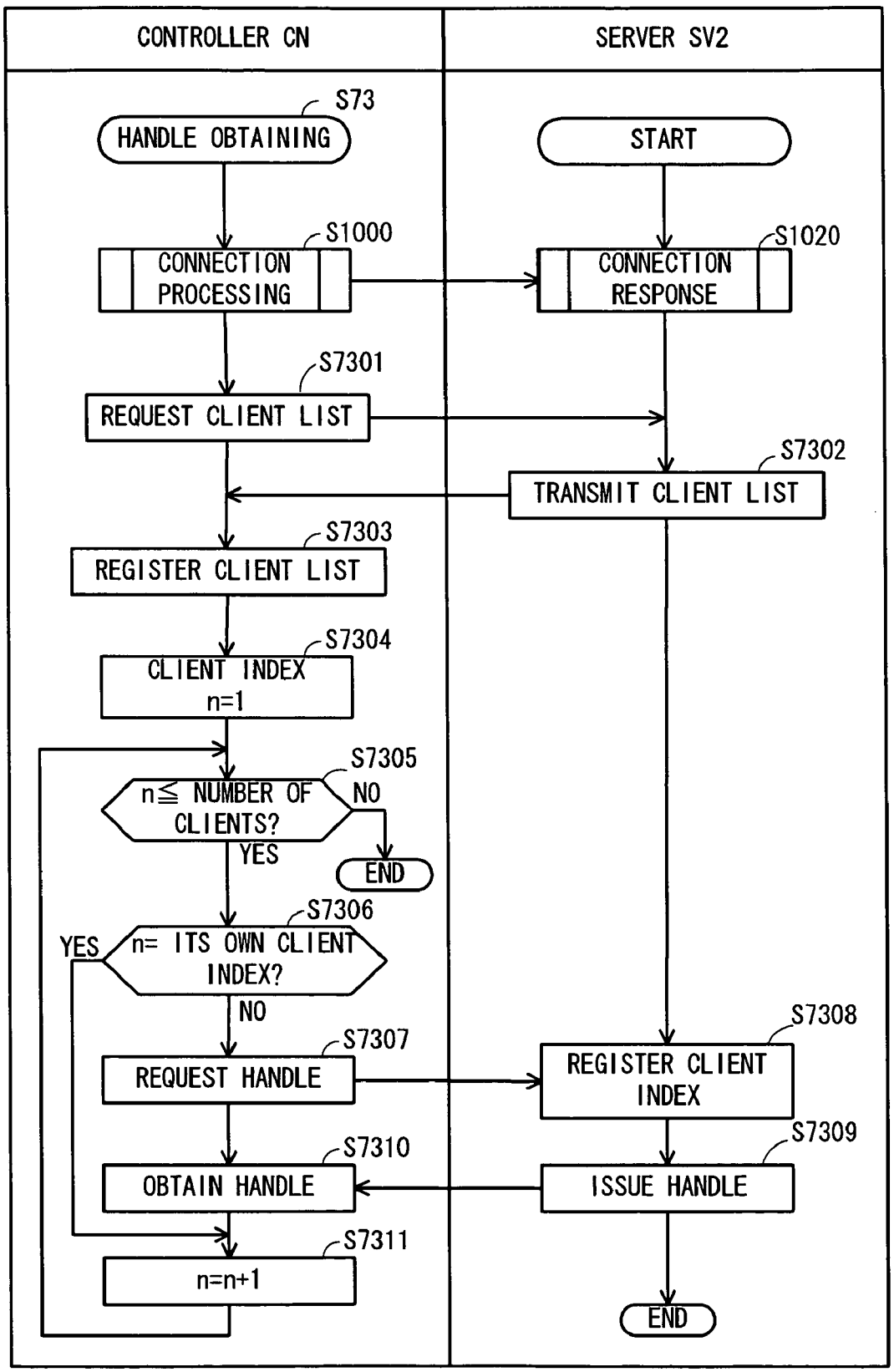
FIG. 27 is a flowchart for use in illustration of the details of the operation in step S73 in FIG. 26.

Referring to FIG. 27, the controller CN carries out connection processing to the server SV2 (S1000). At the time, the server SV2 carries out connection response processing (S1020). By the connection processing and the connection response processing, the controller CN establishes connection with the server SV2. Note that in the connection processing, the controller CN transmits its own client information to the server SV2 and also notifies that its client type is "controller" at the time.

After establishing the connection, the controller CN transmits a client list request command to the server SV2 (S7301). The server SV2 receives the client list request command and transmits a client list in the HDD 14 to the controller CN (S7302). The server SV2 is connected with the audio clients CL2 and CL3 and the controller CN, and therefore the client list transmitted in step S7302 includes the client information of the audio clients CL2 and CL3 and the controller CN. The controller CN receives the client list and then registers the list in the memory 32 (S7303). More specifically, the obtained client list is registered in the "clientlist" in the controller server information of the server SV2 in the controller server list.

After registering the client list, the controller CN requests the server SV2 to provide monitoring handles and control handles for audio clients CL2 and CL3 connected to the server SV2 based on the client list and obtains these handles (S7305 to S7310). The monitoring handle is the authority given by the server SV to the controller CN to monitor the audio client CL. The control handle is the authority given by the server SV to the controller CN to control the audio client CL.

The controller CN sets that the count value n=1 (S7304) and determines whether the number of clients in the client list is not less than n (S7305). If the number of clients is not less than n, the controller CN determines whether or not the client information of the client whose client index=1 is information of itself (S7306). If the information is not of itself, the controller transmits the client index (=1) to the server SV2 and requests for the monitoring and control handles for the client (S7307).

The server SV2 records the client index (=1) transmitted from the controller in correspondence to the client index of the controller CN (S7308) and issues the monitoring and control handles to the controller CN (S7309). As a result, the controller CN obtains the monitoring and control handles for the audio client CL corresponding to the client index=1 (S7310).

The controller CN then increments the count value n (S7311) and returns to the operation in step S7305. The controller CN obtains the monitoring and control handles for all the audio clients CL (CL2 and CL3 in this example) registered in the client list. Note that if the client information of the client with the client index=n is information of itself based on the result of determination in step S7306, the controller CN proceeds to step S7311. This is because the controller does not have to obtain the monitoring and control handle for itself.

The handle obtaining processing is carried out to all the servers SV1 to SV3. Therefore, the controller CN obtains the monitoring handles and the control handles for all the audio clients CL1 to CL3 operating in the global list server system 10.

1. 4. 3. 2. Global List Obtaining Operation and Updating Operation

The controller CN operates in the same manner as the audio client CL2 in FIG. 10 in obtaining the global list GL from the server SV The controller CN obtains the global list GL from an arbitrary server SV. Note that when all the servers SV1 to SV3 are connected with the controller CN by the handle obtaining operation, the controller CN requests an arbitrary server SV to provide the global list without the connection processing (step S1000) in FIG. 10 (step S105 in FIG. 10). The arbitrary server SV is for example a server SV whose server ID=1 in the controller server list.

The controller CN receives list updating notification from the server SV similarly to the audio client CL and updates the global list GL. The operation of updating the global list is the same as that in FIG. 18.

By the these kinds of operation, the controller CN can always obtain the latest global list.

1. 4. 3. 3. Monitoring Operation

Figure 28:
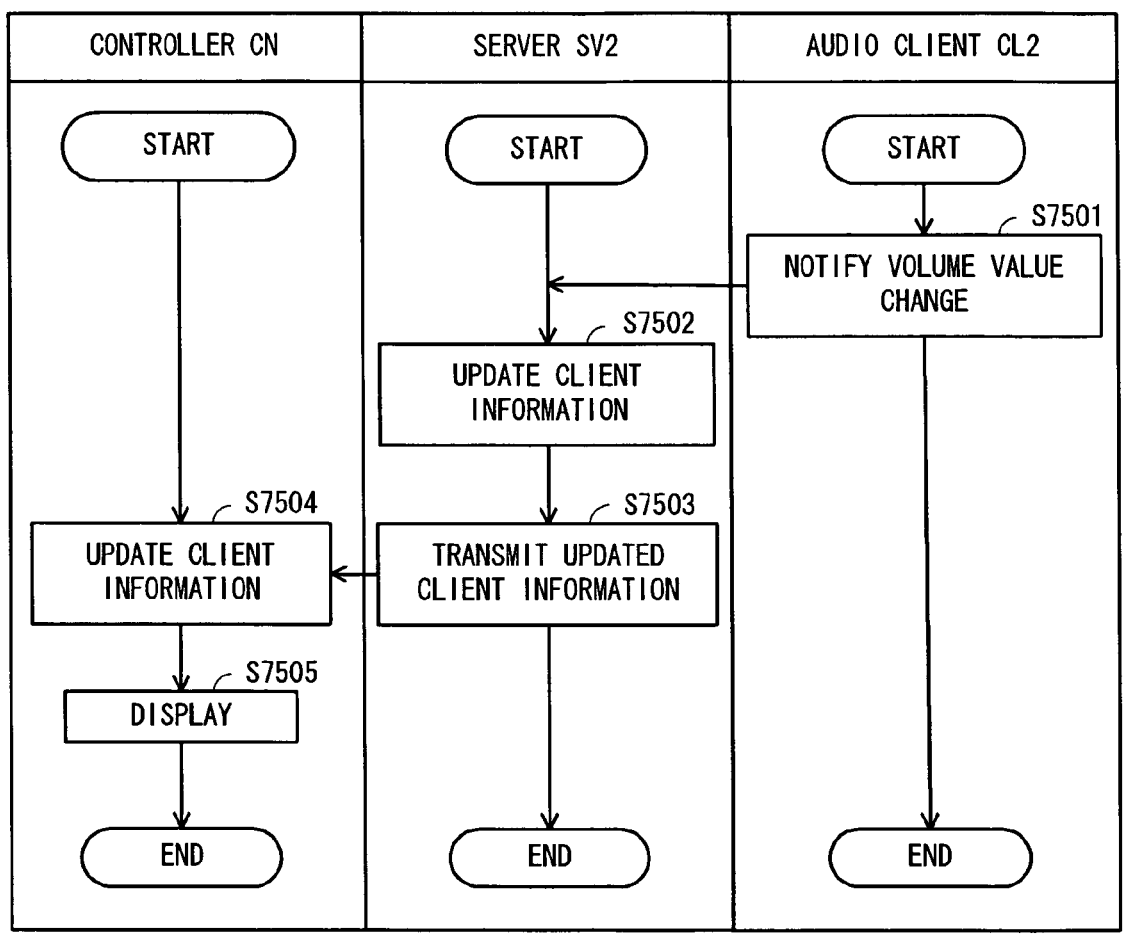
FIG. 28 is a flowchart for use in illustration of monitoring operation in the global list server system in FIG. 23.

The controller CN can obtain the monitoring handle and monitor the audio client CL. Referring to FIG. 28, when the volume value of the audio client CL2 is changed, the audio client CL2 transmits volume value change notification to the server SV2 (S7501). The volume value change notification includes the volume value information that has been changed.

The server SV2 receives the volume value change notification and updates the client information of the audio client CL2 (S7502). More specifically, the data "volume" in the client information is updated. The server SV2 further transmits the updated client information to the controller CN having the monitoring handle for the audio client CL2 (S7503).

The controller CN receives the updated client information and updates the audio client information of the audio client CL2 in the controller server list (S7504). The updated client information is displayed at a display 37 (S7505).

The above processing is repeated every time the client information of any of all the clients CL1 to CL3 whose control handle is obtained by the controller CN is updated.

As in the foregoing, when the server SV receives the client information from the audio client CL, the server transmits the client information to the controller CN, so that the controller CN can always monitor the audio client CL.

1.4.3.4. Control Operation

The controller CN can control an audio client CL by obtaining its control handle. As an example of the control operation, how the controller CN instructs the audio client CL2 to reproduce a music piece based on the music piece data M31 will be described. The music piece data is selected based on the global list GL of the controller CN.

Figure 29:
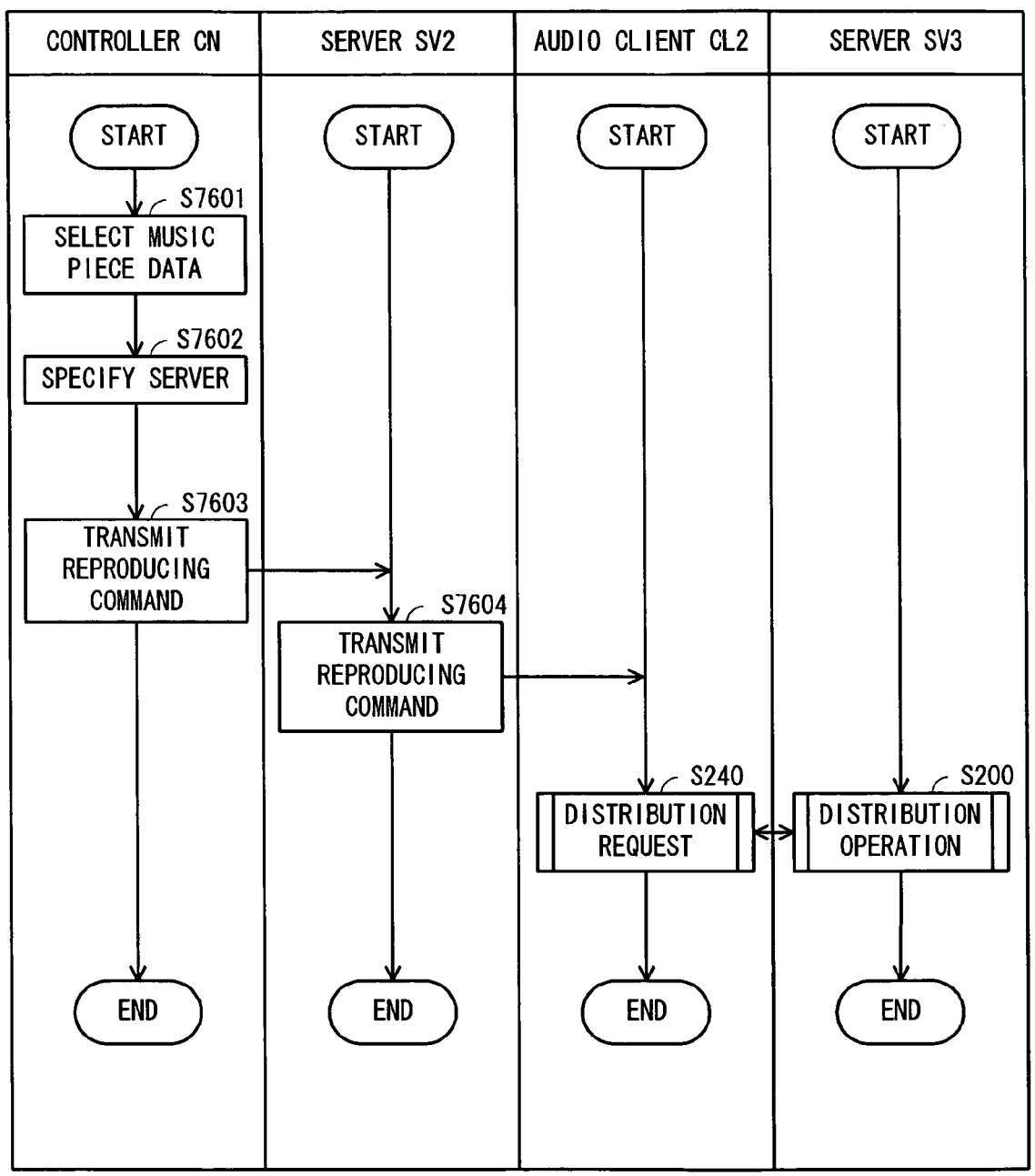
FIG. 29 is a flowchart for use in illustration of control operation in the global list server system in FIG. 23.

Referring to FIG. 29, the controller CN selects the music piece data M31 based on the global list GL (S7601). After the selection, the controller CN specifies a server to which the audio client CL2 is connected based on the controller server list (S7602). More specifically, the controller CN refers to the controller server list and determines that the server information having the client information of the audio client CL2 is the server information of the server SV2. Stated differently, the controller CN determines that the server connected to the audio client CL2 is the server SV2. Therefore, the controller CN transmits a reproducing command to the server SV2 (S7603). The reproducing command includes information (such as music piece ID) to specify the music piece data M31.

The server SV2 transmits a reproducing command transmitted from the controller CN to the audio client CL2 (S7604). In short, the controller CN transmits the reproducing command to the audio client CL2 through the server SV2.

The audio client CL2 carries out distribution request processing upon receiving the reproducing command in order to obtain and reproduce the music piece data M31 (S240). Note that at the time, the server SV3 carries out distribution operation (S200).

FIG. 29 shows the operation of instructing the music piece to be reproduced, and the operation of stopping reproducing the music piece is carried out in the same manner. The controller CN transmits a stop command for the music piece reproduction to the audio client CL2 through the server SV2, so that the audio client CL2 stops reproducing the music piece. The volume is controlled in the same manner.

By the above described operation, the controller CN can control the audio client CL whose control handle is obtained by the controller CN.

Note that when the global list server system 10 includes a number of such controllers CN, the number of control handles issued for each of the audio clients CL is not more than one. Stated differently, only one controller CN can control each of the audio clients CL. Meanwhile, the number of monitoring handles issued for each of the audio clients CL is more than one, and a plurality of controllers CN can monitor one audio client CL.

2. Center Server System
2. 1. General Configuration

Figure 30:
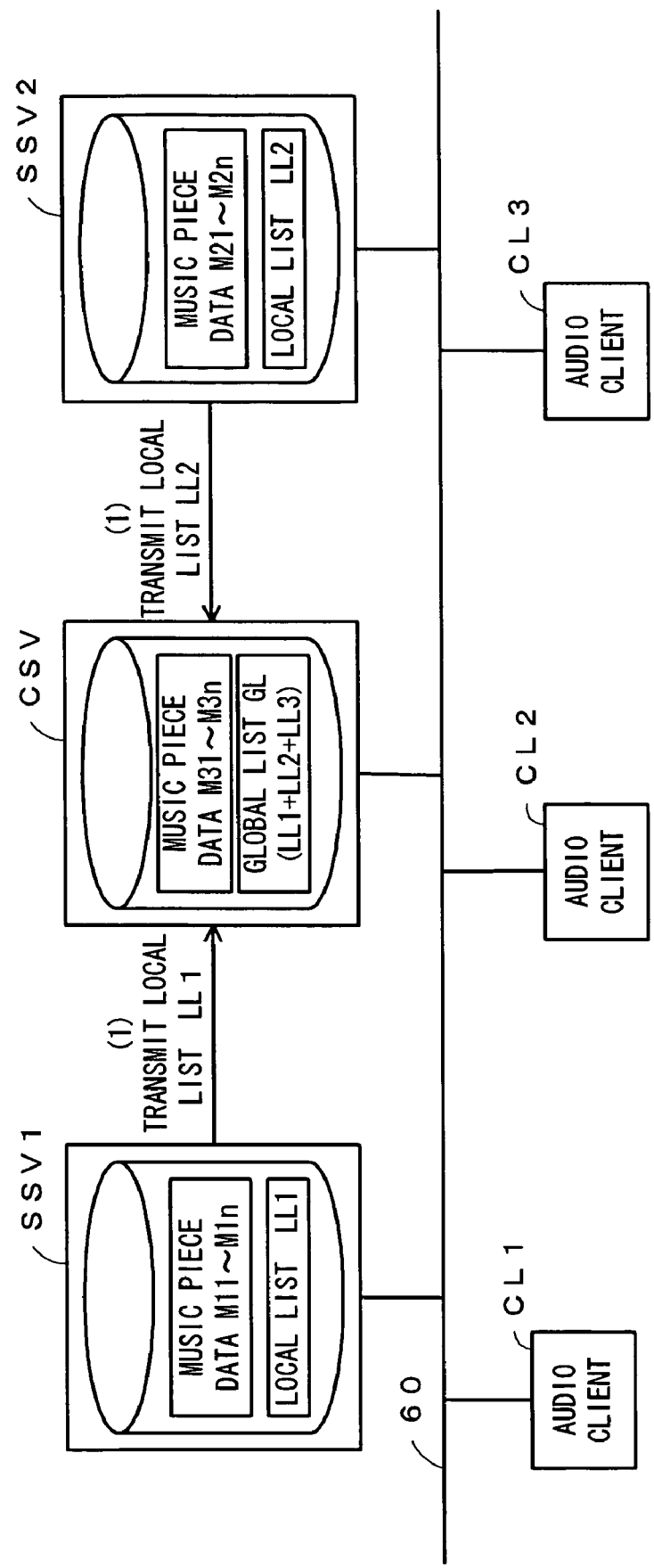
FIG. 30 is a block diagram showing the general configuration of a center server system.

FIG. 30 is a diagram of the general configuration of a center server system. Referring to FIG. 30, the center server system 70 includes a center server CSV, sub servers SSV1 and SSV2, and a plurality of audio clients CL1 to CL3. These are connected with one another through a LAN 60. The configuration of the center server CSV and the sub server SSV are the same as those in FIG. 3. FIG. 30 shows the two sub servers SSV (SSV1 and SSV2), but at least one such sub server SSV is necessary. At least one client CL is necessary as well.

In the global list server system 10, all the servers SV1 to SV3 on the LAN 50 have the global list GL, while in the center server system 70, only the center server CSV has the global list GL. The center server CSV further includes music piece data M31 to M3n and the local list LL3. Meanwhile, the sub server SSV1 includes the music piece data M11 to M1n and the local list LL1. The sub server SSV2 includes the music piece data M21 to M2n and the local list LL2.

When the music piece data stored in the sub servers SSV1 and SSV2 is updated, the sub servers SSV1 and SSV2 transmit the updated local lists LL1 and LL2 to the center server CSV ((1) in FIG. 30). The center server CSV receives the local lists LL1 and LL2 and updates the global list GL together with the local list LL3. Note that the local list LL3 is not transmitted from the center server CSV to the sub servers SSV1 and SSV2. The local lists LL1 and LL2 are not exchanged between the sub servers SSV1 and SSV2 either.

Figure 31A:
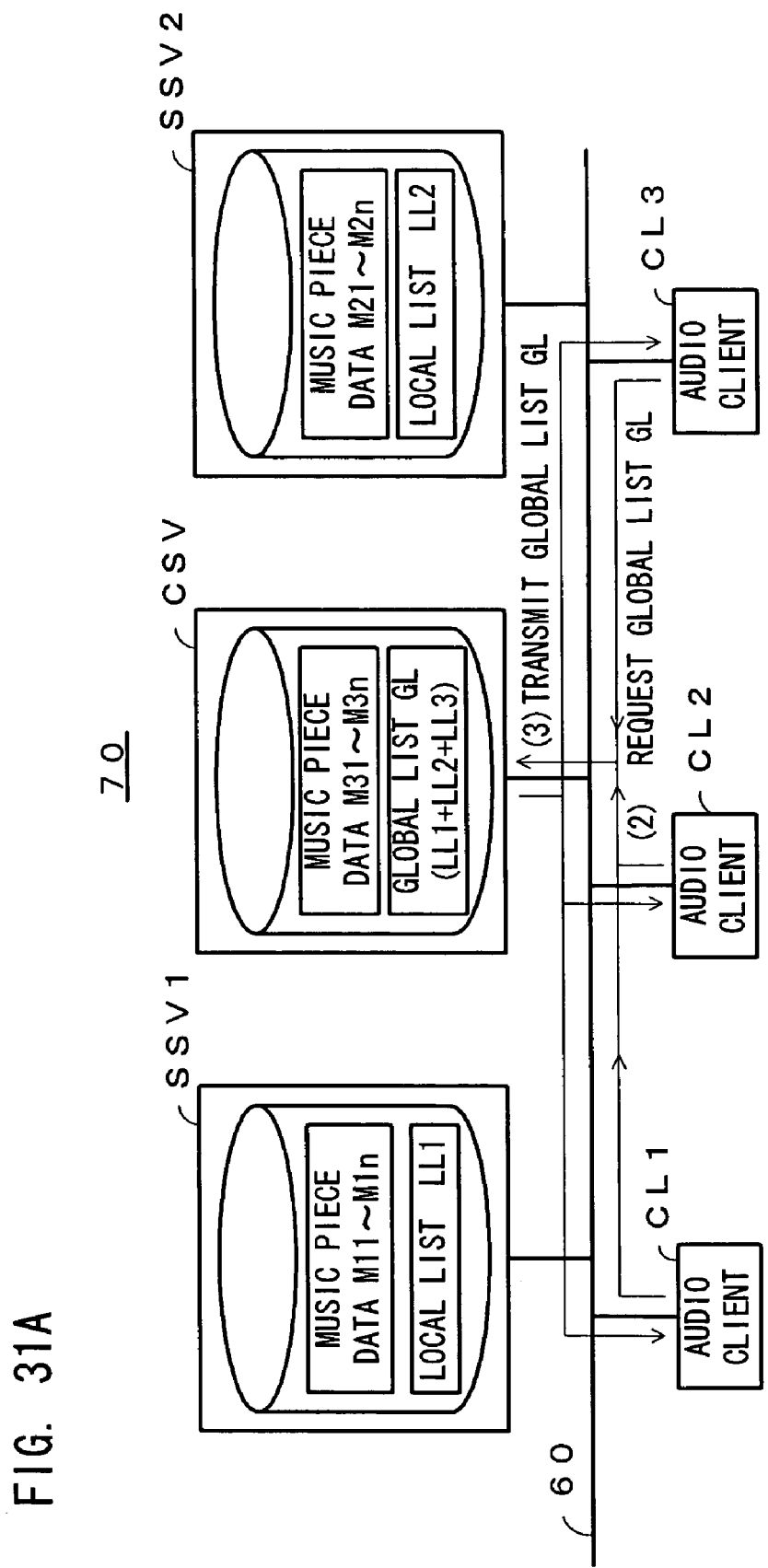

Referring to FIG. 31A, the audio clients CL1 to CL3 transmit a transfer request for the global list GL to the center server CSV ((2) in FIG. 31A). The center server CSV receives the request for the global list GL and transmits the global list GL to the audio clients CL1 to CL3 ((3) in FIG. 31A).

When the audio client CL2 reproduces music piece data M21 after receiving the global list GL, the audio client CL2 transmits a music piece data transfer request for the music piece data M21 to the center server CSV as shown in FIG. 31B ((4) in FIG. 31B). The center server CSV receives the music piece data transfer request and requests the sub server SSV2 storing the music piece data M21 to distribute the music piece data M21 to the center server CSV ((5) in FIG. 31B). Referring to FIG. 31C, the sub server SSV2 receives the request from the center server CSV and distributes the music piece data M21 to the center server CSV ((6) in FIG. 31C). The center server CSV distributes the music piece data M21 distributed from the sub server SSV2 to the audio client CL2 ((7) in FIG. 31C).

As in the foregoing, in the center server system 70, requests from the audio client CL such as the transfer request for the global list GL or the music piece data transfer request are all transmitted to the center server CSV Music piece data M is distributed from the sub server SSV to the audio client CL through the center server CSV The center server CSV relays between the sub server SSV and the audio client CL. The center server CSV furthermore includes music piece data M and distributes the music piece data M stored in it. The audio client CL can reproduce all music data pieces M on the LAN 60 by requesting the center server CSV.

Note that when the music piece data M is requested from the audio client CL, a music piece data transfer request may be requested to the sub server SSV storing the desired music piece data M without through the center server CSV.

2. 2. System Operation
2. 2. 1. Server Activation Processing

In the center server system 70, the server SV activated first on the LAN 60 operates as the center server CSV and the servers SV activated second or later and on operate as sub servers SSV.

Referring to FIG. 32, the operation from steps S1 to S6 of the server SV upon activation (hereinafter referred to as "activated server SV") is the same as that in FIG. 5. The activated server SV broadcasts a magic word and determines whether or not another server SV on the LAN 60 operates. If there is not server specifying information in the server list after two seconds from the broadcasting (S7), which means that there is not other server SV on the LAN 60, so that the activated server SV operates as the center server CSV (S50). The operation of the center server CSV will be described in 2. 2. 2.

Meanwhile, when there is server specifying information in the server list in step S7, which means that the center server CSV is already activated, so that the activated server SV operates as a sub server SSV At the time, the sub server SSV carries out connection processing to the center server CSV (S1000). The connection processing at the time is the same that in step S1000 in FIG. 6. When the sub server SSV carries out connection processing (S1000), the center server CSV carries out connection response processing (the same processing as S1020 in FIG. 6).

After the connection processing (S1000) to the center server CSV, the sub server SSV carries out local list transmitting processing to the center server CSV (S11) and transmits its own local list LL to the center server CSV. The details of the local list transmitting processing are the same as those in FIG. 7. Note that in the global list server system 10, the server SV broadcasts a readiness command after carrying out the connection processing to all the other servers SV, but the sub server SSV broadcasts the readiness command after carrying out the connection processing to the center server CSV.

By the above described operation, when the activated server SV operates as a sub server SSV, the activated server SV connects with the center server CSV and transmits its own local list LL to the center server CSV. Then, the activated server SV carries out the operation of the sub server SSV (S65). The operation of the sub server SSV will be described in 2. 2. 3.

2. 2. 2. Center Server Operation After Activation Processing

Figure 33:
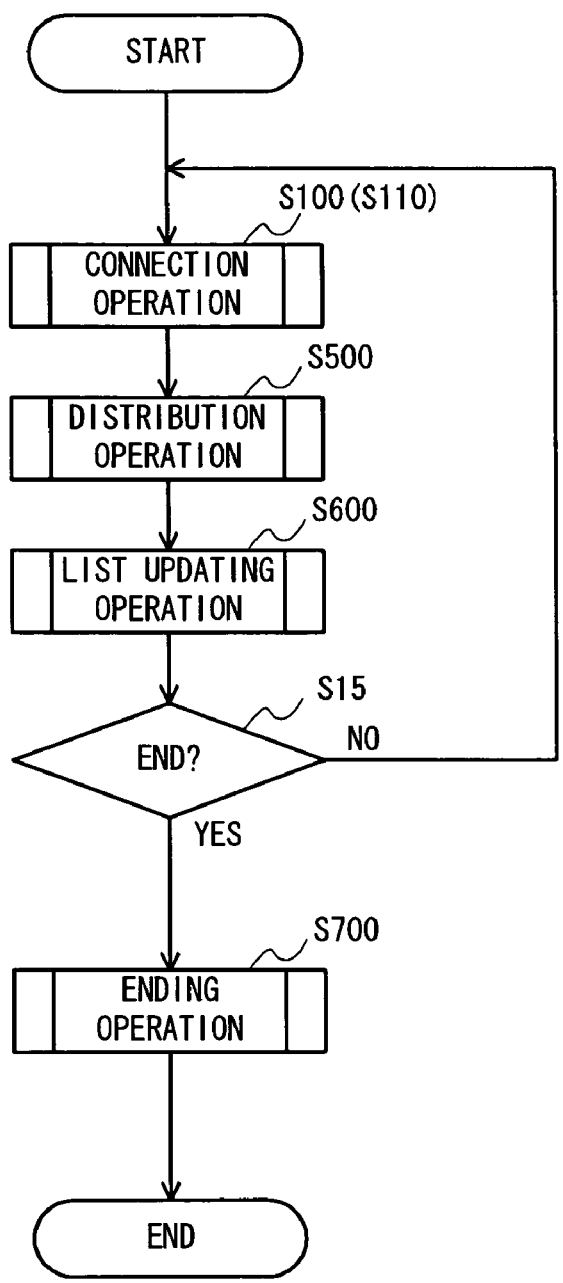
FIG. 33 is a flowchart for use in illustration of operation in the center server operating in the center server system shown in FIG. 30.

Referring to FIG. 33, the center server CSV carries out connection processing (S100, S110), distribution operation (S500), list updating operation (S600) and ending operation (S700) at the end of the operation (S15). The connection processing (S100, S110) is the same as the connection processing of the server in the global list server system 10 (1. 3. 2. 1 and 1. 3. 2. 2). Now, the distribution operation (S500), the list updating operation (S600), and the ending operation (S700) will be described.

2. 2. 2. 1. Distribution Operation

The audio client CL2 obtains the global list GL from the center server CSV When the audio client CL2 selects music piece data M21 in the sub server SSV2 from the global list GL, the audio client CL2 transmits a music piece data transfer request to the center server CSV. The audio client CL2 receives the music piece data M21 distributed through the center server CSV from the sub server SSV2 and reproduces the data. The operation will be detailed.

Figure 34:
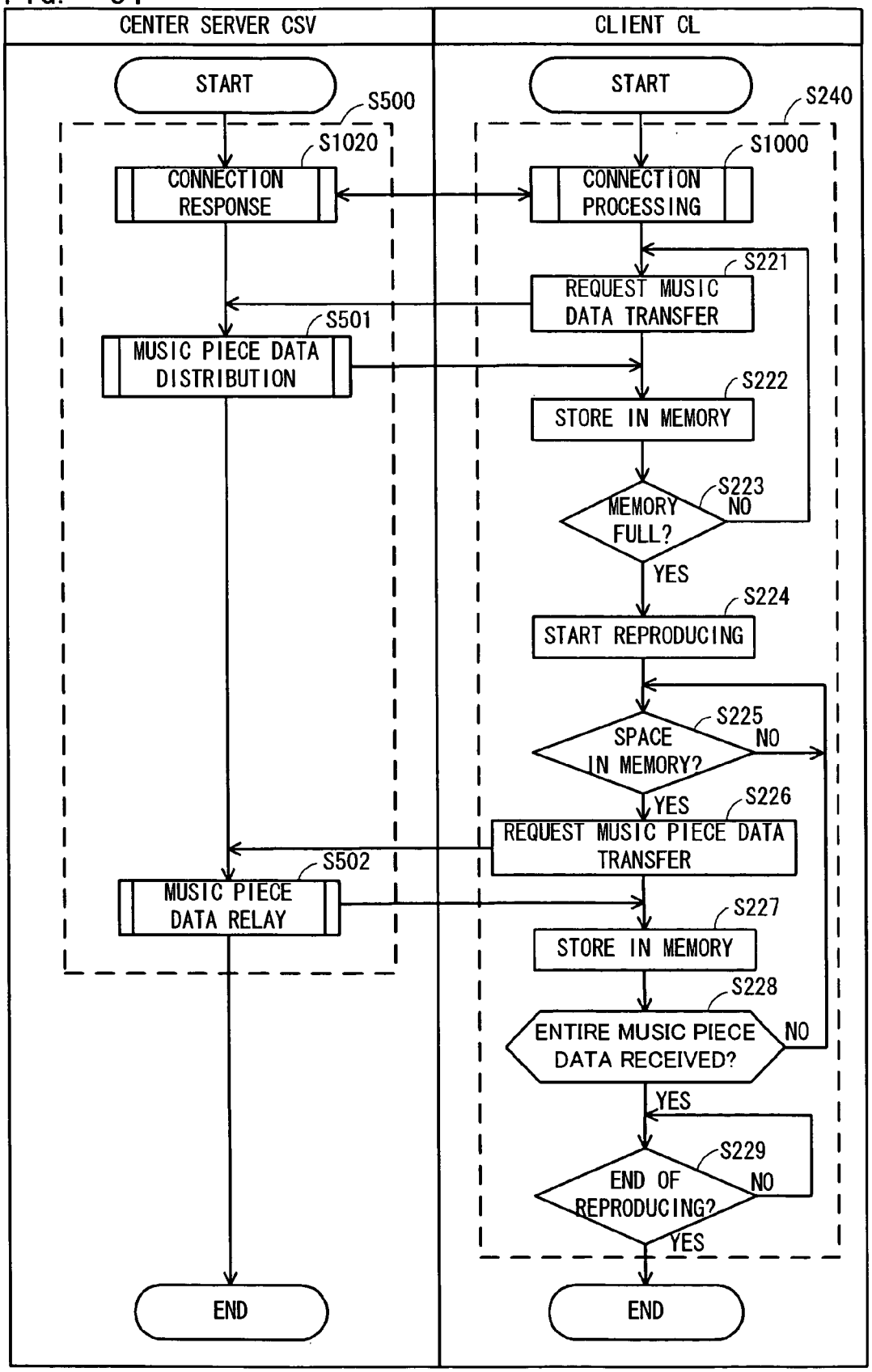
FIG. 34 is a flowchart for use in illustration of the details of the operation in step S500 in FIG. 33.

Referring to FIG. 34, the audio client CL2 carries out connection processing to the center server CSV (S1000). In the meantime, the center server CSV carries out connection response processing (S1020). By the connection processing, the connection to distribute the music piece data M21 is established between the center server CSV and the audio client CL2. Note that at the time, the center server CSV maintains the connection with the audio client CL2 established by the previous connection operation (S110). Therefore, the audio client CL2 establishes two kinds of connection with the center server CSV, one for receiving the global list and the other for receiving music piece data. In this way, the command port for receiving the global list is separated from the command port for requesting music piece data transfer, so that busy traffic can be reduced.

The operation of the audio client CL2 after the connection processing is the same as the operation of the audio client CL2 in FIG. 11.

When the audio client CL transmits a music piece data transfer request for music piece data M21 to the center server CSV in step S221, the center server CSV carries out music piece data distribution processing (S501). Now, the music piece data distribution processing will be described.

Figure 35:
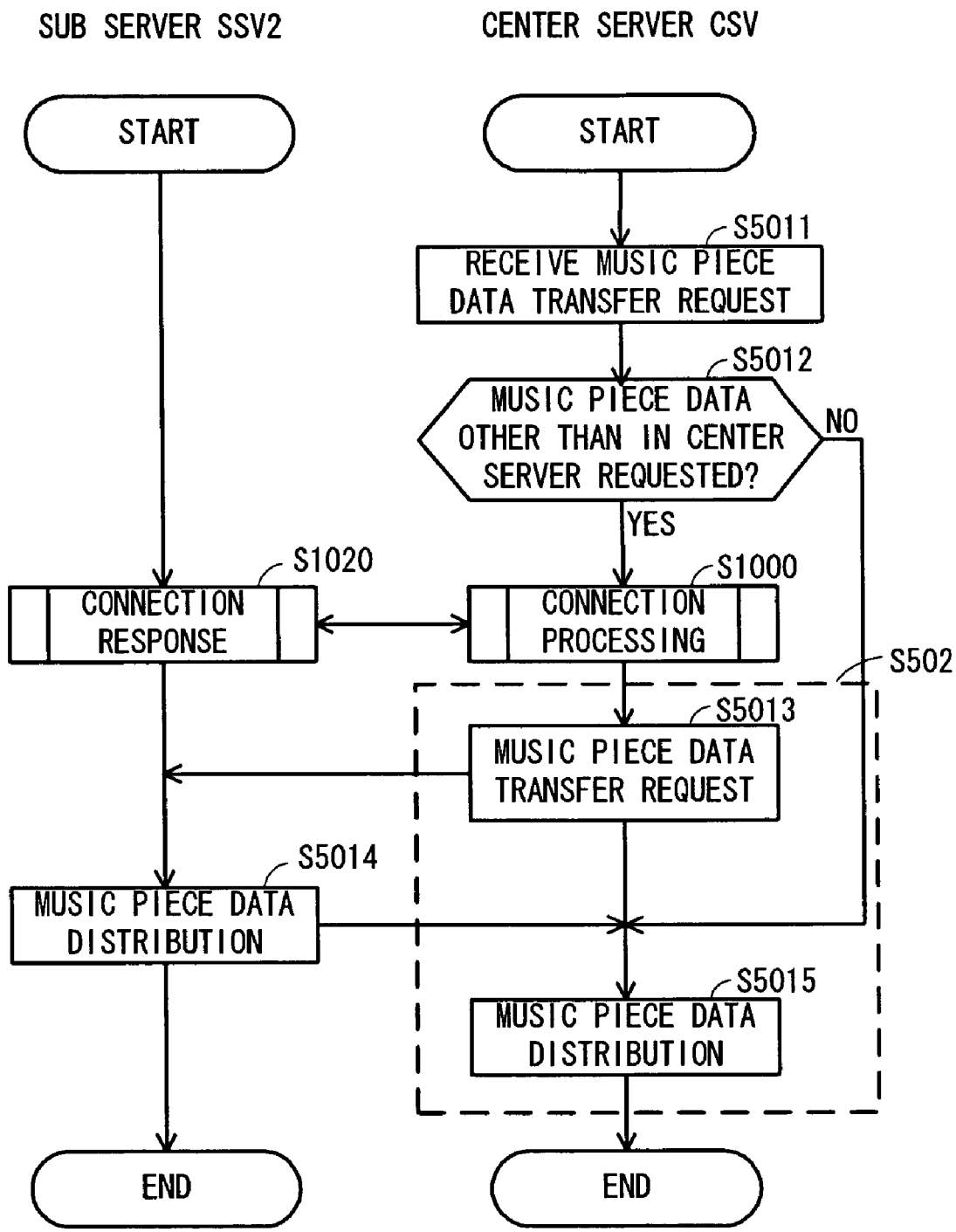
FIG. 35 is a flowchart for use in illustration of the details of the operation in step S501 in FIG. 34.

Referring to FIG. 35, the center server CSV receives a music piece data transfer request from the audio client CL2 (S5011) and determines whether or not the requested music piece data is in the center server CSV (S5012). If the music piece data is in the center server CSV, the center server CSV distributes the music piece data to the audio client CL2 (S5015).

Here, the audio client CL2 requests music piece data M21 (S5012) and therefore the center server CSV obtains the music piece data M21 from the sub server SSV2 storing the music piece data M21 and distributes the data to the audio client CL2. The center server CSV carries out connection processing to the sub server SSV2 (S1000). In the meantime, the sub server SSV2 carries out connection response processing (S1020) and establishes connection for requesting music piece data transfer between the servers. In order to reduce the traffic, the connection for obtaining local lists and the connection for transferring music piece data are established. After establishing the connection, the center server CSV carries out music piece data relay processing (S502). More specifically, the center server CSV transmits the music piece data transfer request for the music piece data M21 to the sub server SSV2 (S5013). Upon receiving the music piece data transfer request, the sub server SSV2 distributes the music piece data M21 to the center server CSV based on the obtaining start address and the data length in the music piece data transfer request (S5014). The center server CSV distributes the music piece data M21 distributed from the sub server SSV2 to the audio client CL2 (S5015).

By the above described operation, the center server CSV distributes the music piece data M21 to the audio client CL2 in step S501.

Note that after the audio client CL2 starts reproducing music piece in step S224, the center server CSV receives the music piece transfer request in step S226, carries out music piece data relay processing (S502) and continues to distribute the music piece data M21.

By the above described operation, the center server CSV relays between the sub server SSV2 and the audio client CL2, so that the audio client CL2 can reproduce the music piece data M21.

Note that the client CL2 can determine that the music piece data M21 is stored in the sub server SSV2 from the global list GL, so that the client CL2 may carry out distribution request processing directly to the sub server SSV2 (S240), and the sub server SSV2 may carry out distribution operation (S200). The operation in this case is the same as that in FIG. 11.

2. 2. 2. 2. List Updating Processing

In the center serve system 70, only the center server CSV produces the global list GL. Therefore, when the center server CSV registers new music piece data, the center server CSV does not have to transmit list updating notification to the plurality of sub servers SSV on the LAN 60, and the list updating notification is carried out only to the audio client CL. The operation of the center server CSV in response to list updating notification from the sub server SSV is the same as the operation of the server SV2 in FIG. 19. The operation of the center server CSV when the sub server SSV is disconnected is the same as the operation of the server SV1 in FIG.

20. Now, the list updating operation by the center server CSV when the center server CSV registers new music piece data M31 will be described.

2. 2. 2. 2. 1. When Its Own local List is Updated

Figure 36:
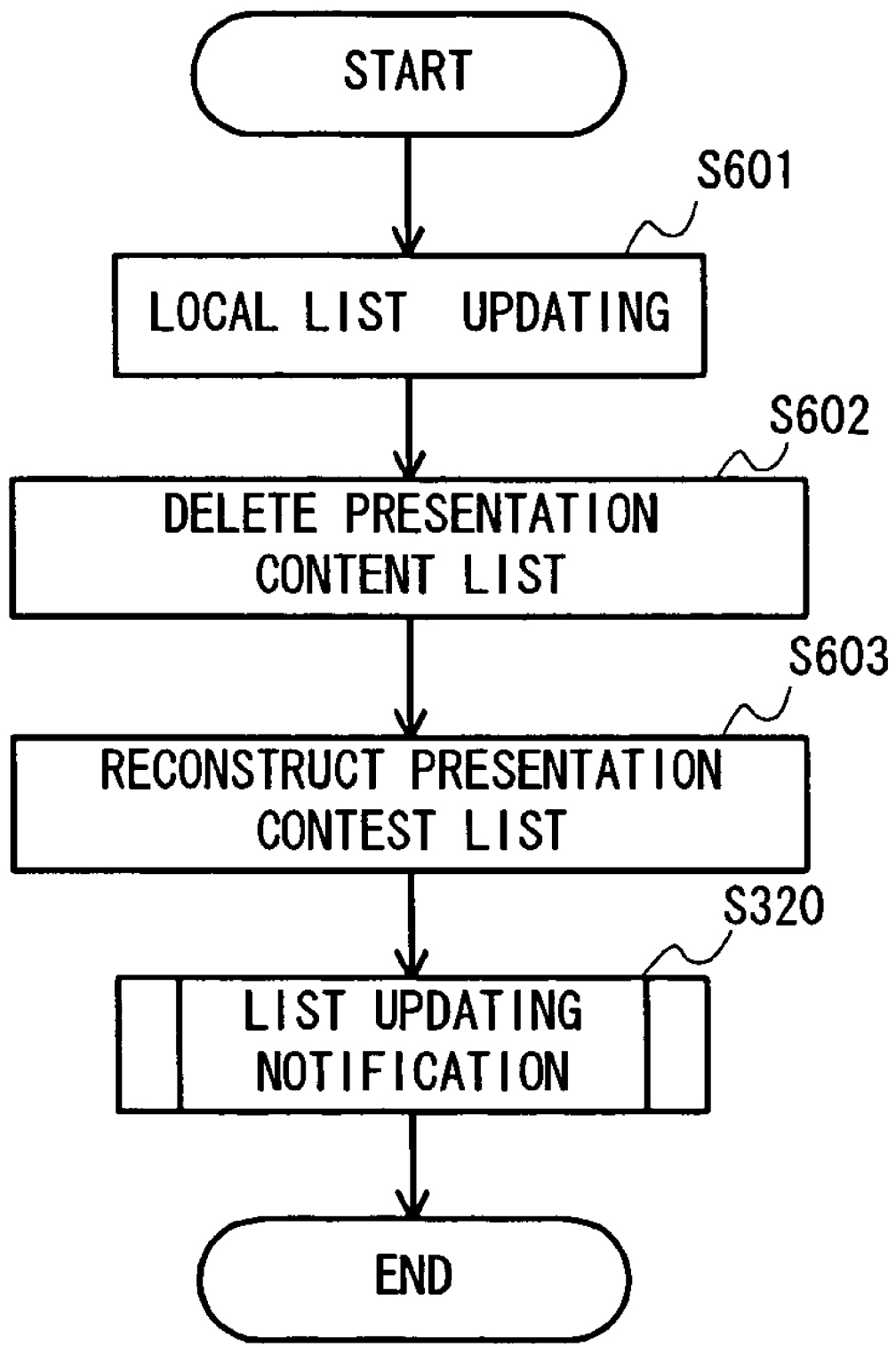
FIG. 36 is a flowchart for use in illustration of the details of updating operation when the center server updates its own local list in the updating operation in step S600 in FIG. 35.

Referring to FIG. 36, when the music piece data M31 is updated, the center server CSV updates the local list LL3 (S601) and deletes the existing presentation content list PL (S602). Thereafter, a new presentation content list PL is produced (S603) and list updating notification processing is carried out (S320). The list updating notification processing is carried out to the plurality of audio clients CL on the LAN 60.

2. 2. 2. 3. Ending Operation

Ending Operation of Center Server when Client CL is Not Reproducing

Figure 37:
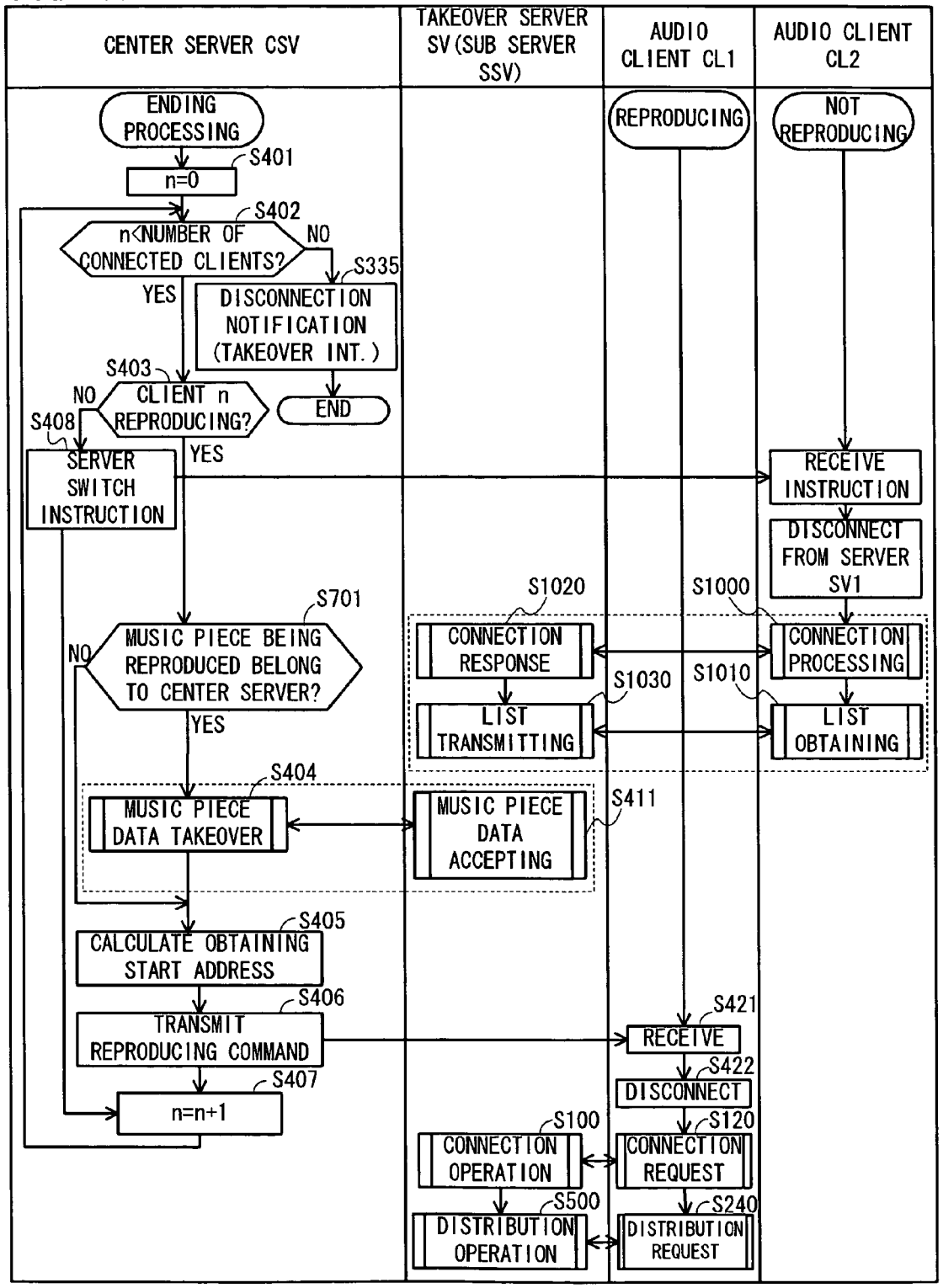
FIG. 37 is a flowchart for use in illustration of the details of the ending operation in step S700 in FIG. 33.

Referring to FIG. 37, when an audio client CL is not in the process of reproducing based on step S401 (in the case of the client CL2 in FIG. 37), the ending operation of the center server CSV (S403, S408, S335, S431, S432, S1000, S1020) is the same as that in FIG. 21.

Ending Operation of Center Server While Distributing Music Piece Data in Sub Server When the audio client CL1 is in the process of reproducing music piece data (S403), the center server CSV determines whether or not the music piece data being reproduced by the audio client CL1 is music piece data stored by the center server CSV (S701). If the music piece data is not data stored by the center server CSV based on the result of determination, for example if the audio client CL1 reproduces music piece data M21, the center server CSV is carrying out relay processing for the music piece data M21. At the time, the center server CSV calculates the obtaining start address (S405). The obtaining start address is calculated based on the music piece data length obtained from the sub server SSV2 by the center server CSV The calculated obtaining start address is included in the reproducing request command and transmitted to the audio client CL1 (S406). Note that in the reproducing request command, the server specifying information of the takeover server SV for the center server CSV is included. The center server CSV sets the sub server in the server list stored in the center server whose server ID=1 as the takeover server SV. When the server ID of the sub server SSV1 is 1, the sub server SSV1 receives the disconnection notification from the center server CSV as well as a takeover instruction and then operates as the center server CSV.

After transmitting the reproducing command, the center server CSV increments the count value n and returns to step S402.

The audio client CL1 receives the reproducing command from the center server CSV (S421) and then disconnects from the center server CSV (S422). After the disconnection, client connection request processing (S120) is carried out to the takeover server SV (sub server SSV1), and the takeover server SV carries out connection operation (S100), so that the audio client CL1 establishes connection with the takeover server SV. Then, the audio client CL1 carries out distribution request operation (S240). At the time, the audio client CL1 carries out music piece data transfer request using the obtaining start address received in step S421. The takeover server SV carries out distribution operation based on the obtaining start address in the music piece data transfer request (S500). By the above described operation, the audio client CL1 can obtain the rest of the music piece data M21 from the takeover server SV and continue to reproduce the music piece data M21.

Ending Operation of Center Server While Distributing Its Own Music Piece Data

If the audio client CL1 reproduces music piece data M31 based on the result of determination in step S701, the center server CSV must transmit the storing music piece data M31 to the takeover server SV Therefore, the center server CSV carries out music piece data takeover processing (S404). The takeover server SV carries out music piece data accepting processing (S411). After the music piece takeover processing, the center server CSV proceeds to step S405.

After transmitting a reproducing command in step S406, the center server CSV increments the count value n (S407) and returns to step S402 to repeat the operation. In this way, the ending operation can be carried out to all the audio clients CL connected to the center server CSV After the ending operation is carried out to all the audio clients CL, in other words, when the count value n is more than the number of connected clients (S402), the center server CSV transmits disconnection notification to the sub server SSV (S335) and ends its operation.

Figure 38:
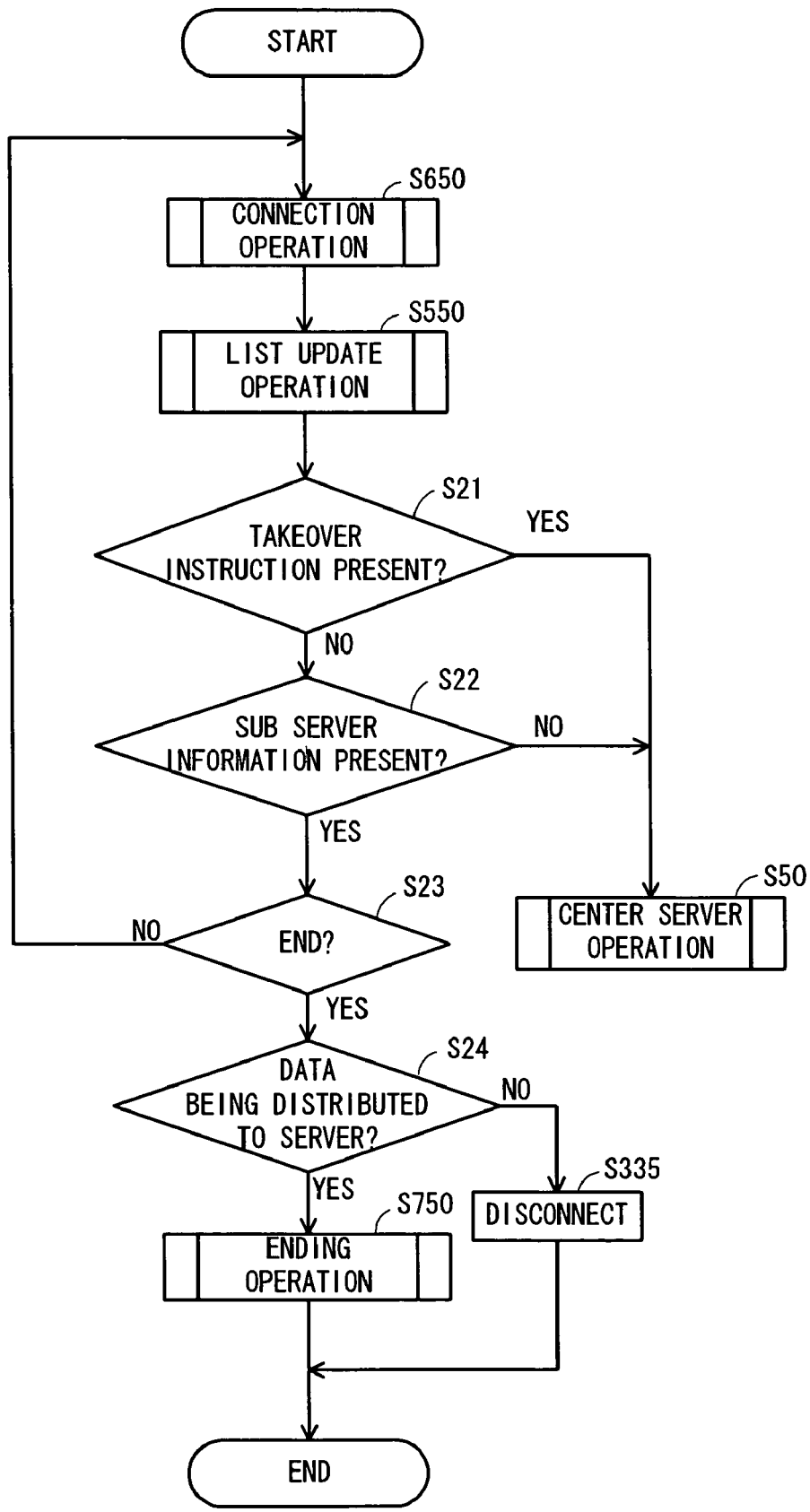
FIG. 38 is a flowchart for use in illustration of the operation of a sub server operating in the center server system in FIG. 30.

Note that the center server CSV transmits a takeover instruction to the takeover server together with the disconnection notification to the other sub servers SSV 2. 2. 3. Sub Server Operation After Activation Processing In the center server system 70, only the center server CSV transmits the global list GL and music piece data M to the audio client CL. Therefore, the center server CSV carries out the connection operation (S100) and the list updating operation (S500) in order to obtain the updated local lists LL from the sub servers SSV and distributes the latest global list GL to the audio clients CL. Meanwhile, as shown in FIG. 38, the sub server SSV also carries out the connection operation (S650) and the list updating operation (S550). The sub server SSV does not distribute the global list GL to the audio client CL. Meanwhile, when the center server CSV carries out the ending operation (S700), a sub server SSV first connected to the center server CSV receives a takeover instruction from the center server CSV In other words, the sub server SSV can take over for the center server CSV Therefore, the sub server SSV obtains the local lists LL of sub servers SSV activated after its own activation and prepares so that it can serve as the center server once the takeover instruction is received from the center server CSV.

After carrying out the connection operation in step S650 and the list updating processing in step S550, the sub server SSV determines whether or not the takeover instruction is received from the center server CSV (S21). When the takeover instruction is received, the sub server SSV carries out the operation of a center server as the center server CSV (S50). Meanwhile, even without such a takeover instruction, if there is no server connected to the sub server SSV (no center server CSV and no other sub servers SSV), the sub server SSV carries out the operation of a center server as the center server CSV (S22). Whether there is a server SV connected to the sub server SSV is determined based on the server list.

When the sub server SSV ends the operation (S23) and the sub server SSV does not distribute music piece data M to the center server CSV (S24), the operation ends after transmission of disconnection notification (S335). Meanwhile, when music piece data M is distributed to the center server CSV, and the music piece data M is taken over to the center server CSV (S750), the operation ends.

Now, the connection operation (S650), the list updating operation (S550), and the ending operation (S750) will be described.

2.2.3.1. Connection Operation

Figure 39:
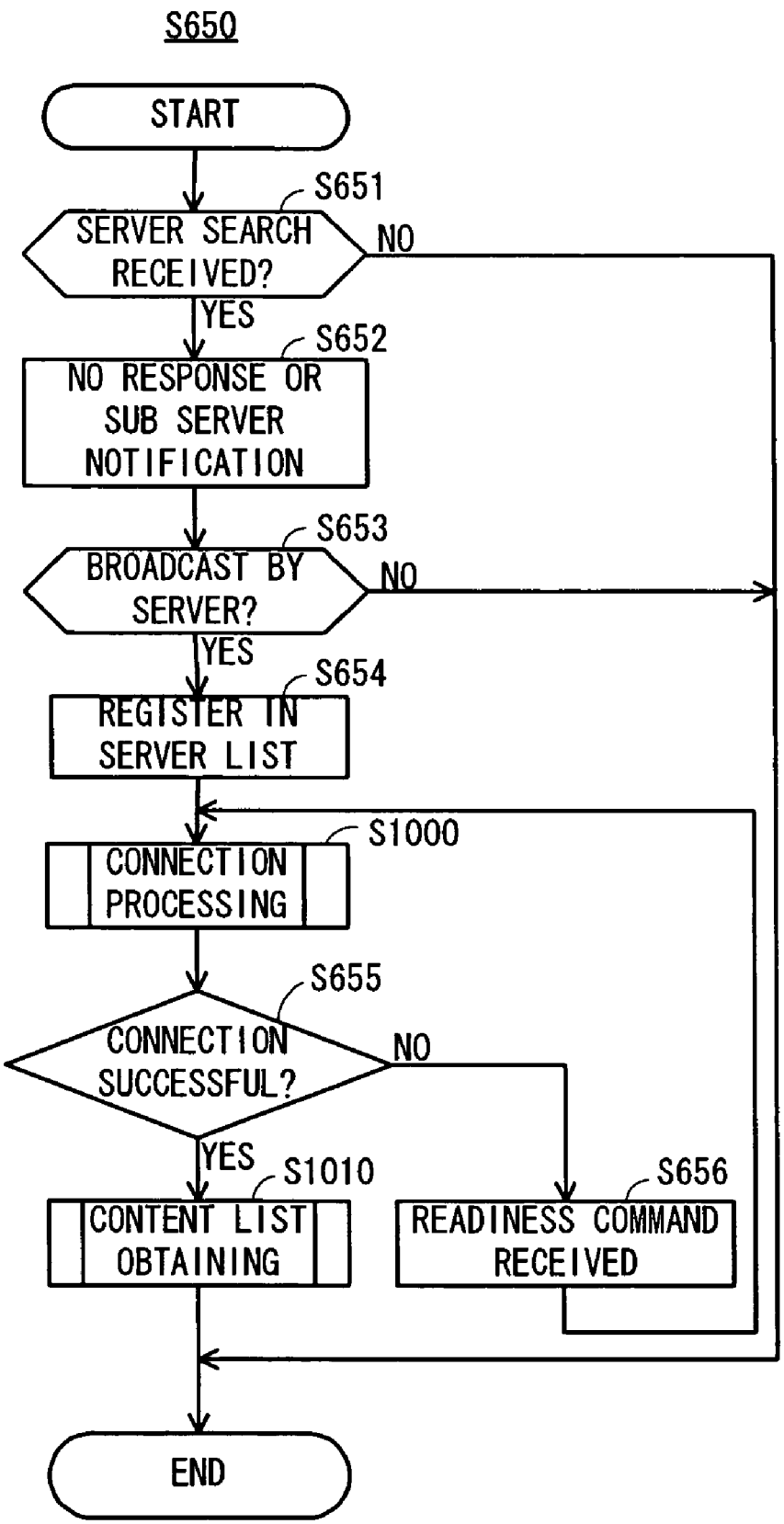
FIG. 39 is a flowchart for use in illustration of the details of the operation in step S650 in FIG. 38.

Referring to FIG. 39, when the sub server SSV1 in operation receives a magic word for server searching (S651), the sub server SSV1 does not respond or responds to indicate its being a sub server SSV (S652). In this way, the audio client CL cannot connect with the sub server SSV Then, it is determined whether the magic word has been broadcast by an activated server SV or an audio client CL (S653). The sub server SSV separately includes a port for receiving a magic word for searching from an activated server SV (another sub server SSV) and a port for receiving a magic word for searching from an audio client CL, so that the determination in step S653 can be made. Note that the magic word for searching may be different between the activated server SV and the audio client CL, so that the sub server SSV can make determination in step S653.

If the audio client CL has broadcast based on the result of determination in step S653, the sub server SSV1 ends the connection operation. Meanwhile, if the activated sub server SV (hereinafter described as the sub server SSV2) has broadcast, the activation of the sub server SSV2 is after the activation of the sub server SSV1. At the time, the sub server SSV1 registers the server specifying information of the sub server SSV2 activated after the sub server SSV1 in the server list (S654). The server specifying information is broadcast together with the magic word.

The sub server SSV1 then carries out connection processing (S1000) to the sub server SSV2 in order to obtain the local list LL2. During the connection processing between the sub server SSV2 as the activated server SV and the center server CSV (i.e. during the activation processing), the connection processing (S1000) to the sub server SSV2 by the sub server SSV1 fails. In this case, the sub server SSV1 receives a preparation OK command from the sub server SSV2 (S656) and then carries out the connection processing (S1000). If the connection is successful (S655), the sub server SSV1 obtains the local list LL2 from the sub server SSV2 and stores the list in the HDD 14 (S1010).

By the above described operation, the sub server SSV obtains the local lists LL of all the sub servers SSV activated after the sub server SSV is activated and stores the lists in the HDD 14. When the sub server SSV serves as the center server CSV upon receiving a takeover instruction, the sub server SSV must produce the global list GL based on the obtained local lists LL and transmit the global list GL to the plurality of audio clients CL. Note that the local lists LL of servers SV activated before the activation of the sub server SSV (the center server CSV or other sub servers SSV) are not obtained. In the center server system 70, the center server CSV is taken over by the servers SV in the order of activation. Therefore when a sub server SSV serves as the center server CSV, the servers SV activated before the sub server SSV are all disconnected from the LAN 60. Therefore, the local lists LL of those servers SV activated before the sub server SSV are not necessary.

2. 2. 3. 2. List Updating Operation 2. 2. 3. 2. 1. When Its Own Local List is Updated When the sub server SSV updates its music piece data, it transmits list updating notification to the center server CSV and sub servers SSV activated before.

Figure 40:
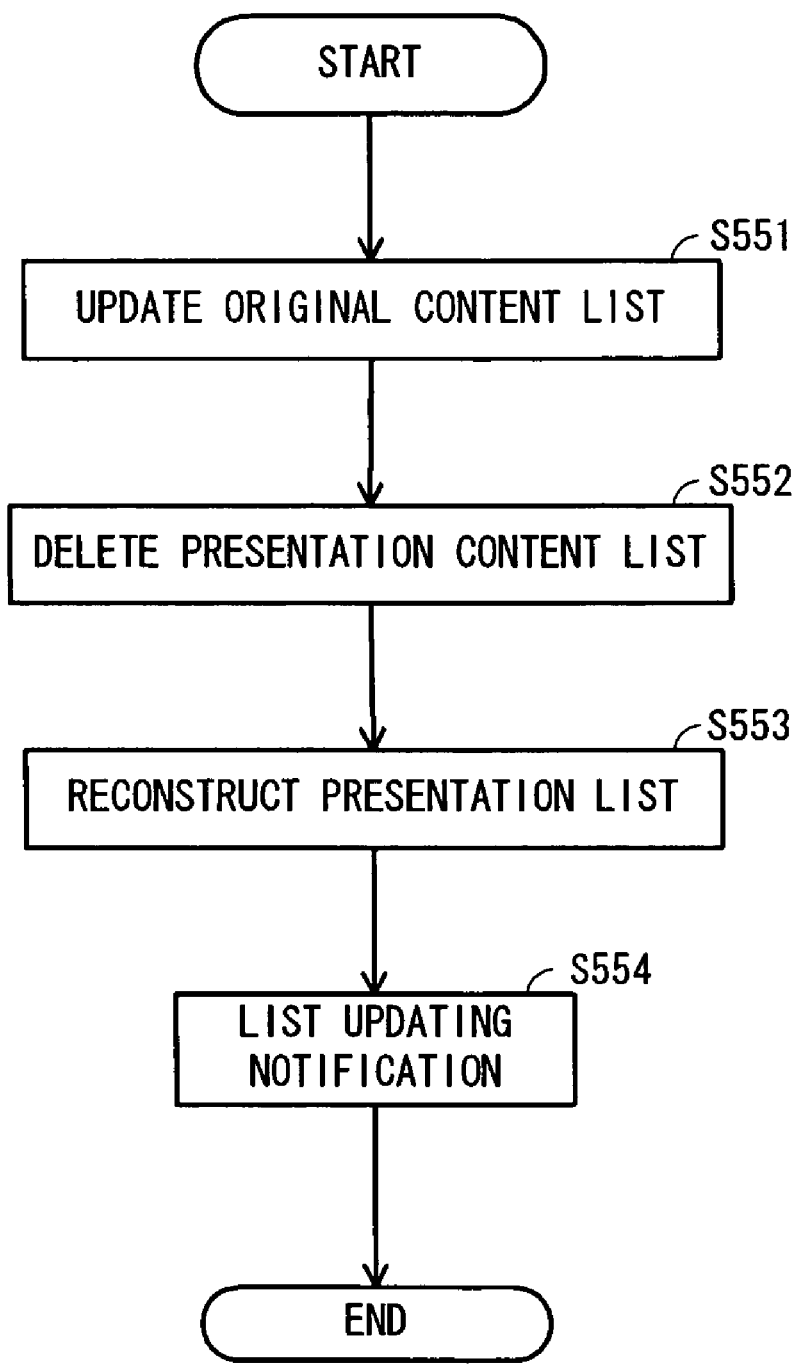
FIG. 40 is a flowchart for use in illustration of the details of list updating operation when its own local list is updated in the list updating operation in FIG. 550 in FIG. 38.

Referring to FIG. 40, when the sub server SSV1 updates its music piece data, the sub server SSV1 updates the local list LL1 (S551). Then, the sub server SSV1 deletes the existing presentation content list PL (S552). The presentation content list PL of the sub server SSV1 includes the storage location of the local list LL1 of the sub server SSV1 and the storage location of the local lists LL of the other sub servers SSV activated after the sub server SSV1. After deleting the presentation content list PL, the sub server SSV1 produces a new presentation content list PL based on the updated local list LL1 (S553). The presentation content list is produced because the list is necessary when the sub server SSV1 operates as the center server CVS. After producing the presentation content list PL, the sub server SSV1 transmits list updating notification (S554). The list updating notification is transmitted to the plurality of servers SV registered in the client list in the sub server SSV1. The servers SV registered in the server list refer to servers SV (center server CSV and sub servers SSV) activated before the sub server SSV1.

2. 2. 3. 2. 2. When Local List of Another Server is Updated

Figure 41:
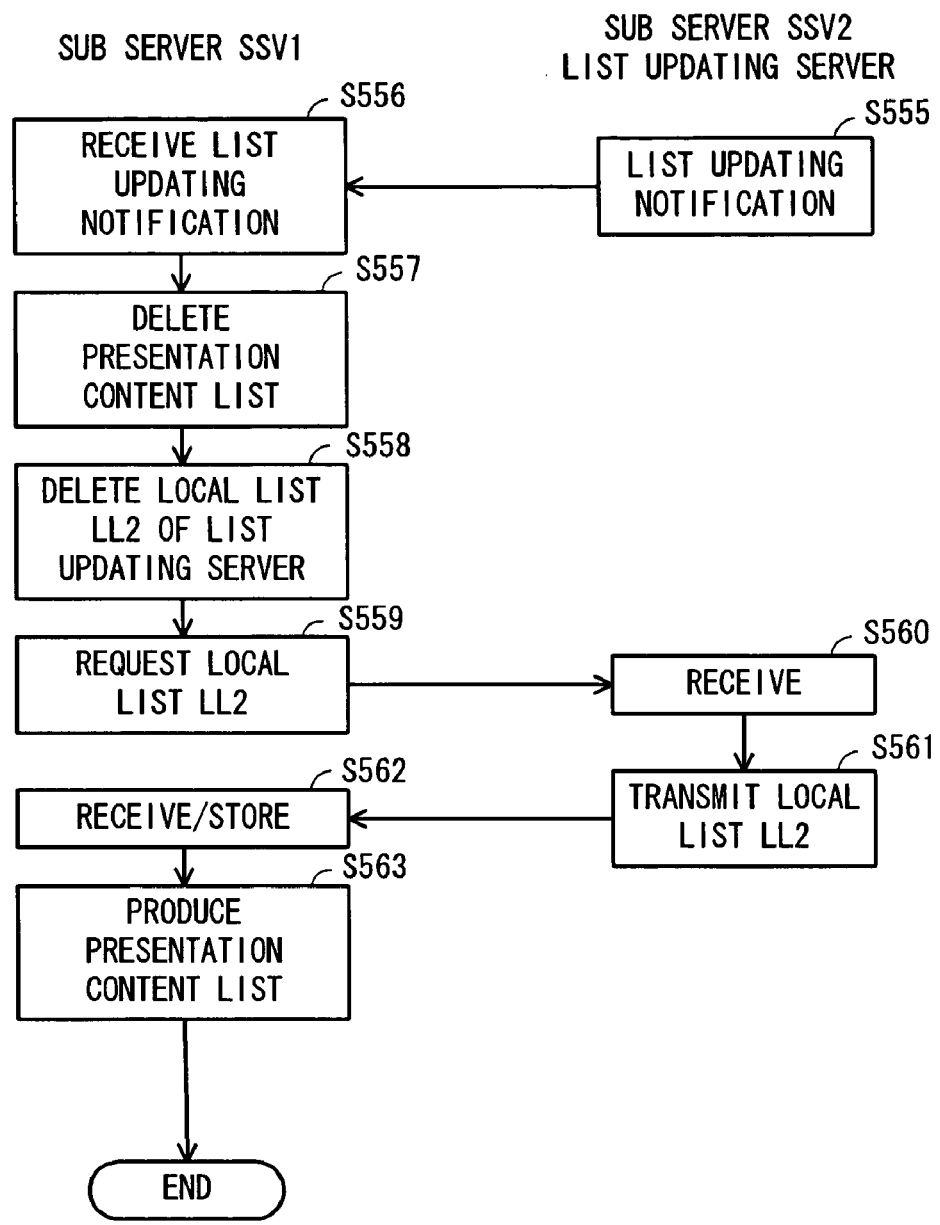
FIG. 41 is a flowchart for use in illustration of the details of list updating operation when the local list of another sub server is updated in the list updating operation in step S550 in FIG. 38.

The sub server SSV1 receives list updating notification from the sub server SSV activated after the sub server SSV1. Referring to FIG. 41, in the center sever system 70 in which the sub servers SSV1 and SSV2 are activated in this order, when the sub server SSV2 registers new music data, the sub server SSV2 transmits list updating notification to the center server CSV and sub server SSV1 activated before the sub server SSV2 (S555). The sub server SSV1 receives the list updating notification (S556) and deletes the existing presentation content list PL (S557). Then, the sub server SSV1 deletes the local list LL2 of the sub server SSV2 (S558). After deleting the local list LL2, the sub server SSV1 transmits a transfer request command for the updated local list LL2 to the sub server SSV2 (S559). The sub server SSV2 receives the transfer request command (S560) and then transmits the local list LL2 to the sub server SSV1 (S561). The sub server SSV1 receives the local list LL2 (S562) and then produces a presentation content list PL (S563).

By the above described operation, if the sub server SSV1 receives a takeover instruction from the center server CSV to operate as the center server CSV, the sub server SSV1 can transmit the latest global list GL to the audio client CL.

2.2.3. 2.3. When Another Sever is Disconnected

Figure 42:
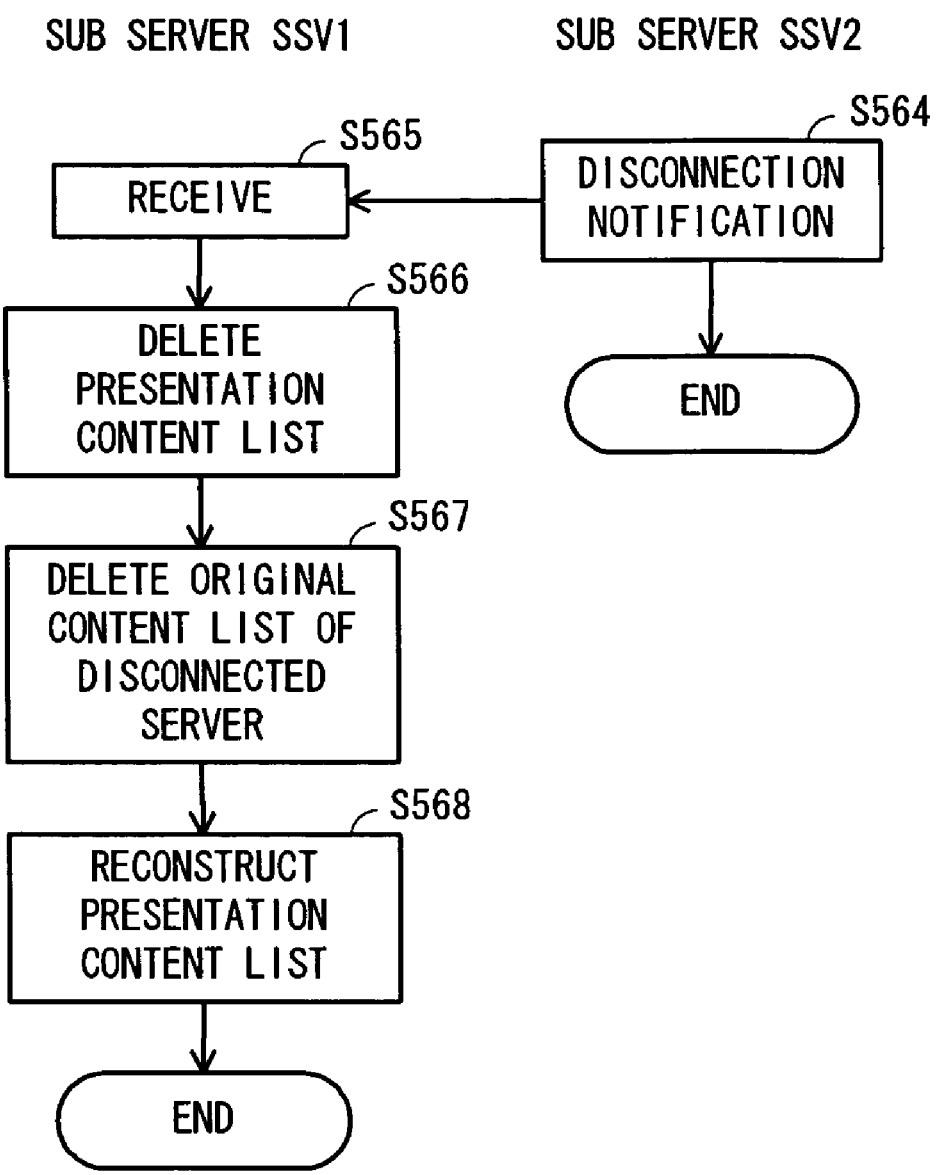
FIG. 42 is a flowchart for use in illustration of the details of the list updating operation when another sub server is disconnected from the LAN in the list updating operation in step S550 in FIG. 40.

Referring to FIG. 42, in the center server system 70 in which the sub servers SSV1 and SSV2 are activated in the order, when the sub server SSV2 ends the operation and is disconnected from the LAN 60, the sub server SSV2 transmits disconnection notification to the servers SV activated before the sub server SSV2 (S564). The disconnection notification is transmitted to all the servers SV registered in the client list in the sub servers SSV2. Upon receiving the disconnection notification (S565), the sub server SSV1 deletes the existing presentation content list PL (S566). Then, the local list LL2 registered in the HDD 14 is deleted (S567). After deleting the local list LL2, the sub server SSV1 produces the presentation content list PL (S568).

2.2.3.3. Ending Operation

Figure 43:
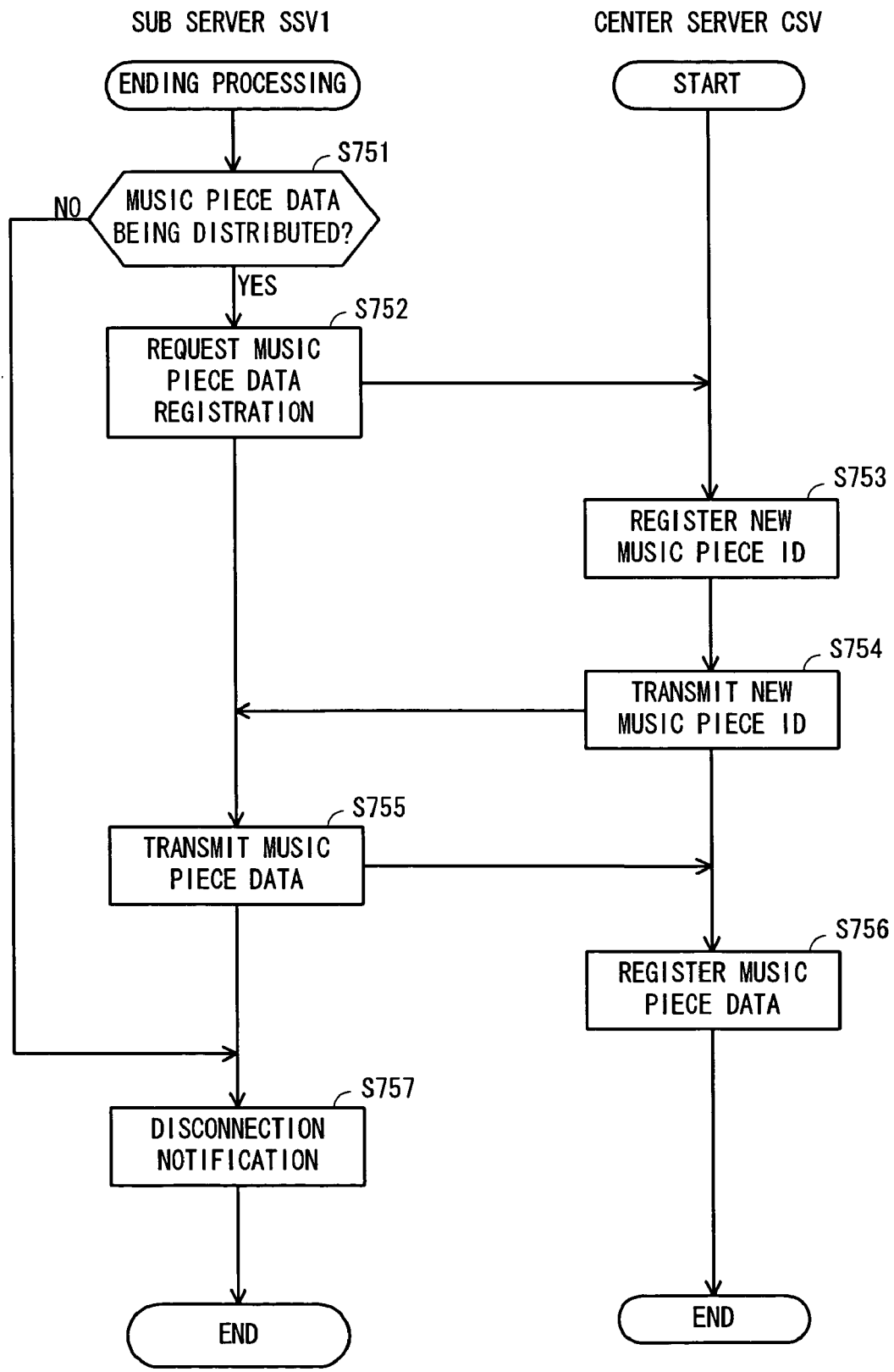
FIG. 43 is a flowchart for use in illustration of the details of ending operation in step S750 in FIG. 38.

Referring to FIG. 43, when the sub server SSV1 ends the operation, the sub server SSV1 determines whether or not music piece data it stores is being distributed to the center server CSV (S751). When the music piece data is not distributed, the sub server SSV1 transmits disconnection notification to the servers SV activated before the sub server SSV1 (S757) and ends the operation. Meanwhile, when the music piece data M11 is being distributed, the sub server SSV1 transmits a registration request command for the music piece data M11 to the center server CSV (S752). The center server CSV receives a request command and registers a new music piece ID in the HDD 14 (S753). After the registration, the center server CSV transmits a new music piece ID to the sub server SSV1 (S754). The sub server SSV1 receives the new music piece ID and transmits the music piece data M11 with the new music piece ID (S755). After the transmission, the sub server SSV1 transmits disconnection notification (S757)

and ends the operation. The center server CSV receives the music piece data M11 and registers the music piece data M11 in the location in the HDD 14 for storing music piece data provided with a new music piece ID (S756).

By the above described operation, even in the process of distributing its own music piece data M, the sub server SSV1 can be disconnected from the LAN 60.

2. 3. Center Server System Including Controller

Figure 44:
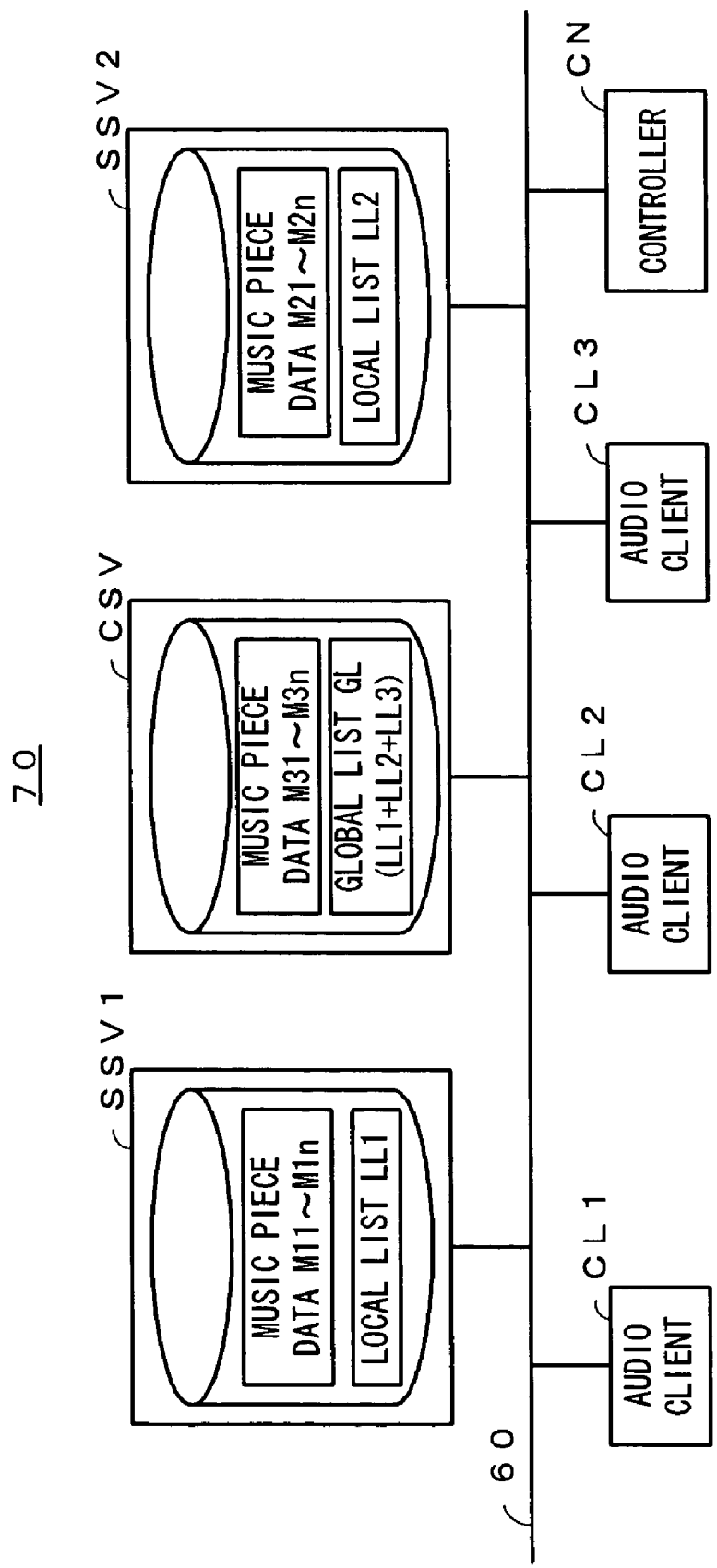
FIG. 44 is a functional block diagram showing the general configuration of a center server system including a controller.

The above described center server system 70 may include a controller CN as shown in FIG. 44. The controller CN is connected with the center server CSV and controls the audio client CL through the center server CSV. The configuration of the controller CN is the same as that in FIG. 25. Controller CN includes controller server list and global list. Note that only one controller CN is shown in FIG. 44, but there may be a plurality of such controllers CN.

When the controller CN controls the audio client CL2 to reproduce a music piece based on music piece data M21, the controller CN transmits a reproducing command to the audio client CL2. More specifically, the controller CN transmits a reproducing command to the audio client CL2 through the center server CSV. The operation of the audio client CL2 in response to the received reproducing command is the same as that in FIG. 31B and FIG. 31C.

2. 3. 1. System Operation

The controller CN connects with the center server CSV and carries out handle obtaining processing. The handle obtaining processing is the same as that in FIG. 27. The operation of the server SV2 in FIG. 27 is carried out by the center server CSV All the audio clients CL1 to CL3 in the center server system 70 are connected with the center server CSV Therefore, the controller CN needs only carry out the handle obtaining processing to the center server CSV to obtain the monitoring handles and control handles for the audio clients CL1 to CL3.

The operation of obtaining and updating the global list GL is the same as that in 1. 4. 3. 2. Note however that the server that transmits the global list GL is the center server CSV.

Figure 45:
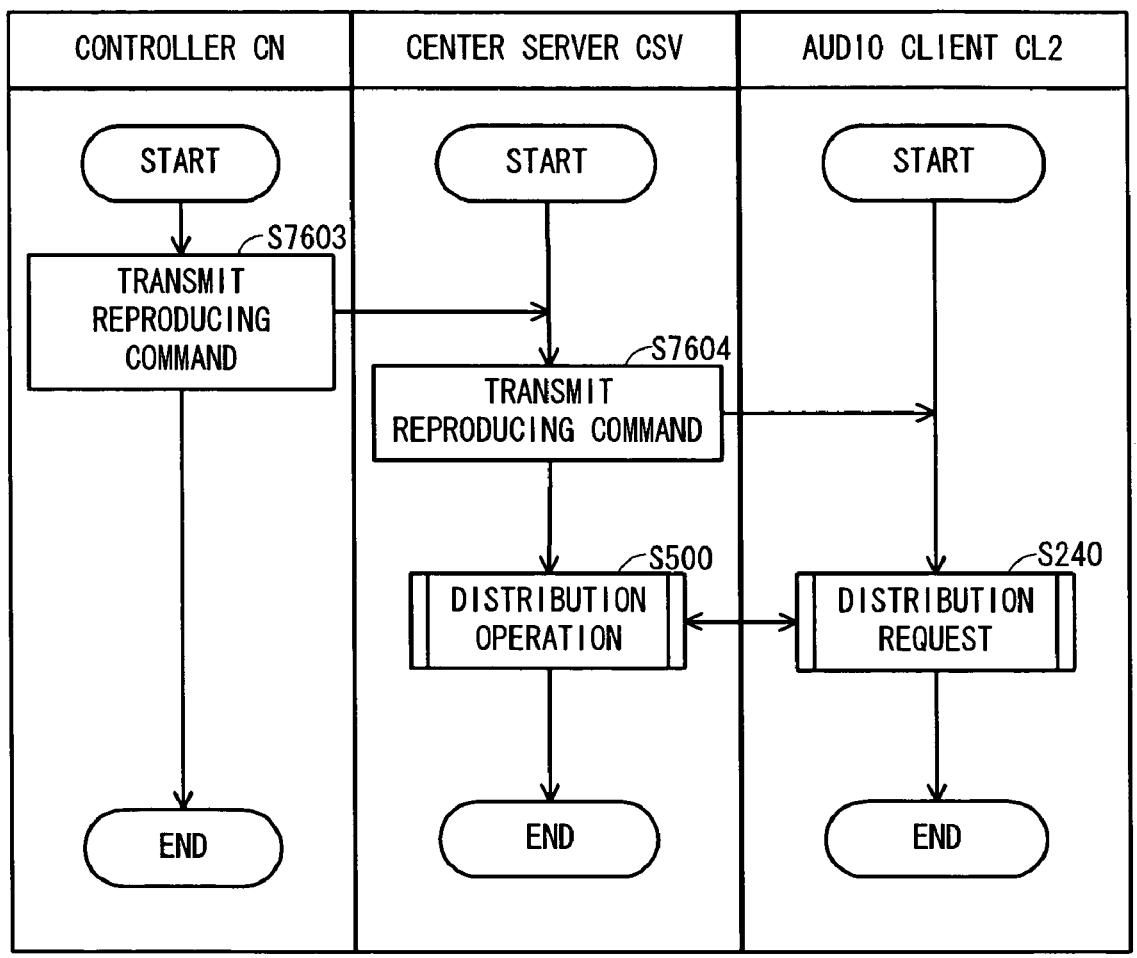
FIG. 45 is a flowchart for use in illustration of control operation in the center server system shown in FIG. 44.

The controller CN that has obtained the monitoring handle can monitor the audio client CL. The monitoring operation by the controller CN is the same as that in FIG. 28. In the center server system 70, the operation of the server SV2 in FIG. 28 is carried out by the center server CSV The controller CN that has obtained the control handle can control the audio client CL. Referring to FIG. 45, the controller CN transmits a reproducing command to the center server CSV (S7603). The center server CSV transmits the reproducing command transmitted from the controller CN to the audio client CL2 (S7604).

Upon receiving the reproducing command, the audio client CL2 carries out distribution request processing in order to obtain and reproduce music piece data (S240). At the time, the center server CSV carries out distribution operation (S500). By the above described operation, the controller CN can instruct the audio client CL whose control handle is obtained by the controller CN to reproduce or stop reproducing. More specifically, the controller can control the audio client.

3. Other Embodiments 3. 1. File Sharing Server System

Figure 46A:
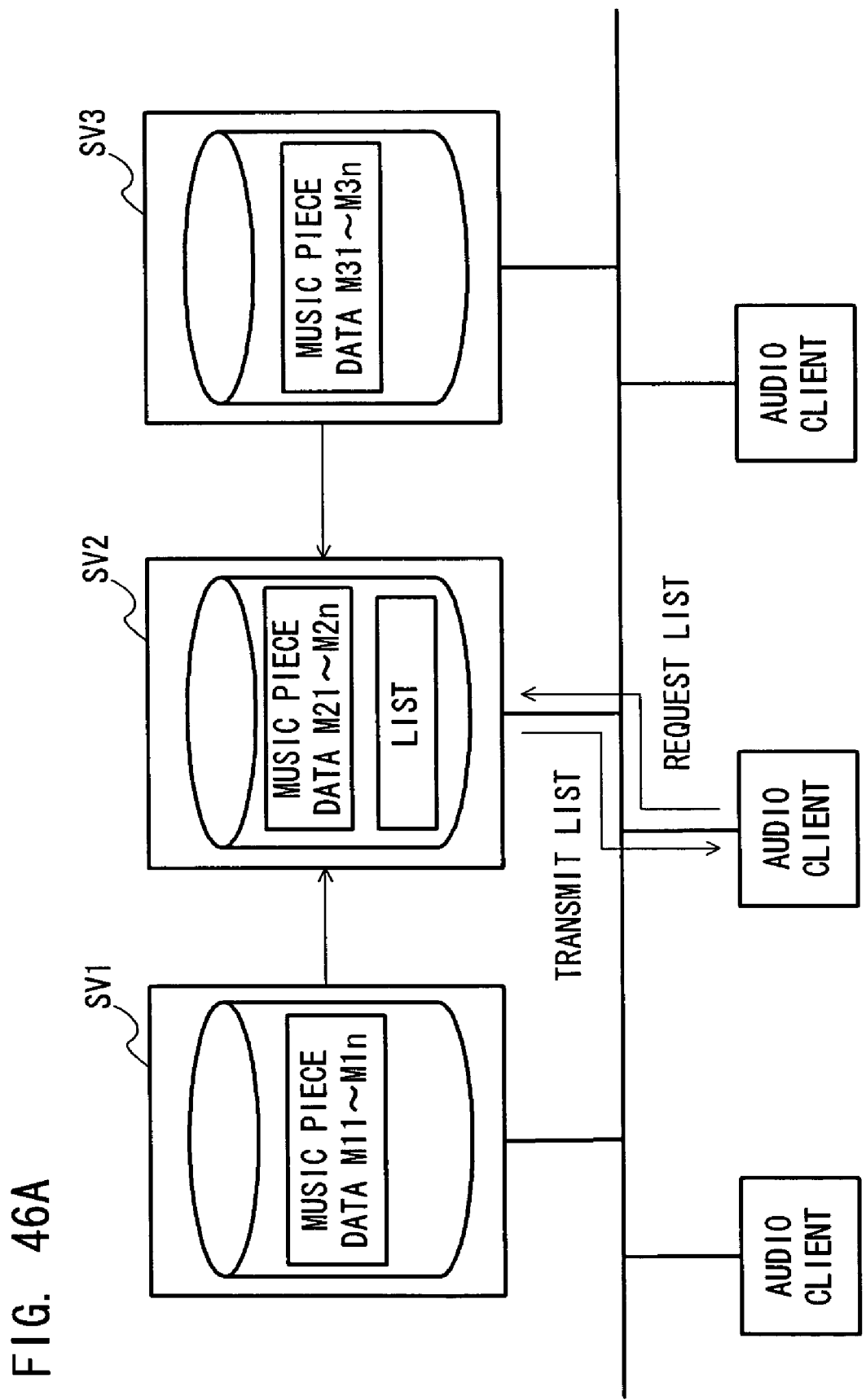
FIGS. 46A and 46B is a schematic view for use in illustration of a file sharing server system.
Figure 46B:
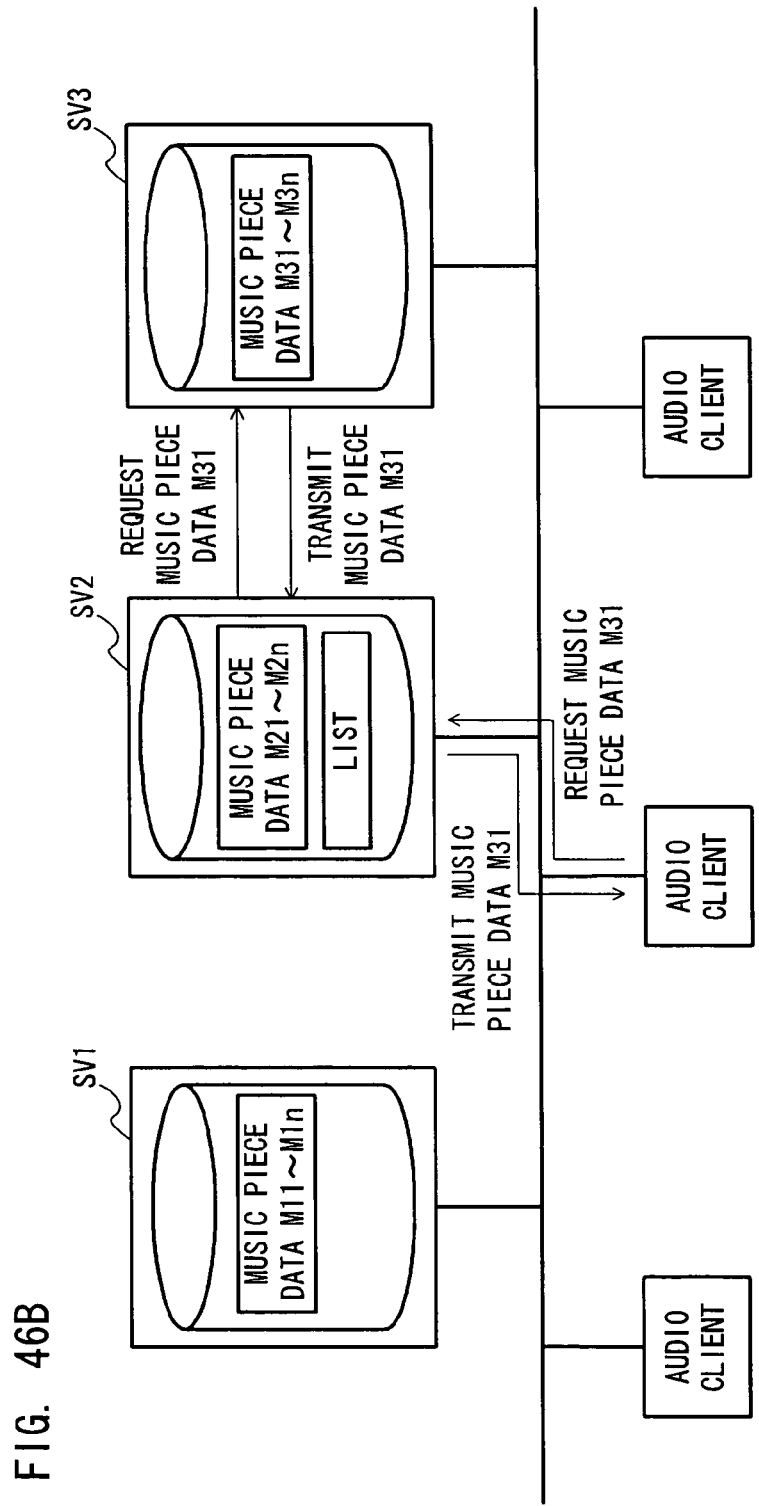

The file sharing server system uses a file sharing protocol such as SMB (Server Message Block) and CIFS (Common Internet File System). Referring to FIG. 46A, the server SV2 has a list of music piece data M21 to M2$n$ and a list of music piece data M11 to M1$n$ and M31 to M3$n$ stored by the servers SV1 and SV3, respectively. More specifically, the server SV2 can share files stored by the server SV1 and SV3. The server SV2 responds to a list request from the client CL2 to provide the list to the client CL2. The client CL2 requests desired music piece data M31 based on the list. Referring to FIG. 46B, the server SV2 receives a request and obtains the music piece data M31 in the server SV3 for distribution to the client CL2.

In the file sharing server system, the servers SV1 and SV3 serve simply as a device for storing music piece data. Therefore, when for example the server SV1 registers new music piece data, the server SV1 does not transmit updating notification to the server SV2.

Note that the servers SV1 and SV3 may share the files in the other servers SV in the same manner.

3. 2. Local List Transmitting System

In the local list transmitting system, an audio client CL obtains a plurality of local lists LL from a plurality of servers SV, so that all music piece data M stored on a LAN can be selected.

Figure 47A:
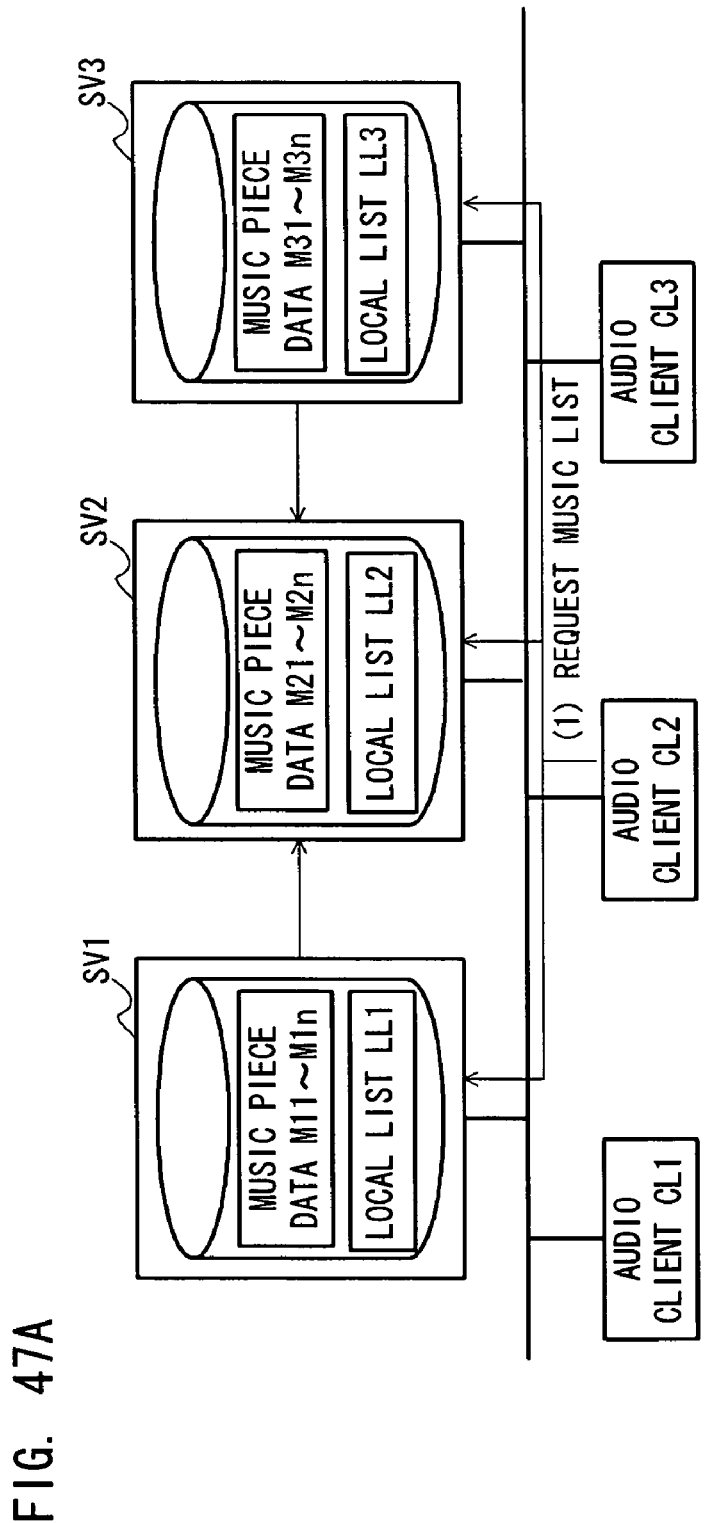
FIG. 47A to 47C is a schematic view for use in illustration of the local list transmitting server system.
Figure 47B:
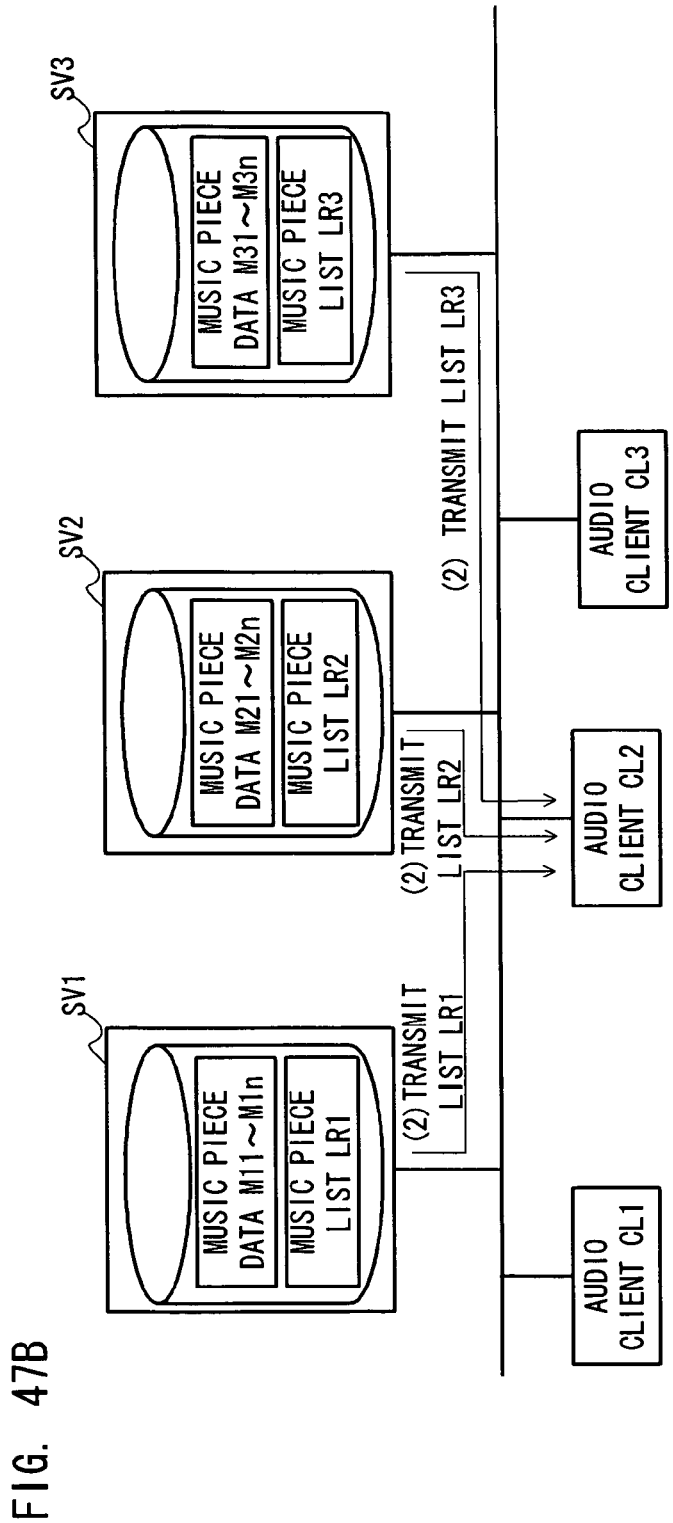
Figure 47C:
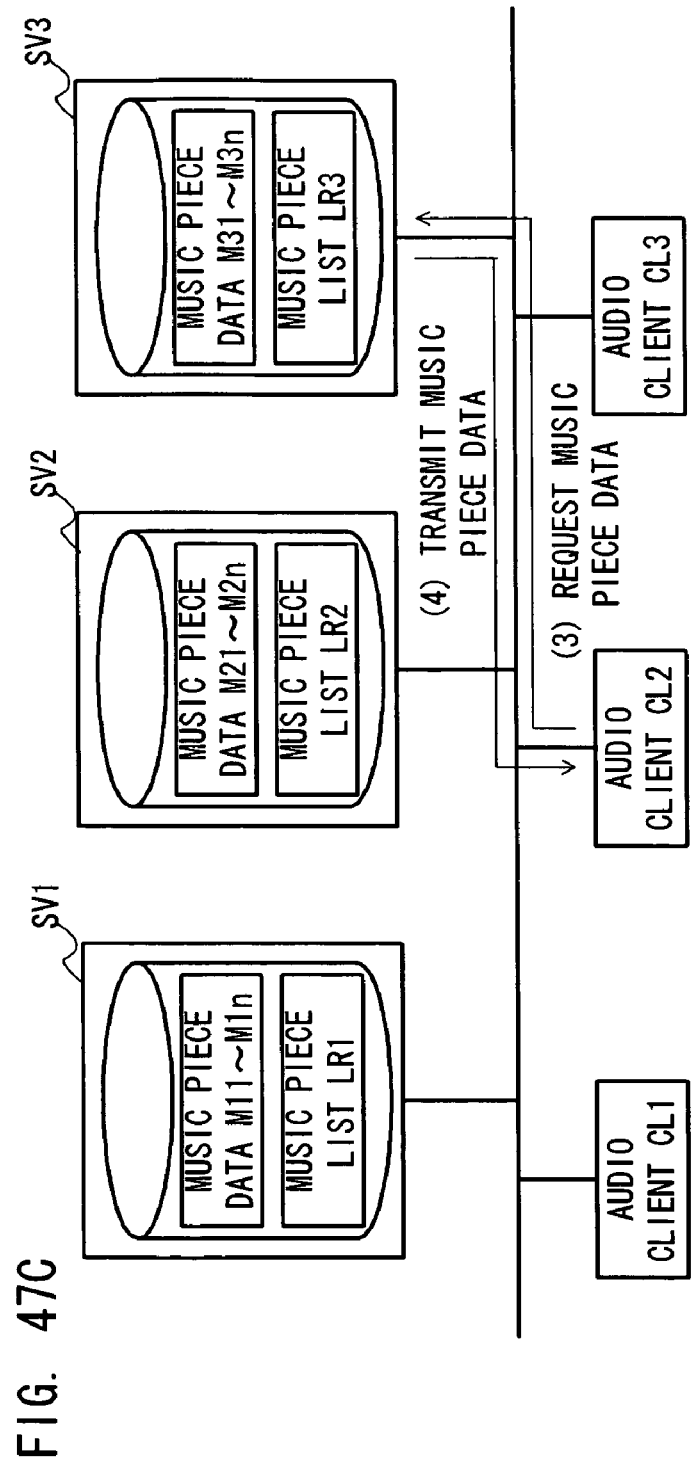

Referring to FIG. 47A, in the local list transmitting system 30, each server SV has only the local list LL of music pieces it stores. When the audio client CL2 requests a local list LL ((1) in FIG. 47A), as shown in FIG. 47B, the servers SV1 to SV3 transmit the local lists LL1 to LL3 to the audio client CL2 ((2) in FIG. 47B). The audio client CL2 obtains all the local lists LL1 to LL3 and then selects a music piece based on the lists. When the selected music piece is music piece data M31, the audio client CL2 requests the server SV3 to provide the music piece data M31 ((3) in FIG. 47C) as shown in FIG. 47C and the server SV3 transmits the music piece data M31 in response to the request ((4) in FIG. 47C).

Although the present invention has been described and illustrated in detail, it is clearly understood that the same is by way of illustration and example only and is not to be taken by way of limitation. The invention may be embodied in various modified forms without departing from the spirit and scope of the invention.

For example when the center server is taken over, not only a music piece being reproduced by a client but also music pieces to be reproduced by the client may be transmitted as well. In addition, in the center server system, the client may directly request the sub server to provide a music piece, but in the case, the client connects the center server at the push port, so that list updating notification can immediately be received from the center server. Furthermore, the client may automatically connect with the center server at the time of activation. In the center server system, there are a plurality of server groups, each of which may be provided with a center server. When a client searches for a server, at least the center server should respond to the client. However, when the client does not correspond to the center server, the attribute of the magic word (the attribute indicating its not belonging to the center server) may be determined, so that the sub server may respond to the client. The server has the client information (such as connection information, status (such as reproducing and stop), the type of the client, volume, the product ID, the firmware ID, the client name, and the reproducing file name and/or list construction key for producing a list). In the global list server system, each server may have client information the other servers have, while in the center server system, the center server may have the client information of all the sub servers. In this way, in the system having a controller for monitoring the state of the client, the controller needs only connect with a single server (a center server in the center server system) to monitor for the information of all the clients. Note that the client information may be shared or updated in the same manner as the way of sharing and updating a content list. Furthermore, the client information may be included in the content list.

What is claimed is:

1. A network AV system comprising a plurality of servers connected with each other and a client connected to one of said plurality of servers, each said server comprising:

a content storage device for storing a plurality of contents;

a local list storage device storing an internal local list of contents stored thereby and an external local list of contents stored by the other server;

a local list updater updating the internal local list in said local list storage device when the plurality of contents are updated in said content storage device and updating the external local list in said local list storage device upon receipt of the updated external local list from the other server; and a global list transmitter transmitting a global list that includes the internal local list and the external local list stored in said local list storage device to said client.

2. The network AV system according to claim 1, wherein each said server further comprises:

a first update notifier transmitting an update notification to the other server and said client when said local list updater updates the internal local list;

a second update notifier transmitting the update notification to said client without transmitting the update notification to the other server when said local list updater updates the external local list;

an external local list requester transmitting a request for the external local list to the other server and receiving the updated external local list upon receipt of the update notification from the other server; and an internal local list transmitter transmitting the internal local list to the other server upon receipt of a request for the internal local list from the other server, said global list transmitter transmits the global list upon receipt of a request for the global list from said client, and said client comprises a global list requester transmitting the request for the global list to said server and receiving the global list upon receipt of the update notification from said server.

3. The network AV system according to claim 1, wherein each said server further comprises:

a device list storage device storing device information related to the other server and said client;

a first update notifier transmitting an update notification to the other server and said client based on the device information when said local list updater updates the internal local list;

a second update notifier transmitting the update notification to said client without transmitting the update notification to the other server based on the device information when said local list updater updates the external local list;

an external local list requester transmitting a request for the external local list to the other server and receiving the updated external local list upon receipt of the update notification from the other server; and an internal local list transmitter transmitting the internal local list to the other server upon receipt of a request for the internal local list from the other server, said global list transmitter transmits the global list upon receipt of a request for the global list from said client, and said client comprises a global list requester transmitting the request for the global list to said server and receiving the global list upon receipt of the update notification from said server.

4. The network AV system according to claim 3, wherein said device information includes device types each indicating the other server or said client, each said server further comprises:

a server device type transmitter transmitting a device type indicating said server itself to the other server; and a register registering the device type transmitted from the other server or said client in said device list storage device, said first update notifier transmits the update notification to the other server and said client whose device types are registered in said device list storage device, each said server further comprises a searcher searching the device type indicating said client in said device list storage device when said local list updater updates the external local list, said second update notifier transmits the update notification to said client without transmitting the update notification to the other server when said searcher finds the device type indicating said client, and said client further comprises a client device type transmitter transmitting the device type indicating said client itself to said server.

5. The network AV system according to claim 4, wherein said client comprises a content requester requesting said server to provide a content selected in the transmitted global list, each said server comprises a content returner responsive to a request from said client and returning the selected content to said client, and said client further comprises a reproducer reproducing said returned content.

6. The network AV system according to claim 5, wherein the global list includes addresses for the plurality of servers storing the plurality of contents, and said content requester requests the selected content based on the address of said server.

7. The network AV system according to claim 5, wherein each said server further comprises a takeover notifier instructing said client to connect with a takeover server that continues to return the rest of the selected content when said server ends operating while said content returner returns the selected content.

8. The network AV system according to claim 7, wherein each said server further comprises:

a calculator calculating the data length of the already returned part of the content to said client; and a determiner determining an obtaining start address indicating the address of the location of the content to be obtained from said takeover server by said client based on said calculated data length, and said takeover notifier notifies the obtaining start address to said client.

9. The network AV system according to claim 5, wherein each said server comprises:

a takeover server selector selecting a takeover server to continue to return the rest of the selected content among the other servers when said server ends operating while said content returner returns the selected content; and a transmitter transmitting the selected content to said takeover server, and said content requester in said client in the process of reproducing the selected content requests said takeover server to continue to return the rest of the selected content.

10. The network AV system according to claim 9, wherein each said server comprises a server list storage device for storing a server list including the server information of the other servers connected to said server, and
said takeover server selector selects said takeover server based on the server list.

11. The network AV system according to claim 10, wherein said takeover server selector selects the other server connected to said server first as said takeover server among the other servers stored in said server list. said center server further including:

12. The network AV system according to claim 4, wherein each said server further comprises a disconnection notifier transmitting disconnection notification to the other server before disconnecting from said network AV system, and
said local list updater deletes the external local list of the other server transmitting the disconnection notification in said local list storage device in response to the disconnection notification.

13. The network AV system according to claim 4, wherein said network AV system comprises a plurality of clients,
said plurality of clients comprise first and second clients,
said first client includes a reproducing instructor transmitting a reproducing instruction for a content selected in the transmitted global list to said second client through said server,
said second client includes a content requester responsive to said reproducing instruction and requesting said server to provide the selected content,
each said server further includes a content returner responsive to the request from said second client and returning said selected content to said second client, and
said second client further comprises a reproducer reproducing the content returned from said server.

14. The network AV system according to claim 13, wherein said first client includes a server list storage device for storing a server list including the information of a server connected to said second client, and
said reproducing instructor transmits a reproducing instruction to said second client through said server connected to said second client based on said server list.

15. A network AV system comprising a plurality of servers and a client, said plurality of servers comprising a center server activated first and a plurality of sub servers each activated second or later,
each said server including:
a content storage device for storing a plurality of contents;
a local list obtainer obtaining an external local list of contents stored by the other server activated later than said server; and
a local list storage device for storing an internal local list of contents stored by said server and the external local list obtained by said local list obtainer,
said center server further including:
a global list transmitter transmitting a global list that includes the internal local list and the external local list stored in said local list storage device in response to a request for the global list from said client,
said client including a global list requester transmitting the request for the global list to said center server and receiving the global list,
said sub server further including a connector establishing a connection between said sub server and said center server when said sub server is activated,
said center server further including a takeover instructor transmitting a takeover instruction to said sub server connected to said center server first among the plurality of sub servers when said center server ends operating, and
said sub server further including an operator operating as said center server upon receipt of the takeover instruction.

16. The network AV system according to claim 15, wherein said client includes a content requester requesting said center server to provide a content selected in the transmitted global list,
said center server further includes a content returner responsive to the request from said client and returning the selected content, and
said client further includes a reproducer reproducing the selected content from said center server.

17. The network AV system according to claim 16, wherein said center server further includes:
a server specifier responsive to the request from said client and specifying the server storing the selected content based on the global list;
a content obtainer obtaining the selected content from its own content storage device when the server specified by said server specifier is said center server and obtaining the selected content from the content storage device of said sub server when the server specified by said server specifier is said sub server, and
said content returner returns the selected content obtained by said content obtainer.

18. The network AV system according to claim 17, wherein the global list includes the addresses of a plurality of servers storing a plurality of contents, and
said server specifier specifies the address of said server storing the content requested by said content requester.

19. The network AV system according to claim 15, wherein,
the global list includes specifying information of a plurality of servers storing a plurality of contents,
said client includes a content requester specifying the server storing the content selected in the global list using specifying information to request to the specified server for the selected content,
each said server further includes a content returner responsive to the request from said client and returning the selected content, and
said client further includes a reproducer reproducing the selected content.

20. A server in a network AV system comprising a plurality of servers connected with each other and a client connected to one of said plurality of servers, said server comprising:
a content storage device for storing a plurality of contents;
a local list storage device storing an internal local list of contents stored thereby and an external local list of contents stored by the other server;
a local list updater updating the internal local list in said local list storage device when the plurality of contents are updated in said content storage device and updating the external local list in said local list storage device upon receipt of the updated external local list from the other server; and
a global list transmitter transmitting a global list that includes the internal local list and the external local list stored in said local list storage device to said client.

21. The server according to claim 20, further comprising:
a first update notifier transmitting an update notification to the other server or said client when said local list updater updates the internal local list; and
a second update notifier transmitting the update notification to said client without transmitting the update notification to the other sever when said local list updates the external local list;
an external local list requester transmitting a request for the external local list to the other server and receiving the updated external local list upon receipt of the update notification from the other server; and
an internal local list transmitter transmitting the internal local list to the other server upon receipt of a request for the internal local list from the other server, wherein
said global list transmitter transmits the global list upon receipt of a request for the global list from said client receiving the update notification.

22. The server according to claim 20, further comprising:
a device list storage device storing device information related to the other server or said client;
a first update notifier transmitting an update notification to the other server or said client based on the device information when said local list updater updates the internal local list; and
a second update notifier transmitting the update notification to said client without transmitting the update notification to the other sever based on the device information when said local list updates the external local list;
an external local list requester transmitting a request for the external local list to the other server and receiving the updated external local list upon receipt of the update notification from the other server; and
an internal local list transmitter transmitting the internal local list to the other server upon receipt of a request for the internal local list from the other server, wherein
said global list transmitter transmits the global list upon receipt of a request for the global list from said client receiving the update notification.

23. The server according to claim 22, wherein
said device information includes device types each indicating the other server or said client,
said server further comprises:
a server device type transmitter transmitting a device type indicating said server itself to the other server;
a register registering the device type transmitted from the other server or said client in said device list storage device,
said first update notifier transmits the update notification to the other server or said client whose device types are registered in said device list storage device,
said server further comprises a searcher searching the device type indicating said client in said device list storage device when said local list updater updates the external local list, and
said second update notifier transmits the update notification to said client without transmitting the update notification to the other sever when said searcher finds the device type indicating said client.

24. The server according to claim 23, further comprising:
a content returner responsive to a request to provide said client with a content selected in the transmitted global list from said client and returning the selected content to said client;
a takeover server selector selecting a takeover server to continue to return the rest of the selected content among the other servers when said server ends operating while said content returner returns the selected content; and
a transmitter transmitting the selected content to said takeover server, and
a takeover notifier instructing said client to connect with said takeover server.

25. A computer program stored on a non-transitory computer readable medium which, when executed by a server connectable to another server and a client, causes the server to perform the steps of: storing a plurality of contents in said server; storing an internal local list of contents of said server and an external local list of contents of the other server in said server; updating the internal local list when the plurality of contents are updated in said server and updating the external local list upon receipt of the updated external list from the other server; and transmitting a global list including the internal local list and the external local list to said client.

26. The computer program stored on a non-transitory computer readable medium according to claim 25, further causing said server to perform the steps of: transmitting an update notification to the other server or said client when the internal local list in said server is updated and transmitting the update notification to said client without transmitting the update notification to the other sever when the external local list in said server is updated; transmitting a request for the external local list to the other server and receiving the updated external local list upon receipt of the update notification from the other server; and transmitting the internal local list to the other server upon receipt of a request for the internal local list from the other server, wherein said step of transmitting the global list transmits the global list when said server receives a request for the global list from said client receiving the update notification.

27. The computer program stored on a non-transitory computer readable medium according to claim 25, further causing said server to perform the steps of: storing device information related to the other server or said client; transmitting an update notification to the other server or said client based on the device information when the internal local list in said server is updated and transmitting the update notification to said client without transmitting the update notification to the other sever based on the device information when the external local list in said server is updated; transmitting a request for the external local list to the other server and receiving the updated external local list upon receipt of the update notification from the other server; and transmitting the internal local list to the other server upon receipt of a request for the internal local list from the other server, wherein said step of transmitting the global list transmits the global list when said server
receives a request for the global list from said client receiving the update notification.

28. The computer program stored on a non-transitory computer readable medium according to claim 27, wherein said device information includes device types each indicating the other server or said client, said computer program further causes said server to perform the steps of: transmitting a device type indicating said server to the other server; registering the device type transmitted from the other server or said client in said server; and searching the device type indicating said client when the external local list in said server is updated, said step of transmitting the update notification transmits the update notification to the other server or said client whose device types are registered in said server when the internal local list in said server is updated and transmits the update notification to said client without transmitting the update notification to the other sever when the device type indicating said client is found in said server as a result of searching.

29. The computer program stored on a non-transitory computer readable medium according to claim 28, further causing said server to perform the step of returning the selected content to said client in response to a request from said client.

* * * * *